(12) United States Patent
Toyama et al.

(10) Patent No.: US 6,198,841 B1
(45) Date of Patent: *Mar. 6, 2001

(54) COLOR IMAGE PROCESSOR

(75) Inventors: Katsuhisa Toyama; Yoshihiko Hirota, both of Toyokawa (JP)

(73) Assignee: Minolta Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/825,296

(22) Filed: Mar. 27, 1997

(30) Foreign Application Priority Data

Mar. 28, 1996 (JP) .................................... 8-74707

(51) Int. Cl.$^7$ .................................................. G06K 9/00
(52) U.S. Cl. ........................ 382/164; 382/167; 358/521; 358/522; 358/534
(58) Field of Search .................... 382/162, 167, 382/164; 358/518, 521, 522, 534, 453, 454, 456, 458, 530

(56) References Cited

U.S. PATENT DOCUMENTS

| | | | |
|---|---|---|---|
| 4,978,226 | 12/1990 | Moriya et al. | 358/76 |
| 5,165,071 | 11/1992 | Moriya et al. | 358/443 |
| 5,181,105 | 1/1993 | Udagawa et al. | 358/80 |
| 5,208,663 | * 5/1993 | Hiratsuka et al. | 358/521 |
| 5,408,343 | 4/1995 | Sugiura et al. | 358/520 |
| 5,675,664 | * 10/1997 | Maeda et al. | 382/199 |
| 5,696,842 | * 12/1997 | Shirasawa et al. | 382/176 |
| 5,699,492 | * 12/1997 | Karaki | 358/529 |
| 5,726,780 | * 3/1998 | Hirota et al. | 358/520 |
| 5,742,410 | * 4/1998 | Suzuki | 358/518 |

OTHER PUBLICATIONS

U.S. application No. 08/611,754, Co–pending.
U.S. application No. 08/747,827, Co–pending.

* cited by examiner

Primary Examiner—Amelia Au
Assistant Examiner—Jingge Wu
(74) Attorney, Agent, or Firm—McDermott, Will & Emery

(57) ABSTRACT

In a digital full color image processor, color data are obtained by reading a color image with a color image sensor. An image forming mode of the color image such as background level and magnification is specified, and the image forming mode is changed according to the specified image forming mode when the color data is processed. A reference value for area discrimination is changed according to the image forming mode. Then, an area such as a black portion or a dot area in the color data is discriminated for image processing of the color data with the reference value, and the color data is processed according to the area discrimination.

15 Claims, 41 Drawing Sheets

Fig.5
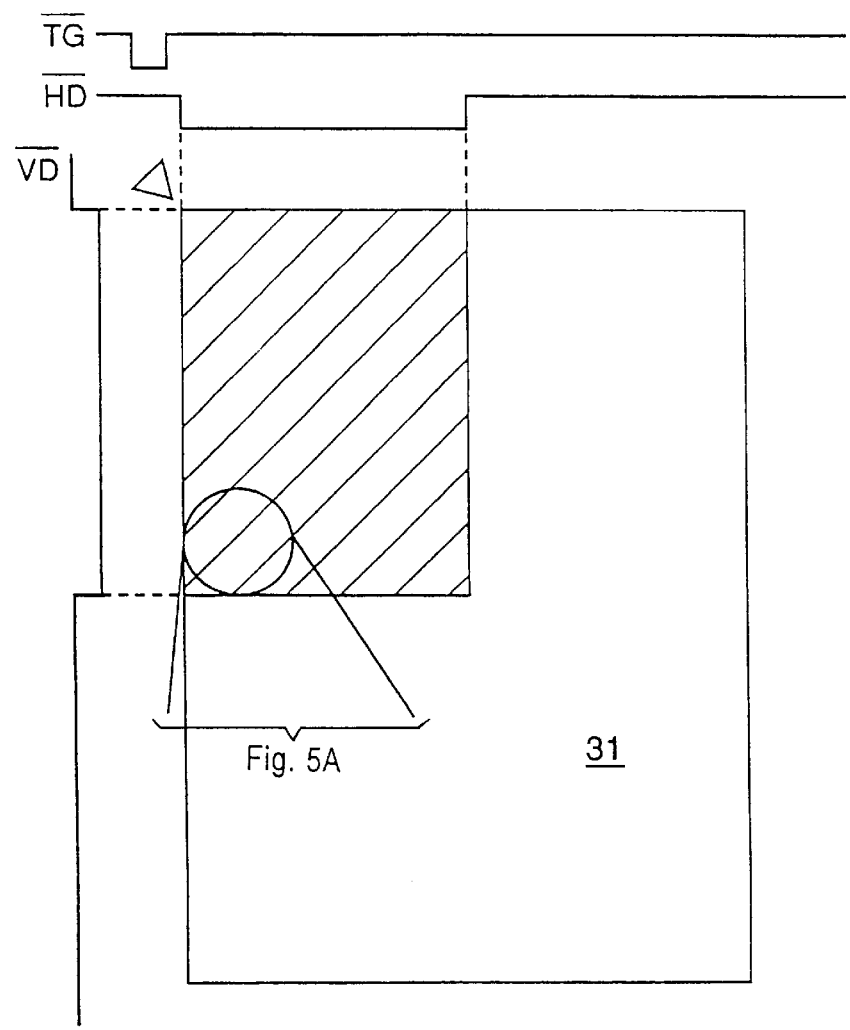
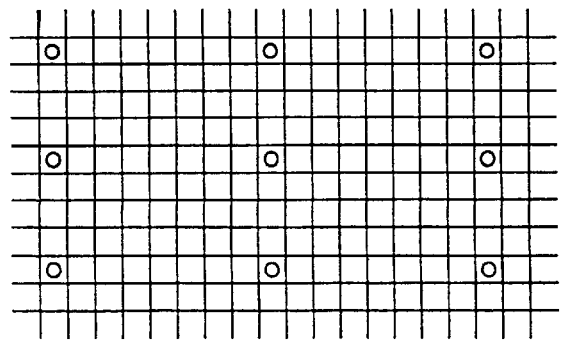
Fig.5A

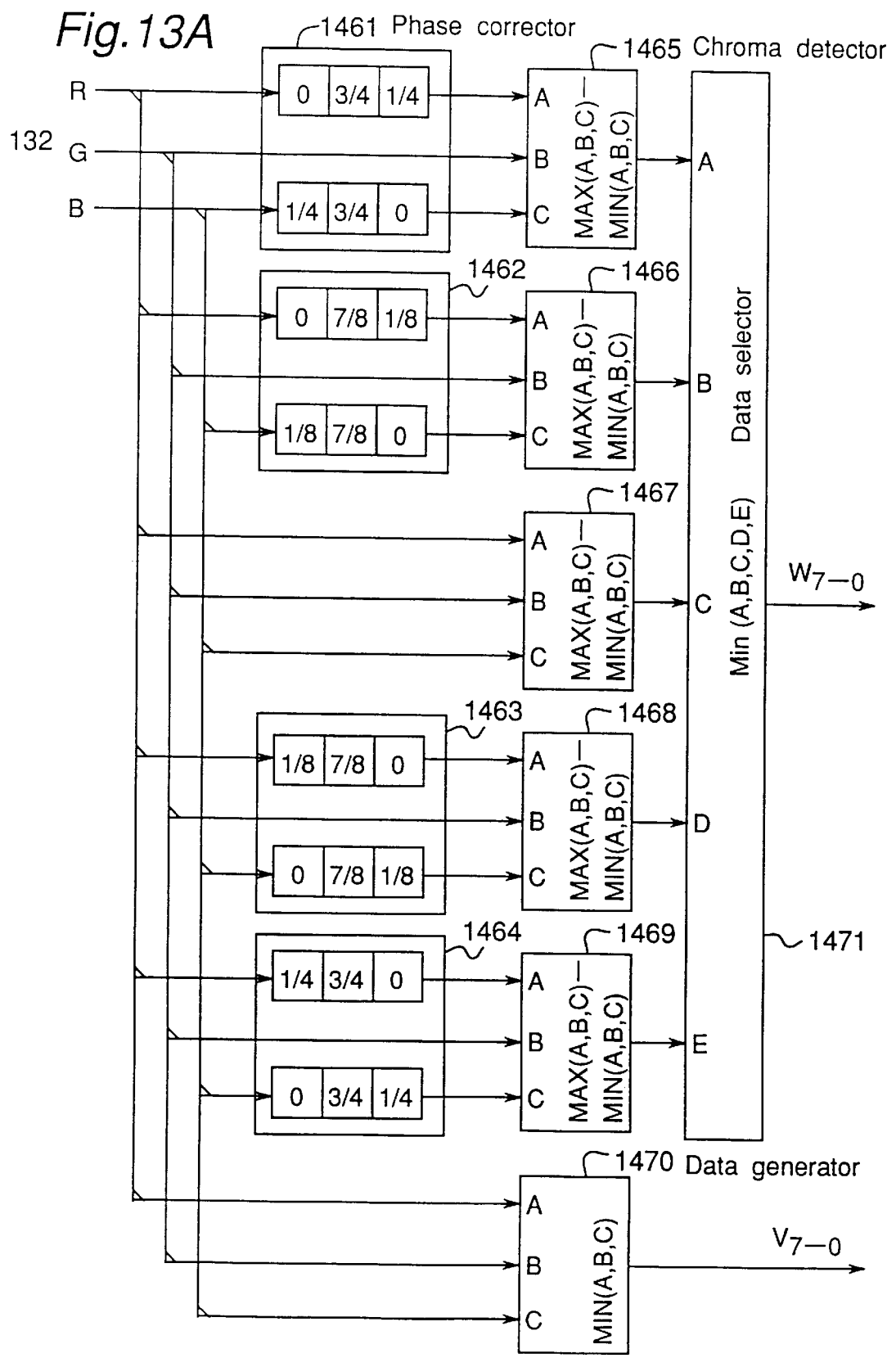

Fig.18

| 1/8 | 0 | 0 | 0 | −1/8 |
|---|---|---|---|---|
| 1/8 | 1/8 | 0 | −1/8 | −1/8 |
| 1/8 | 1/8 | 0 | −1/8 | −1/8 |
| 1/8 | 1/8 | 0 | −1/8 | −1/8 |
| 1/8 | 0 | 0 | 0 | −1/8 |

Fig.19

| −1/8 | −1/8 | −1/8 | −1/8 | −1/8 |
|---|---|---|---|---|
| 0 | −1/8 | −1/8 | −1/8 | 0 |
| 0 | 0 | 0 | 0 | 0 |
| 0 | 1/8 | 1/8 | 1/8 | 0 |
| 1/8 | 1/8 | 1/8 | 1/8 | 1/8 |

Fig.20
|   |   |     |   |     |
|---|---|-----|---|-----|
| 0 | 0 | 1/4 | 0 | 0   |
| 0 | 0 | 0   | 0 | 0   |
|1/4| 0 | −1  | 0 | 1/4 |
| 0 | 0 | 0   | 0 | 0   |
| 0 | 0 | 1/4 | 0 | 0   |
Fig.22
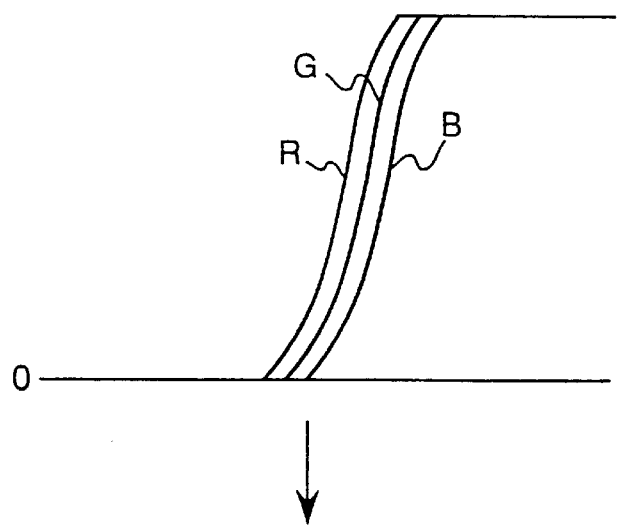
Fig.22A
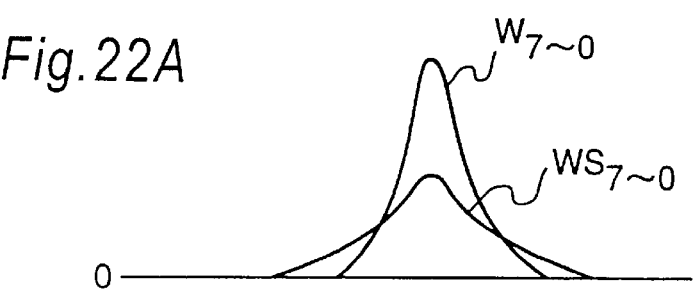

Brightness distribution

Brimary differential filter

Secondary differential filter

| 1/16 | 1/8 | 1/16 |
|------|-----|------|
| 1/8  | 1/4 | 1/8  |
| 1/16 | 1/8 | 1/16 |

| $a_{11}$ |  | $a_{13}$ |  | $a_{15}$ |
|---|---|---|---|---|
|  | $a_{22}$ | $a_{23}$ | $a_{24}$ |  |
| $a_{31}$ | $a_{32}$ | X | $a_{34}$ | $a_{35}$ |
|  | $a_{42}$ | $a_{43}$ | $a_{44}$ |  |
| $a_{51}$ |  | $a_{53}$ |  | $a_{55}$ |

Fig.31

| 0 | 0 | −1/4 | 0 | 0 |
|---|---|---|---|---|
| 0 | 0 | 0 | 0 | 0 |
| −1/4 | 0 | 1 | 0 | −1/4 |
| 0 | 0 | 0 | 0 | 0 |
| 0 | 0 | −1/4 | 0 | 0 |

Fig.33

| 1/64 | 1/32 | 1/32 | 1/32 | 1/64 |
|---|---|---|---|---|
| 1/32 | 1/16 | 1/16 | 1/16 | 1/32 |
| 1/32 | 1/16 | 1/16 | 1/16 | 1/32 |
| 1/32 | 1/16 | 1/16 | 1/16 | 1/32 |
| 1/64 | 1/32 | 1/32 | 1/32 | 1/64 |

Fig.34

| 0 | 0 | 0 | 0 | 0 |
|---|---|---|---|---|
| 0 | 1/16 | 3/8 | 1/16 | 0 |
| 0 | 1/8 | 1/4 | 1/8 | 0 |
| 0 | 1/16 | 1/8 | 1/16 | 0 |
| 0 | 0 | 0 | 0 | 0 |

Fig.35

| 0 | 0 | 0 | 0 | 0 |
|---|---|---|---|---|
| 0 | 1/64 | 3/32 | 1/64 | 0 |
| 0 | 3/32 | 9/16 | 3/32 | 0 |
| 0 | 1/64 | 3/32 | 1/64 | 0 |
| 0 | 0 | 0 | 0 | 0 |

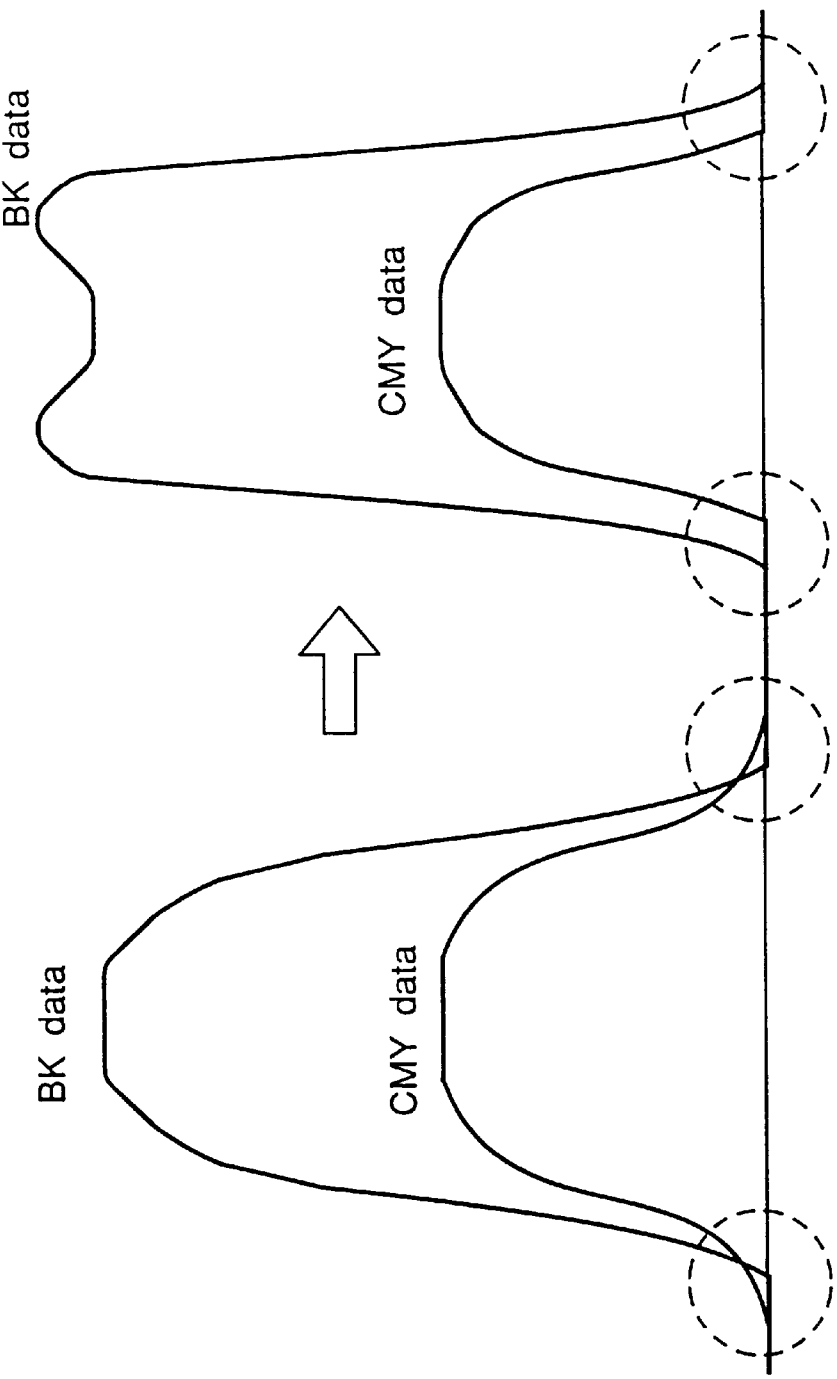

COLOR IMAGE PROCESSOR

BACKGROUND OF THE INVENTION

1. Field of the Invention

The present invention relates to a digital color image processor.

2. Description of Prior Art

In a digital color image processor, black characters in a document are usually discriminated to improve reproducibility of black characters. Characters (edges) are discriminated from achromatic image portions in a document by detecting an edge portion and an achromatic portion in the document. Various techniques are proposed for discriminating an achromatic image, and they discriminate an achromatic portion according to color data, that is, red (R), green (G) and blue (B) data. For example, in a technique, a difference of the maximum from the minimum of R, G and B color data, is used as chroma data. A portion having a larger difference is decided to be a color image, while a portion having a lower difference is decided to be an achromatic image.

It is also known to discriminate a dot area in a document and prevents Moire phenomenon by using the discrimination. In the discrimination, isolated dots isolated are detected from the gradation distribution of color data, and a dot area is detected according to the number of the dots in a unit pixel matrix.

On the other hand, in such an image processor, image forming mode such as the magnification or the density of an output image is changed automatically or manually by a user. The magnification can be changed by controlling resolution of color data. The density can be changed by controlling gradation characteristic such as background level.

When the gradation characteristic is changed for density control, the chroma data and the edge level are affected. For example, when the image reading conditions are set so as to remove the background of a document, it becomes difficult to decide an edge of a character having a low density. Further, when an image is reduced by changing magnification, a character having many lines therein is erroneously decided as dots. Thus, the quality of image reproduction is deteriorated.

SUMMARY OF THE INVENTION

An object of the present invention is to provide an image processor which improves the quality of a reproduced image surely by controlling image forming conditions when an image forming mode is set.

In one aspect of the invention, an image processor comprises an image scanner, and color data are obtained by reading a color image with a color image sensor. A specification device is provided to specify an image forming mode of the color image, and the image forming mode is changed according to the specified image forming mode when the color data is processed. The color data is changed according the image forming mode, and an area in the color data is discriminated for image processing of the color data with a reference value changed according to the image forming mode. Then, the color data is corrected according to the discrimination. For example, a gradation characteristic such as background level is specified as the image forming mode related to density, and a black portion in the color data is discriminated with the reference value changed according to the background level. In another example, magnification is specified as the image forming mode, and a dot area in the color data is discriminated with the reference value changed according to the magnification.

An advantage of the present invention is that a black portion in a color data can be discriminated surely when a gradation characteristic is changed.

Another advantage of the present invention is that a dot area in a color data can be discriminated surely even when magnification of the image is changed.

BRIEF DESCRIPTION OF THE DRAWINGS

These and other objects and features of the present invention will become clear from the following description taken in conjunction with the preferred embodiments thereof with reference to the accompanying drawings, and in which:

FIGS. 5 and 5A illustrate various quantities obtained from the histogram;

FIGS. 13A, 13B and 13C are block diagrams of a region discriminator;

FIG. 18 is a diagram of a primary differential filter along the main scan direction;

FIG. 19 is a diagram of a primary differential filter along the subscan direction;

FIG. 20 is a diagram of a secondary differential filter;

FIGS. 22 and 22A illustrate an increase in chroma data W due to phase differences among R, G and B data, and WS obtained by smoothing;

FIG. 31 is a diagram of a Laplacian filter;

FIG. 33 is a diagram of a smoothing filter for smoothing input data of 400 dpi to 300 dpi;

FIG. 34 is a diagram of a smoothing filter for smoothing input data of 400 dpi to 200 dpi;

FIG. 35 is a diagram of a smoothing filter for smoothing input data of 400 dpi to 100 dpi;

FIGS. 36A and 36B are diagrams for explaining a slight extension of chromatic data outside a character and deletion of such extension;

DETAILED DESCRIPTION OF THE PREFERRED EMBODIMENTS

Figure 1:
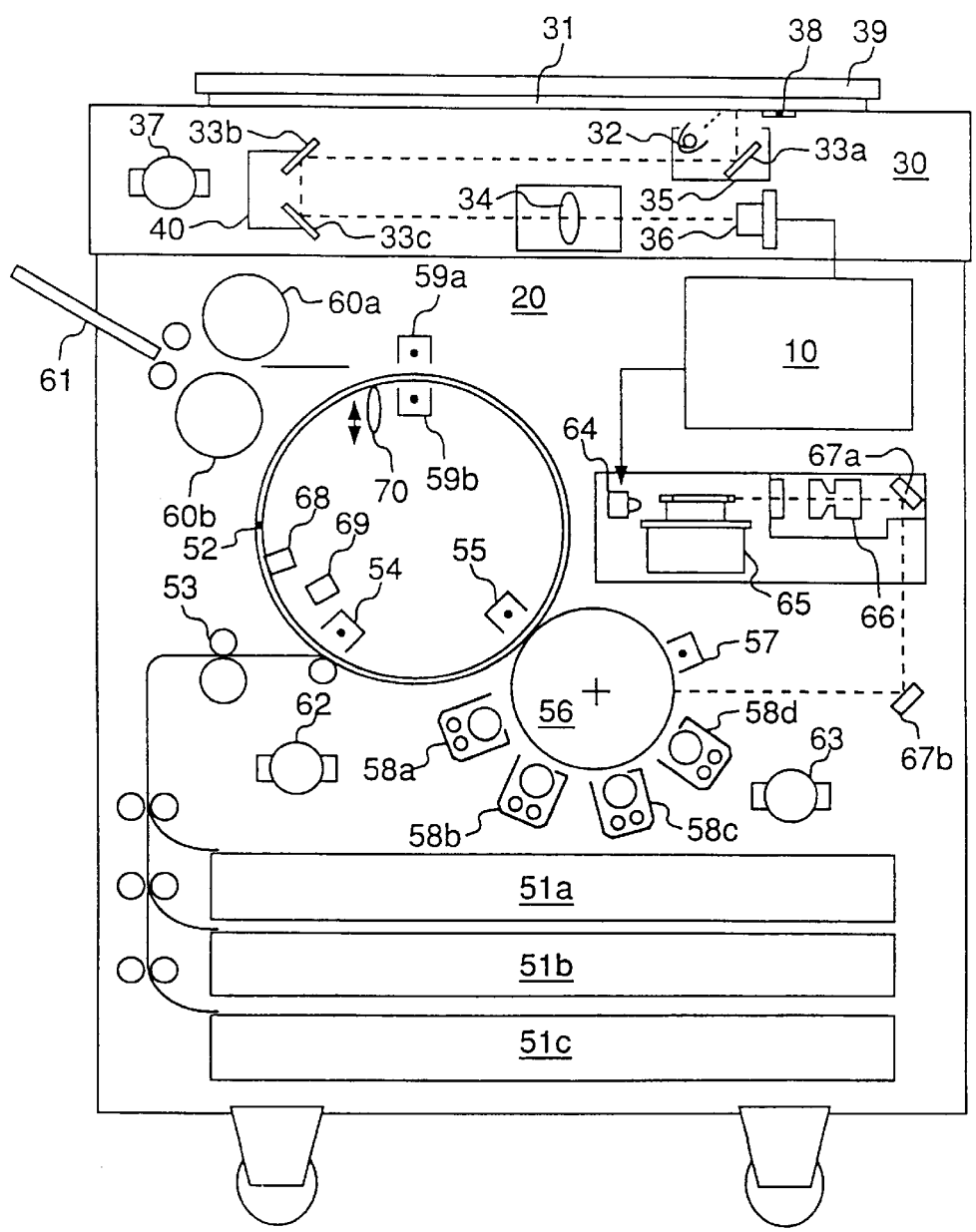
FIG. 1 is a sectional view of a digital color copying machine.

Referring now to the drawings, wherein like reference characters designate like or corresponding parts throughout the drawings, embodiments of the invention is described.

A. Structure of Digital Full Color Copying Machine

FIG. 1 shows a digital full color copying machine comprising an image scanner 30, a data processor unit 10 and a printer section 20. The image scanner 30 reads a document image, and the data processor unit 10 processes the data read received from the image scanner 30. The printer section 20 print a full color or black image on a paper according to the data received from the data processor unit 10. An outline of the digital copying machine is explained below.

In the image scanner 30, a document is put on a platen glass 31 and covered with a plate 39, or it is fed onto a platen 31 by an automatic document feeder (not shown) if mounted. A white plate 38 for shading correction is provided at an edge of the platen glass 31. The document is exposed with a lamp 32, and a light reflected from the document is guided through mirrors 33a, 33b and 33c and converged by a lens 34 onto a color sensor 36 to be converted to color data of red (R), green (G) and blue (B). Then, they are sent to the data processor 10. When the document image is read, a first slider 35 and a second slider 40 move at a speed of V and at a speed of V/2 mechanically by a motor 37 along the longitudinal direction (subscan direction) perpendicular to an electrical scan direction (main scan direction) of the color sensor 36 so that the entire document is scanned. The data processor 10 processes the image data electrically to output components of magenta (M), cyan (C), yellow (Y) and black (Bk) to the printer section 20.

In the printer section 20, the image signals of C, M, Y and Bk received from the data processor 10 are used to drive a laser diode 214, and a laser beam emitted by the laser diode 214 propagates through a polygon mirror 215, an f-θ lens 216, mirrors 217a and 217b to expose a rotating photoconductor drum 206 charged beforehand by a charger 207 so as to form an electrostatic latent image. One of four development units 208a, 208b, 208c and 208d of toners of cyan, magenta, yellow and black is selected to develop the latent image with toners. On the other hand, a sheet of paper supplied from a cassette 201a, 201b or 201c is carried by timing rollers 203 to be wound on a transfer drum 202 with an adsorption charger 204. It is carried further to a transfer portion, and the toner image on the photoconductor drum 206 is transferred by a transfer charger 205 onto the sheet of paper. The above-mentioned printing process are repeated for four colors of yellow, magenta, cyan and black. That is, toner images of the four colors are transferred successively onto the sheet of paper. Then, the paper is separated by separation chargers 209a, 209b and a claw 70 from the transfer drum 202, passes through fixing rollers 210a, 210b for fixing the toner image and is discharged onto a tray 211.

B. Image Signal Processing

Figure 2A:
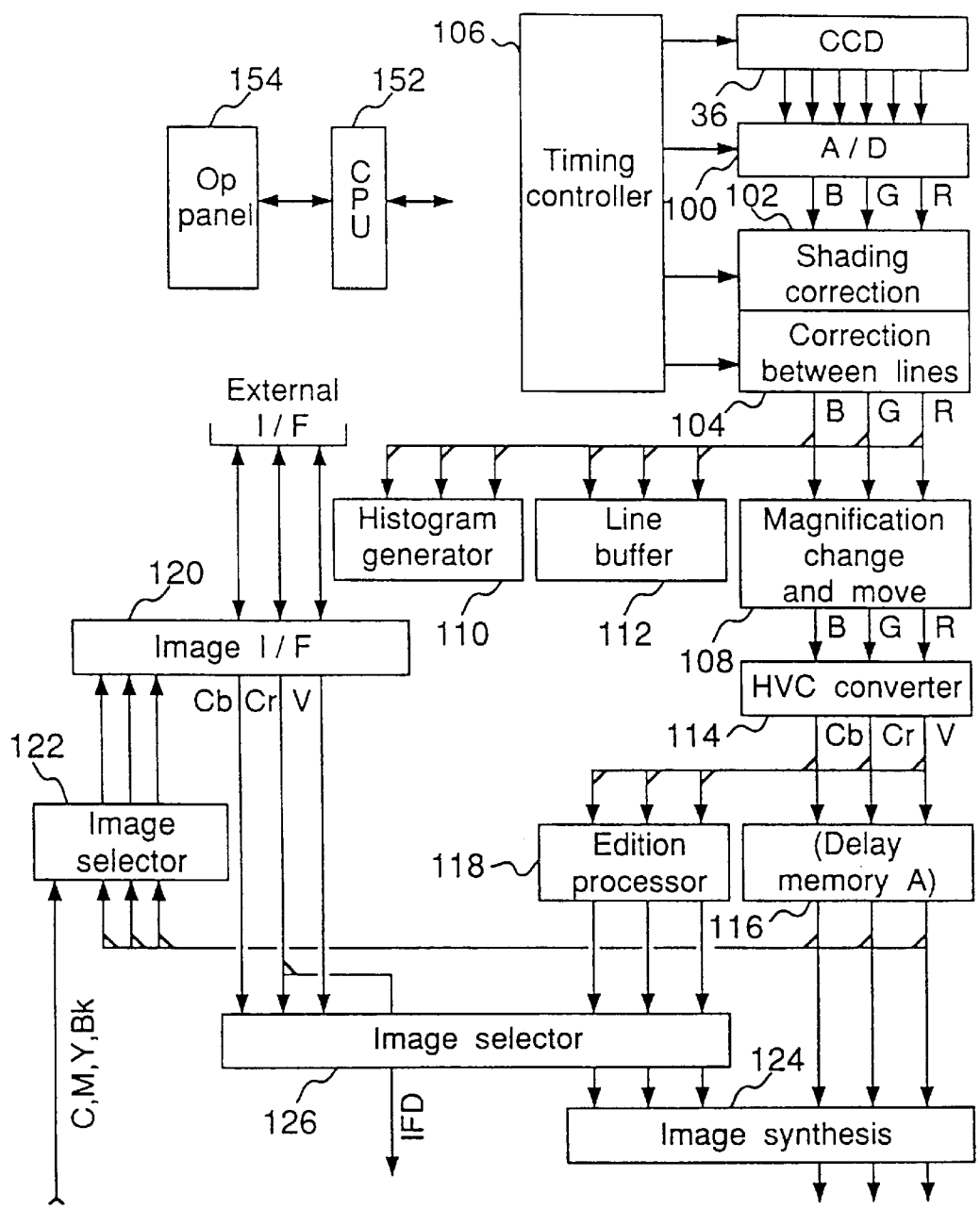
FIGS. 2A and 2B are block diagrams of a signal processor.
Figure 2B:
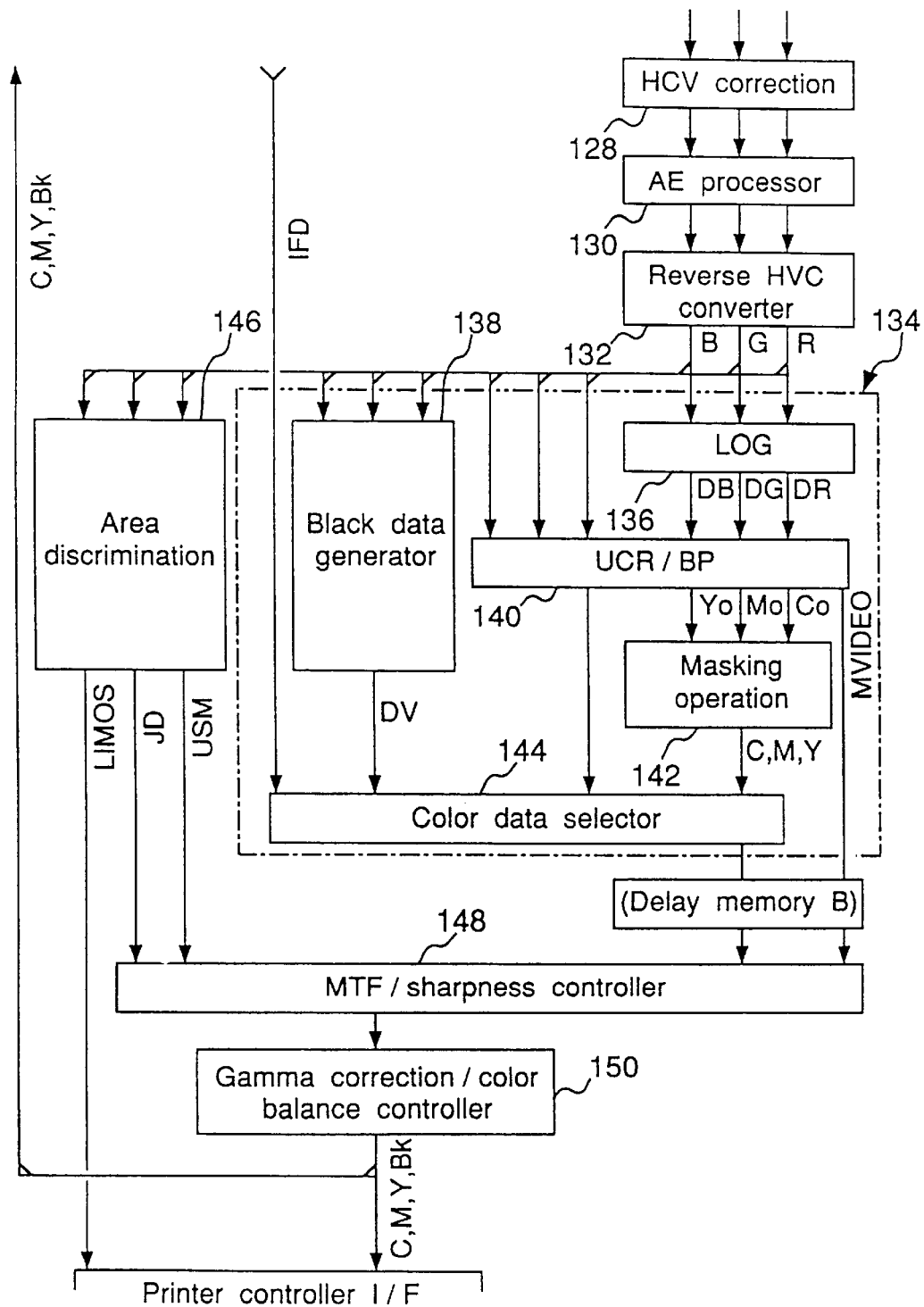

Next, image signal processing in the signal processor 10 is described. FIGS. 2A and 2B show image processing in the signal processor 10. As explained above, the signal processor 10 receives analog image signals of 400 dots per inch of red, green and blue from the linear CCD sensor 36 on which a light reflected from a document is focused. In the A/D conversion section 100, the analog image signals are converted to 8-bit digital data (256 gradation levels) of red (R), green (G) and blue (B). In order to eliminate scattering of reading of a quantity of light among CCD elements in the sensor 36 along a main scan direction for each of red, green and blue, a shading correction section 102 has stored reference data read on the white plate 38 in a memory (not shown), and when a document image is read, the data in the memory is converted to an inverted value thereof, and it is multiplied with a data on the document for shading correction. Next, a line correction section 104 adjusts the output of the data after shading correction according to positions of chips of red, green, and blue provided in the color CCD sensor 36. A timing controller 106 controls timings for the CCD sensor 36, the A/D conversion section 100, the shading correction section 102 and the line correction section 104. Then, the line correction section 104 sends the R, G and B data to line buffer 112 and magnification charge and move section 108 and a histogram generator 110.

The magnification change and move section 108 has two linear memories, and magnification change and movement of data along a main scan direction along the CCD sensor 36 are controlled by changing timings of write and read to and from the memories.

The histogram generator 110 (FIG. 4) generates value signals from the R, G and B data obtained in a prescan to generate histograms. By using the histograms of the value signals, automatic color selection, background level and document mode are set automatically. The histogram generator 110 will be explained in detail later.

An HVC converter 114 converts the R, G and B data to value signals (V) and color difference signals (Cr and Cb). An edition processor 118 performs edition such as color change on the data received from the HVC converter 114 according to an instruction from an editor provided as an option.

On the other hand, an image interface 120 receives V, Cr and Cb data through an image selector 122 and sends the image data to an external equipment, or it received image data from the external equipment. In order to deal with various types of image data, the image interface 120 has a function to convert the V, Cr and Cb data to R, G and B signals, X, Y and Z signals, L*, a* and b* signals or the like, and vice versa. Further, C, M, Y and Bk data to be printed to the printer section 20 may be sent to the external equipment, and vice versa.

An image synthesis section 124 selects the V, Cr and Cb data received from the editor 118 or from the image selector 126 through the image interface 120, and performs image synthesis of the data with another data received from the HVC converter 114.

An HVC corrector 128 corrects the V, Cr and Cb data received from the image synthesis section 124 according to an instruction given with an operational panel 154, in order to adjust image quality by a user in correspondence to three human senses of value (V), hue (H) and chroma (C).

An automatic exposure processor 130 controls background level of a document on value signals according to information obtained by the histogram generator 110, as will be explained in detail later.

A reverse HVC converter 132 converts the V, Cr and Cb data again to R, G and B data.

In a color corrector 134, a LOG corrector 136 converts the R, G and B data received from the reverse HVC converter 132 to density data DR, DG and DB, while a monochromatic data generator 138 generates value data from the R, G and B data in a color copy mode and generates gradation data DV for a monochromatic copy in a black copy mode. An undercolor/black paint section 140 calculates a difference between a maximum and a minimum of the density data DR, DG and DB as color information and a minimum among DR, DG and DB as a black component. The DR, DG and DB data are subtracted by the minimum to generate cyan, magenta and yellow data Co, Mo and Yo, while black data Bk is generated based on the minimum to be sent to a color data selector 144. A masking operation section 142 converts the data Co, Mo and Yo to cyan, magenta and yellow data C, M and Y for color reproduction in the printer section 20, and sends them to the color data selector 144.

On the other hand, a region discriminator 146 discriminates a black character image, a dot image and the like, and generates a result (JD signal) and a correction signal (USM signal) based on the minimum MIN(R, G, B) and a difference between the maximum and the minimum (MAX(R, G, B)−MIN(R, G, B)). Further, a LIMOS signal is send to the printer section 20 to define a duty ratio of an output period to a pixel period. The output period means a period when a signal is output. The LIMOS signal is set to improve compatibility of reproduction of black characters and granularity of toner image.

An MTF corrector/sharpness controller 148 performs a various processing such as edge emphasis or smoothing on the data according to results obtained by the image discrimination section 146 for correcting a copy image appropriately.

A gamma correction/color balance section 150 controls a gamma curve (gradation correction curve) and color balance of C, M, Y and Bk data automatically or according to instruction given by the operational panel 154. Then, the C, M, Y and Bk data and the LIMOS signal are sent to the printer section 20.

A CPU 152 controls the signal processor 10, and the operational panel 154 is used to give data and to display data.

C. Copy Mode

Figure 3:
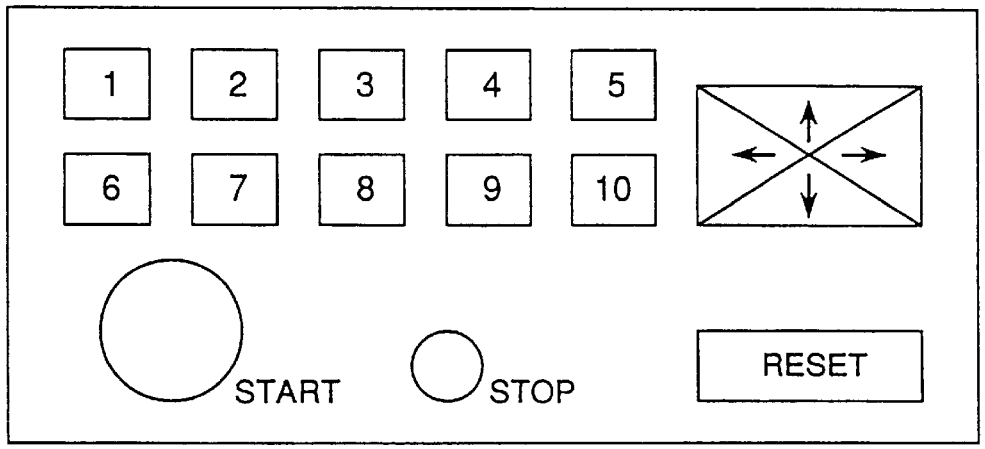
FIG. 3 is a diagram of a basic picture in an operational panel.

Next, copy modes of the full color copying machine are explained. FIG. 3 shows a basic picture in the operational panel 154, and a user can set various copy modes and the like.

First, background processing (automatic or manual) is explained. Background processing can be set as automatic exposure (AE) or manual setting wherein one of eight levels is set. In the automatic exposure, five following types of documents can be decided according to a histogram obtained by a prescan: color standard (white background, color background), color photograph, black-and-white standard, black-and-white photograph. Then, if the document type is decided to be a black-and-white standard document or a color standard (white background) document, value gradation correction to be explained later (FIGS. 11 and 12) is performed, otherwise a central level of the manual setting is selected as a default automatically (refer to Table 1). When manual setting is performed, contents as shown in Table 2 are set.

Next, document mode is explained (refer also to Table 1). A user can select automatic color selection (ACS) mode or one of four document modes. When ACS mode is selected, one of the four document modes is selected automatically according to the decision of document type based on prescan data, as shown in Table 1. When the document is decided to be a black-and-white document in the automatic color selection, black-and-white standard or photograph mode is selected and a copy is produced with a black copy mode. When the document is decided to be a color document, color standard or photograph mode is selected, and a copy is produced with a full color copy mode of four colors of cyan, magenta, yellow and black. When black-and-white standard or photograph mode is selected automatically or manually, the display in the operational panel is changed to a display for black-and-white mode (not shown), and a user selects a mixing ratio of R, G and B data as a document parameter in order to determine gradation data. (As a default data, average sensitivity distribution of red, green and blue is set for the ACS mode, while luminous efficiency is set as a default for the manual mode.) Further, a reproduction color can be selected among sixteen colors including black.

Though detailed explanation is omitted, a color resolution mode for reproducing C, M, B or Bk data in color copy mode or for reproducing Bk data in black copy mode for each document can be set.

D. Prescan and Generation of Histograms

In this embodiment, prescan is performed for determining document type and for performing automatic exposure (AE) and automatic color selection (ACS) according to the result of document type. The scan unit 35 in the image scanner 30 is positioned near the white plate 38 for shading correction opposite to a document reference position for a normal scan, in order to shorten a first copy time. When the start button in the operational panel 154 is pressed, the light source 32 is turned on, and the scanner 30 scans the white plate 38 and scans a document to generate histogram data thereof. Then, it returns to the document reference position. As will be explained later, automatic exposure (AE) and automatic color selection (ACS) are determined according to the generated histogram data, and a normal scan is started.

Figure 4:
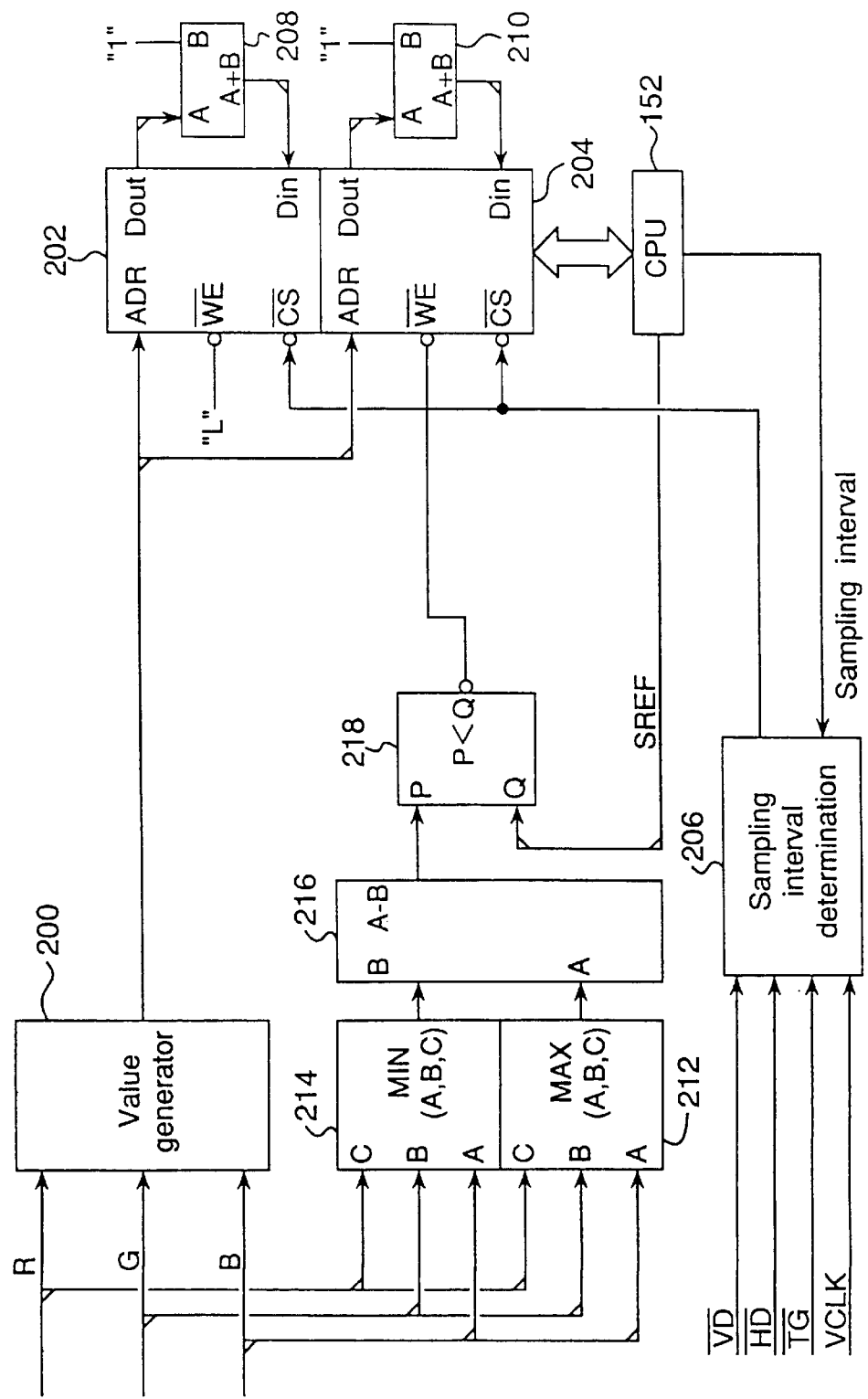
FIG. 4 is a diagram for illustrating sampling in generating a histogram.

Next, generation of histograms in a prescan is explained. FIG. 4 shows the histogram generator 110 which generates histograms in a document area in a prescan. The histogram generator 110 has first and second histogram memories 202 and 204, and before a prescan, the two histogram memories 202 and 204 are initialized by writing "0" thereto at addresses of gradation levels of 0–255. In the histogram generator 110, a value generator 200 receives the 8-bit R, G and B data and converts them to a value signal VH according to a following equation to be sent as an address signal to the first and second histogram memories 202 and 204:

$$VH = 0.31640625*R + 0.65625*G + 0.02734375*B \quad (1)$$

The value signal VH obtained resembles human sensitivity for observing an object. As explained above, the value data VH is used instead of the R, G and B data because the value data are used in the automatic exposure processing, as will be explained later.

A sampling interval circuit 206 determines intervals (a thinning out ratio) for storing data in the histogram memories 202 and 204. This sampling is performed to reduce a memory capacity for prescan. If a histogram of all dots in a maximum document size of A3 is generated, a memory capacity of 32 megabits is needed. Then, in order to reduce the memory capacity to 1 megabits, data are sampled in this example for every eight dots along the main scan direction and for every four dots along the subscan direction for a document 31, as shown in FIG. 5. In FIG. 5A, dots denoted with circles are sampled in an effective document area represented with hatching.

A document size has been detected before a prescan, and the sampling interval circuit 206 receives various signals for sampling from the timing controller 106. Among the signals, signals $\overline{HD}$ and $\overline{VD}$ are generated in a document area along the main scan direction and along the subscan direction. Then, the sampling interval circuit 206 allows generation of a histogram only in the document area determined by the signals $\overline{HD}$ and $\overline{VD}$. A signal $\overline{TG}$ denotes a synchronization clock signal along the main scan direction, and it is generated for each line. A signal VCLK denotes a synchronization clock signal of image data.

As to the histogram memories 202 and 204, a read modify write cycle is performed for a period of eights dots. An address ADR of the histogram memory 202, 204 corresponds to a value data (value gradation level), while a data at the address represents a frequency at the gradation level. When an address ADR is sent to the histogram memories 202, 204, data (frequency) at the address are read, and they are added by adders 208, 210 by one. The sums are written to the histogram memories 202, 204 at the same address. After a prescan is completed, the CPU 152 reads gradation data from the histogram memories 202 and 204 for various processings such as automatic exposure and automatic color selection to be explained later.

Two histogram memories 202 and 204 are used for automatic color selection and for document type determination. It is noted that data on all the dots can be written to the memory 202 because the $\overline{WE}$ input of the first histogram memory 202 is always kept at L level. Thus, the first histogram memory 202 is used to generate a value histogram for a document simply. On the other hand, the second one 204 generates a histogram of achromatic dots in the document. In order to detect an achromatic dot, a minimum circuit 212 and a maximum circuit 214 detect a minimum (MIN) and a maximum (MAX) of input R, G and B data, and a subtraction circuit 216 calculates a difference between them. Then, a comparator 218 compares the difference (MAX−MIN) with a reference level SREF, and if the difference is smaller than the reference level, a data is allowed to be written to the second histogram memory 204.

Automatic color selection and document type determination are performed based on first and second histograms generated in the first and second histogram memories 202 and 204. As explained above, the histograms are generated on the value signals sampled in the effective document area; h1(n) denotes a frequency data at a value level n of the first histogram generated by the first histogram memory 202, while h2(n) denotes a frequency data at a value level n of achromatic dots in the second histogram generated by the second histogram memory 204.

Figure 6:
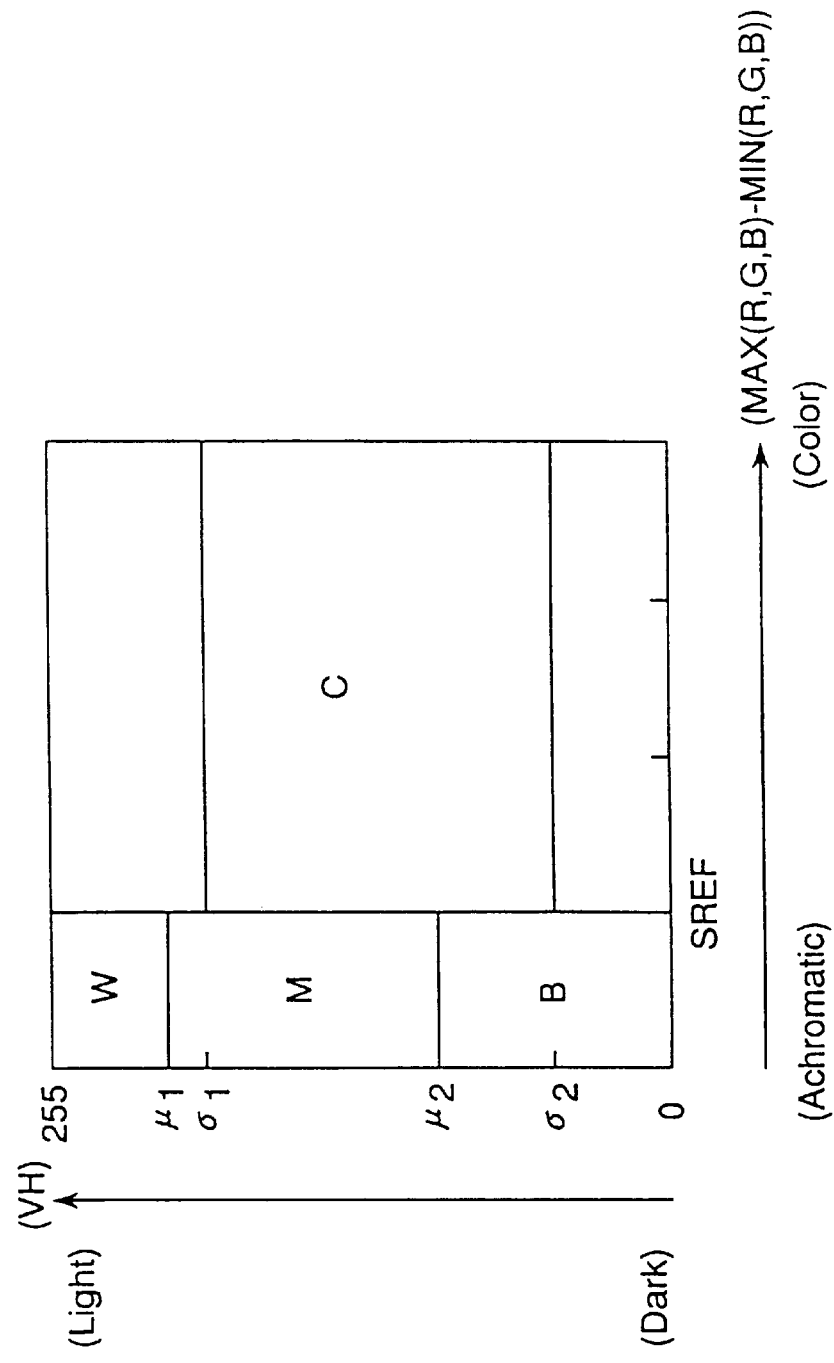
FIG. 6 is a flowchart of automatic color selection.

Many quantities can be derived from the two histograms (h1(n) and h2(n)). Further, the CPU 152 generates a third histogram h3(n)=h1(n)−h2(n) by subtracting a frequency h2(n) of the second histogram memory 204 from a frequency h1(n) of the first histogram memory 202. The third histogram represents a histogram for chromatic dots in a document. As shown in FIG. 6, several quantities can be obtained from the histograms h1(n) and h3(n). A sum W is obtained for levels n between $\mu 1$ and 255 from h1(n), and it represents a number of white dots, where a "dot" denotes each area detected by a linear sensor 36 in a document. That is, W denotes a dot number of the white background in a document. A sum M is obtained for levels n between $\mu 2$ and $\mu 1$ from h1(n), and it represents a number of dots of half-tone (grey) regions. A sum B is obtained for levels n between 0 and $\mu 2$ from h1(n), and it represents a number of dots in black areas. A sum C is obtained for levels n between $\tau 2$ and $\tau 1$ from h3(n) because dots of chromatic colors are counted.

$$W = \sum_{n=\mu 1}^{255} h1(n), \quad (2)$$

$$M = \sum_{n=\mu 2}^{\mu 1} h1(n),$$

$$B = \sum_{n=0}^{\mu 2} h1(n),$$

$$S = \sum_{n=0}^{255} h1(n), \text{ and}$$

$$C = \sum_{n=\tau 2}^{\tau 1} h3(n).$$

In the automatic color selection, the sum C represents a number of dots in a color area in the document obtained from the second histogram h3(n).

Figure 9:
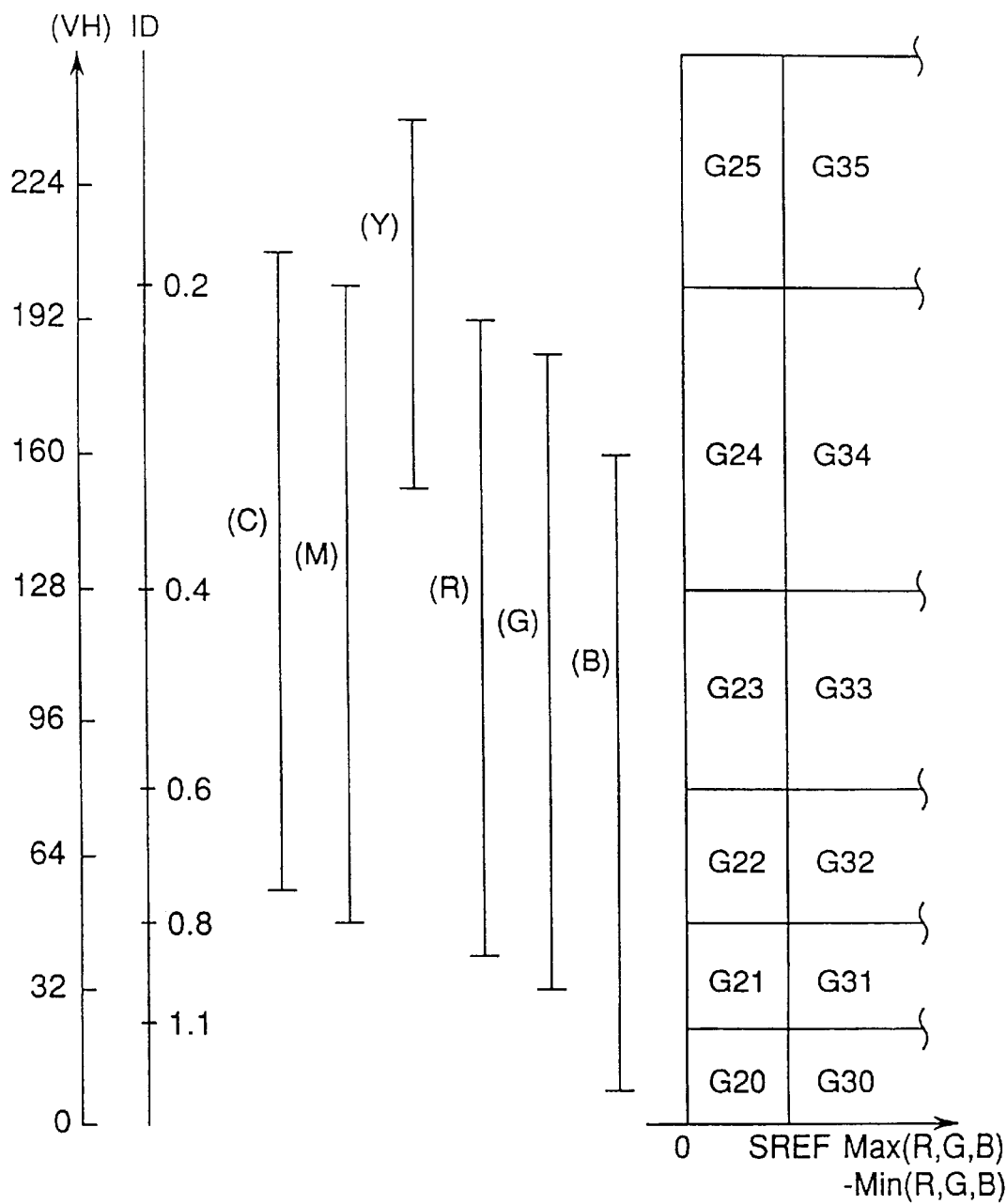
FIG. 9 is a diagram for illustrating value signal and various signals G25–G35.

In the document type determination, as shown in FIG. 9, frequency sums G25–G20 and G35–G30 are obtained in six value ranges from the two histograms h2(n) and h3(n).

E. Automatic Color Selection (ACS)

In the automatic color selection mode, a document put on the platen 31 is discriminated to be a black-and-white document or a color document to determine a copy mode automatically. Then, a color document is subjected to an image forming process of four colors (color copy mode). On the other hand, a black-and-white document is subjected to an image forming process of only black toners (black copy mode), and a copy speed is improved. Especially, when an automatic document feeder is used, even if black-and-white documents and color documents are placed in a mixed way, appropriate copying conditions can be set without manual operation by a user.

In the automatic color selection, a document type (black-and-white document or color document) is determined according to a ratio of dots of achromatic color to dots of chromatic color in a document. In concrete, a ratio of a sum C of chromatic dots to a sum S of the total dots obtained from the histogram is used to determine color copy or black copy. As explained above, C denotes a dot number in the color area obtained from h3(n), and S denotes a total number of dots in a document size. Then, the ratio C/S represents a ratio of chromatic color to (chromatic color plus achromatic color). If C/S is smaller than a reference value SREF, black copy mode is selected because there is if any a small part of chromatic color, while if C/S is larger than the reference value SREF, color copy mode is selected because there is a large part of chromatic color. By using S as a denominator, an effect of document size can be neglected in the automatic color selection.

Figure 7:
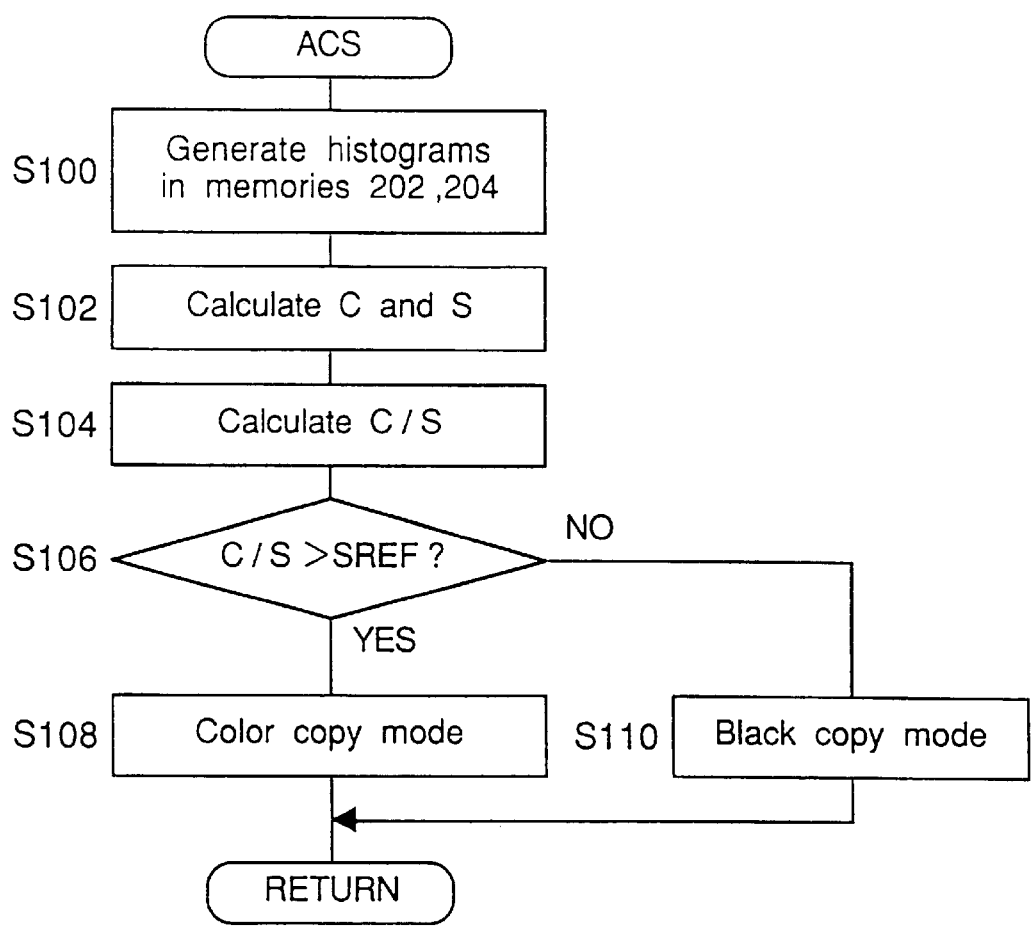
FIG. 7 is a diagram for illustrating various quantities obtained from the histogram.

FIG. 7 shows a flowchart of color selection of the CPU 152. First, the histogram generator 110 generates histograms of value signal in the first and second histogram memories 202 and 204 (step S100). Next, C and S are obtained from the first and second histograms in the memories 202 and 204 (step S102), and a ratio C/S is calculated (step S104). If the ratio C/S is larger than the reference value SREF (YES at step S104), color copy mode is set (step S108), otherwise black copy mode is set (step S110).

E. Determination of Document Type

At a set-up stage of automatic exposure (AE), the CPU 152 determines five document types listed below, according to the information in the histogram memories 202 and 204 and the result of the automatic color selection (ACS) (refer to Table 1).

(1) Black-and-white photograph document: A black-and-white photograph, a black-and-white very precise dot image print, and the like.

(2) Black-and-white standard document: Documents with black characters, black liner images and the like, having a relatively white background.

(3) Color photograph document: A color silver salt photograph, a color image print with very fine dots and the like.

(4) Color standard document (with white background): A document having a relatively white background, including color characters, color linear images.

(5) Color standard document (with colored background): A document having a colored background.

Figure 8:
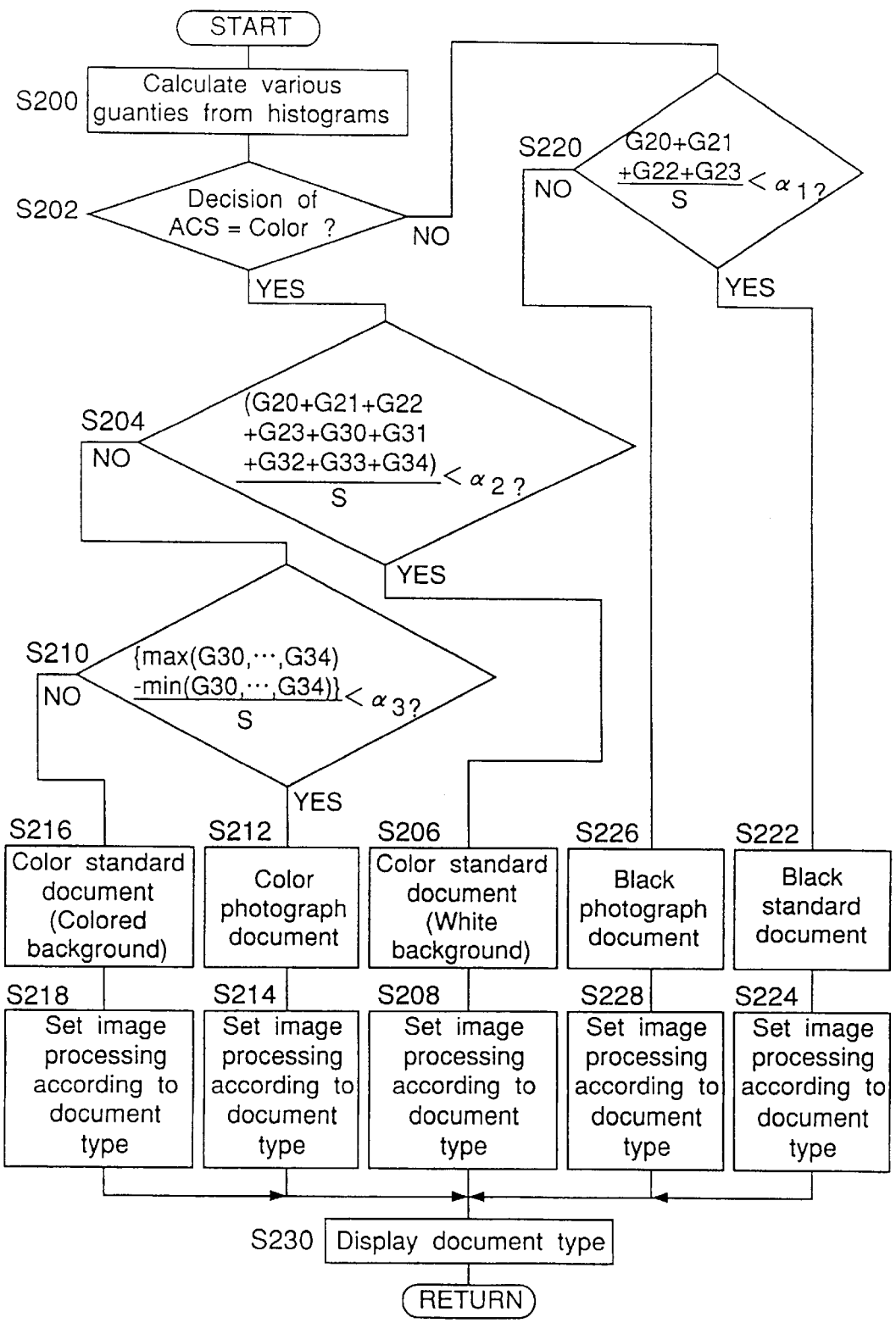
FIG. 8 is a flowchart of decision of document type.
Figures 11, 11A:
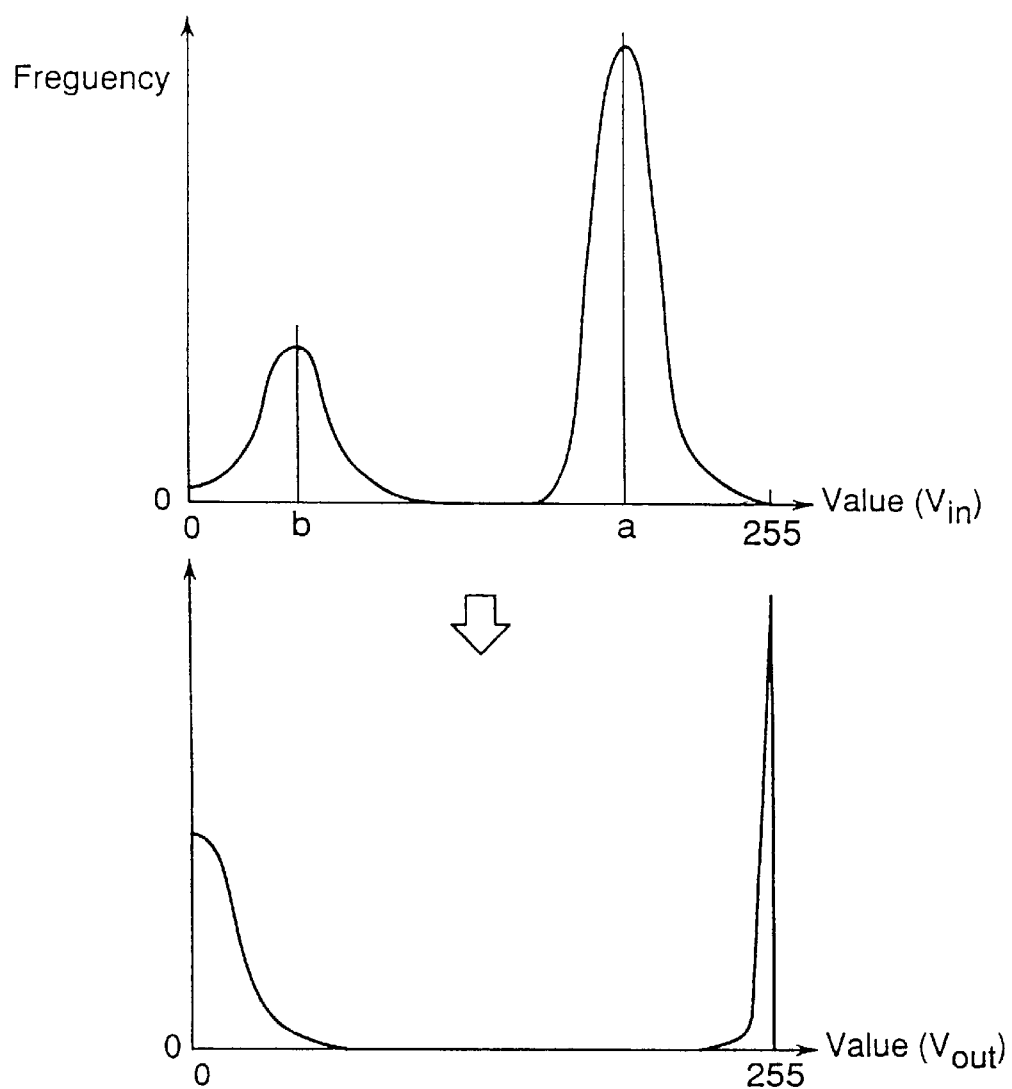
FIGS. 11 and 11A are graphs of a distribution of value before and after automatic exposure on a monochromatic standard document.
Figures 12, 12A:
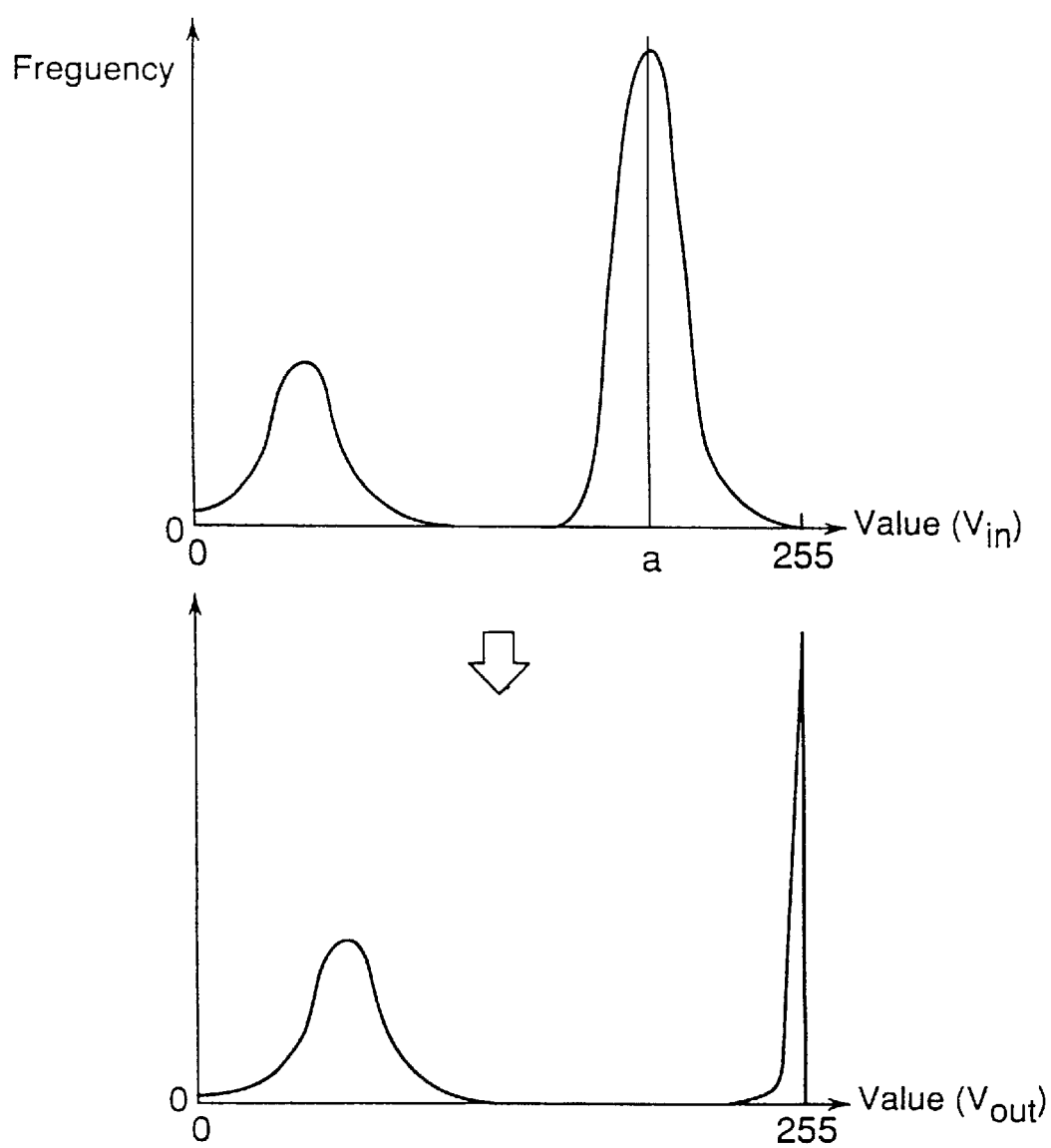
FIGS. 12 and 12A are graphs of a distribution of value before and after automatic exposure on a color standard document having white background.

The document type determination is also based on the histograms (refer to FIG. 8). Concept of document type determination is explained first. As explained above on the automatic color selection, a color document and a black-and-white document are decided according to the ratio of chromatic dots to achromatic dots. That is, if the ratio is larger than the reference value, the document is decided to be a color document, otherwise it is decided to be a black-and-white document. Further, it is decided from the histograms if the document is a photograph document or a standard one. The standard document denotes a document including mainly characters, and a histogram thereof has a bi-level type distribution, as shown in FIGS. 11 and 12, having frequency peaks near levels 0 and 255. A document which have a colored background is also dealt with in this determination. If the histogram has a bi-level type distribution, the document is decided to be a standard document, otherwise it is decided to be a photograph document. In concrete, a number of dots in a density range at the white side is compared with that except the white side, and if the former is larger than a threshold value, the histogram is decided to have a bi-level type distribution, and the document is decided to be a standard document. This decision is effective for a black-and-white document and a color document having a white background. As to a color document, a standard document having a colored background and a color photograph document have to be discriminated. Then, if the histogram has an average distribution over a wide range, the document is decided to be a color photograph document, otherwise it is decided to be a color standard having a colored background. In concrete, a value signal level (0–255) is divided into a plurality of blocks (for example, six blocks for achromatic dots and for chromatic dots in FIG. 9), and frequency sums in the blocks except one or more blocks near the highest value signal are obtained. Then, a difference between the maximum and the minimum among the sums is calculated, and if the difference is smaller than a threshold value, the document is decided to be a photograph document. Otherwise the document is decided to be a document having a colored background.

FIG. 8 shows a flowchart of determination of document type by the CPU 152. First, various sums G25, G24, G23, G22, G21, G20, G35, G34, G33, G32, G31 and G30 defined below are calculated from frequency data h2(n) and h3(n) for achromatic dots and for chromatic dots. Further, a background level "a" and a character level "b" are calculated (step S200). The background level "a" represents a gradation level at the maximum frequency below 0.4 of output data ID in the second histogram memory 204, and the character level "b" represents a gradation level at the maximum frequency above 0.6 of output data ID in the second histogram memory 204 (refer to examples shown in FIGS. 11 and 12).

$$G_{25} = \sum_{n=200}^{255} h2(n), \quad (3)$$

$$G_{24} = \sum_{n=128}^{199} h2(n),$$

$$G_{23} = \sum_{n=80}^{127} h2(n),$$

$$G_{22} = \sum_{n=48}^{79} h2(n),$$

$$G_{21} = \sum_{n=24}^{47} h2(n),$$

$$G_{20} = \sum_{n=0}^{23} h2(n),$$

-continued $$G_{35} = \sum_{n=200}^{255} h3(n),$$

$$G_{34} = \sum_{n=128}^{199} h3(n),$$

$$G_{33} = \sum_{n=80}^{127} h3(n),$$

$$G_{32} = \sum_{n=48}^{79} h3(n),$$

$$G_{31} = \sum_{n=24}^{47} h3(n), \text{ and}$$

$$G_{30} = \sum_{n=0}^{23} h3(n).$$

As shows in the left side of FIG. 9, levels 0–255 of value VH corresponds to the output data ID. The sums G25, G24, G23, G22, G21, G20, G35, G34, G33, G32, G31 and G30 correspond to sums obtained in six ranges of ID of 0.2 or below, 0.2–0.4, 0.4–0.6, 0.6–0.8, 0.8–1.1, 1.1 or above for the histogram h2(n) and the histogram h3(n). The sums G25, G24, G23, G22, G21, G20 are obtained when a value data of MAX−MIN is smaller than the reference value SREF, otherwise the sums G35, G34, G33, G32, G31 and G30 are obtained. It is to be noted in FIG. 9 that ranges shown with legends C, M, Y, R, G and B denote regions wherein VH data exist for colors of cyan, magenta, yellow, red, green and blue.

Next, in order to discriminate the above-mentioned five document types, a photograph document and a document having a colored background are decided. First, it is decided according to the result of the automatic color selection described above if the document is a color document (document types (3)–(5)) or a black-and-white document (document types (1)–(2)) (step S202). If the result of the automatic color selection is a color document (YES at step S202), the flow proceeds to step S204 to discriminate color documents (3)–(5) with a reference number $\alpha 2$. Then, if a ratio of a sum of frequencies of achromatic dots of 0.4 or more of output data ID and those of chromatic dots of 0.2 or more thereof to the sum S of total dots is smaller than is $\alpha 2$ (YES at step S204), the document is decided to be a color standard document having a colored background (step S206). The values of 0.4 or 0.2 correspond to ranges of various colors shown in FIG. 9. Alternately, the former sum or the numerator in the ratio may be replaced with dots in the white background or a sum of frequencies not summed in the former sum. Then, as to image processing, automatic exposure is set, the document mode is set as a color standard mode, black character discrimination is set, and a gradation correction curve for the mode is set (step S208). On the other hand, if the ratio is not smaller than $\alpha 2$ (NO at step S204), it is decided further if a ratio of frequency sums of chromatic colors in a particular frequency block is very large or not (step S210). In concrete, a difference between a maximum and a minimum of sums in frequency blocks G30–G34 for chromatic dots to the sum S of total dots is calculated, and if the ratio is not smaller than a reference value $\alpha 3$ (NO at step S210), the document is decided to be a color standard document having a colored background (step S216) because the image data is not average over all value gradation levels. Then, as to image processing, standard manual exposure is adopted and the exposure level is set at the center as a default value for manual setting, the document mode is set as a color standard mode, black character discrimination is set and a gradation correction curve for the mode is set (step S218). On the other hand, if the ratio is smaller than a reference value $\alpha 3$ (YES at step S210), the document is decided to be a color photograph document (step S212) because the image data is average over all value gradation levels. Then, as to image processing, photograph manual exposure is adopted and exposure level is set at the center as a default, the document mode is set as a color photograph mode, black character discrimination is not set, and a gradation correction curve is not changed (step S214).

If the result of the automatic color selection is decided not a color document (NO at step S202), the flow proceeds to step S220 to discriminate color documents (1)–(3). with a reference number $\alpha 1$. Then, if a ratio of a sum of frequencies of achromatic dots of 0.4 or more of output data ID to the sum S of total dots is smaller than $\alpha 1$ (YES at step S220), the document is decided to be a black-and-white photograph document (step S222). Then, as to image processing, photograph manual exposure is adopted and the level is set at the center as a default value, the document mode is set as a black photograph mode, black character discrimination is not set, and a gradation correction curve is not changed (step S224). On the other hand, if the ratio is not smaller than is $\alpha 1$ (NO at step S220), the document is decided to be a black-and-white standard document (step S226). Then, as to image processing, automatic exposure is set, the document mode is set as a black standard mode, black character discrimination is not set, and a gradation correction curve for the mode is changed (step S228).

Finally, the result of decision of document type is displayed in the basic operation picture (refer to FIG. 3) of the operational panel 154 (step S230). Because document type is displayed in the operational panel 154, a user can recognize the result of decision readily. If this were not displayed, a user may become uneasy.

In the processing explained above, five document types (1)–(5) can be decided, and image processing is set according thereto. Table 1 shows contents of automatic color selection (ACS), image processing and document mode, and Table 2 shows background processing in the modes.

TABLE 1

Document type and image processing

| Document type | ACS | Background | Black characters discrimination | Gradation change | Document mode |
|---|---|---|---|---|---|
| Color standard (colored background) | Color | Manual (Standard) Center | Yes | Yes | Color standard |
| Color standard (white background) | Color | AE | No | Yes | Color standard |
| Color photograph | Color | Manual (Photograph) Center | Yes | No | Color photograph |
| Black-and-white standard | Black | AE | No | Yes | Black standard |

TABLE 1-continued

Document type and image processing

| Document type | ACS | Background | Black characters discrimination | Gradation change | Document mode |
|---|---|---|---|---|---|
| Black-and-white photograph | Black | Manual (Photograph) Center | No | No | Black Photograph |

TABLE 2

Background processing

| | | Black: Vout = 256* (Vin-8-b)/{(a-8) -b} |
|---|---|---|
| AE | | Color: Vout = 256* (Vin-8)/(a-8) |
| Manual level | +2 | Color standard: Vout = 256* (Vin-8)/(256-8) |
| | | Black standard: Vout = 256* (Vin-16)/(256-16) |
| | | Photograph: Vout = 256* (Vin-8)/(256-8) |
| | +1 | Color standard: Vout = 256* (Vin-8)/(240-8) |
| | | Black standard: Vout = 256* (Vin-16)/(240-16) |
| | | Photograph: Vout = 256* (Vin-8)/(244-8) |
| | ±0 | Color standard: Vout = 256* (Vin-8)/(224-8) |
| | | Black standard: Vout = 256* (Vin-16)/(224-16) |
| | | Photograph: Vout = 256* (Vin-8)/(232-8) |
| | −1 | Color standard: Vout = 256* (Vin-8)/(208-8) |
| | | Black standard: Vout = 256* (Vin-16)/(208-16) |
| | | Photograph: Vout = 256* (Vin-8)/(220-8) |
| | −2 | Color standard: Vout = 256* (Vin-8)/(192-8) |
| | | Black standard: Vout = 256* (Vin-16)/(192-16) |
| | | Photograph: Vout = 256* (Vin-8)/(208-8) |
| | −3 | Color standard: Vout = 256* (Vin-8)/(176-8) |
| | | Black standard: Vout = 256* (Vin-16)/(176-16) |
| | | Photograph: Vout = 256* (Vin-8)/(196-8) |
| | −4 | Color standard: Vout = 256* (Vin-8)/(160-8) |
| | | Black standard: Vout = 256* (Vin-16)/(160-16) |
| | | Photograph: Vout = 256* (Vin-8)/(184-8) |
| | −5 | Color standard: Vout = 256* (Vin-8)/(144-8) |
| | | Black standard: Vout = 256* (Vin-16)/(144-16) |
| | | Photograph: Vout = 256* (Vin-8)/(176-8) |

In an example of the determination of document type described above, automatic color selection is performed first to determine a color document and a black-and-white document. Then, a standard document (including a document with a white background and with a colored background) and a photograph document are decided next. However, the determination of document type may be performed in a different way. For example, if the existence of the background is determined according a frequency sum in the same value range is adopted in a step in correspondence to steps S204 and 220, it is possible to determine a standard document (having a white background) and a photograph document independently of the determination of a color document or a black-and-white document.

F. HVC Conversion and HVC Control

The copying machine of the embodiment processes image data by using conversion of data of red (R), green (G) and blue (B) to HVC data. The HVC converter 114 has a matrix operator for converting the R, G and B data to value signal (V) and two kinds of color difference signals (Cr and Cb).

$$\begin{pmatrix} V \\ Cr \\ Cb \end{pmatrix} = \begin{pmatrix} 0.31640625 & 0.65625 & 0.02734375 \\ 1 & -0.9609375 & -0.0390625 \\ -0.32421875 & -0.67578125 & 1 \end{pmatrix} * \begin{pmatrix} V \\ Cr \\ Cb \end{pmatrix}. \quad (4)$$

Three attributes of value, chroma and hue of image are obtained as follows by using the signals V, Cr and Cb:

Value=V,

Chroma=$(Cr^2+Cb^2)^{1/2}$, and

Hue=arc tan (Cb/Cr). (5)

The conversion to signals V, Cr and Cb is used to improve image quality by adopting processing similar to human sense and to facilitate processing needed later such as image synthesis, automatic exposure and HVC adjustment.

The HVC converter 114 send signals to the edition processor 118 as well as to the image synthesis section 124. The edition processor 118 performs edition of image such as color change. In the image synthesis section 124, the signals received from the HVC converter 114 are stored once in a delay memory 116 so as to synchronize them with image signals received from the edition processor 118. Then, the image synthesis section 124 synthesizes the output data V, Cr and Cb received from the delay memory 116 with the output data V, Cr and Cb of the edition processor 118 received through the image selector 126. Image synthesis performed by the image synthesis section 124 includes for example synthesis by adding the two images and synthesis of characters.

Figure 10:
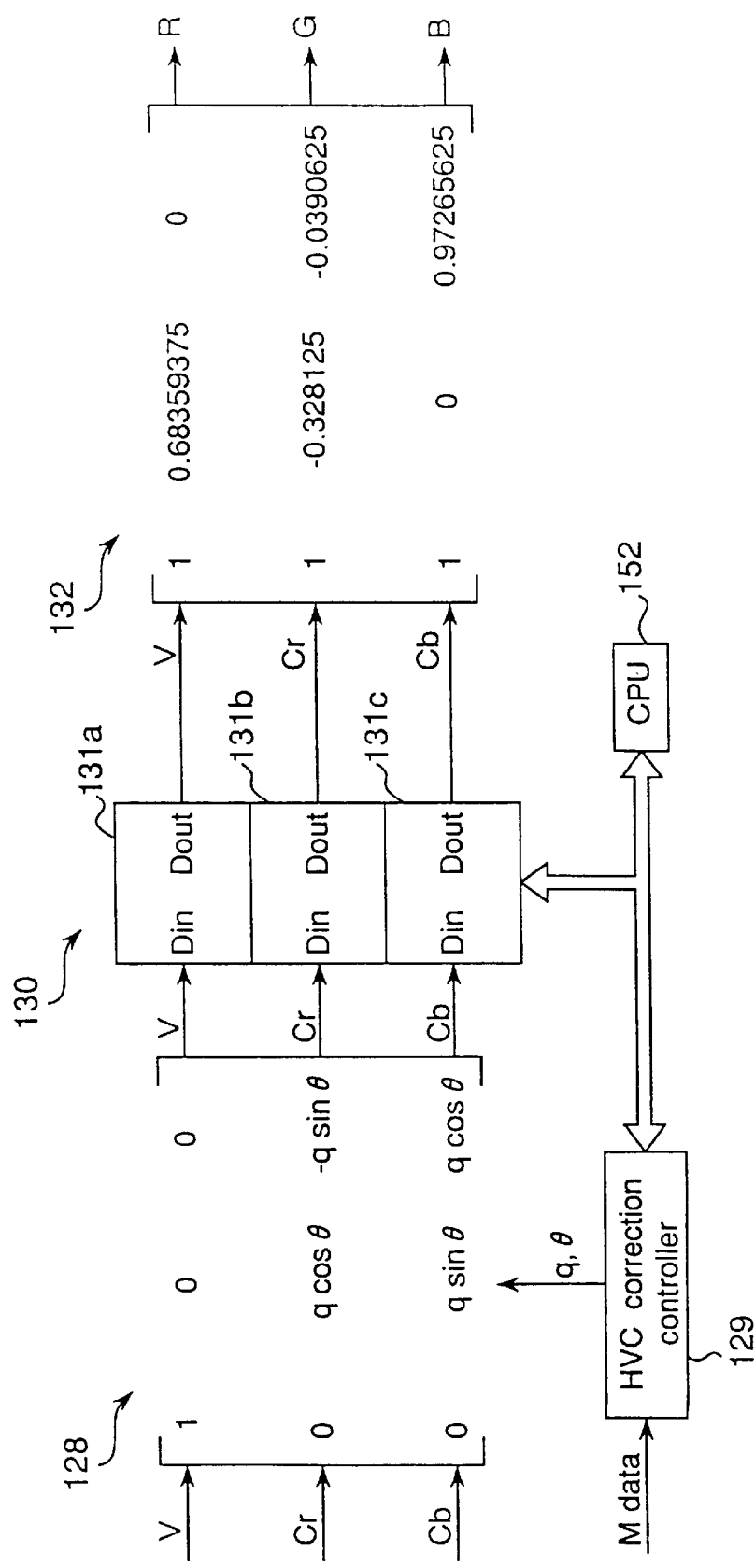
FIG. 10 is a block diagram of an HVC controller, an automatic exposure processor and a reverse HVC converter.

The HVC correction unit 128 shown in FIG. 10 is provided for controlling image quality. In order to control image for each of receive signals H, V and C, the HVC correction unit 128 comprises a matrix operator 128a for performing a matrix operation as shown below.

$$\begin{pmatrix} V \\ Cr \\ Cb \end{pmatrix} = \begin{pmatrix} 1 & 0 & 0 \\ 0 & q*\cos\theta & -q*\cos\theta \\ 0 & q*\sin\theta & q*\cos\theta \end{pmatrix} * \begin{pmatrix} V \\ Cr \\ Cb \end{pmatrix}. \quad (6)$$

wherein "q" denotes a chroma control coefficient and θ denotes a hue control coefficient. These coefficients are output by the HVC correction unit 128 wherein they are selected among eight groups of coefficients according to 3-bit M data signal set by a user with the operational panel 154. Thus, the image can be corrected by a user.

H. Automatic Exposure (AE)

Background processing is explained as an example of a processing using document type determined in a prescan. In this embodiment, value signal VH which resembles human luminous efficiency (brightness) is generated. Then, histograms of the value signal VH are generated, as explained before, and document type is decided by using the histograms. The background can be processed automatically according to the document type without changing color balance of a full color document. It can also be processed appropriately without special adjustment for a document including color and black images therein by discriminating the areas of the color and black images in a prescan. Image signals R, G and B are once converted to signals V, Cr and Cb, and automatic exposure is performed on the signals V, Cr and Cb. Then, the signals V, Cr and Cb are converted again to image signals R, G and B. Thus, the background level can be adjusted appropriately in the automatic exposure be determining it uniquely both on the full color mode and on the black mode. In the full color mode, because color component signals Cr and Cb are not subjected to any processing, color balance is not affected by the automatic exposure.

In concrete, background adjustment is performed by automatic exposure or by setting an exposure level manually. In the basic picture shown in FIG. 3, a user can select automatic exposure or a manual setting of an exposure level among eight levels. In the automatic exposure, five document types are discriminated according to document histogram information obtained in a prescan of a document, as explained above. As shown in FIG. 8, if the document type is color standard document (with white background) or black-and-white document, value gradation level is corrected as shown in FIGS. 11 and 12, while as to the other three document types, the center level of manual setting is set automatically as a default level (refer to Table 1).

In the automatic exposure section 130, background is deleted according to document type determined with the histogram generator 110. As to two document types of color standard document (white background) and black-and-white document, a look up table (AE table) 131a on value signal is used to obtain a value signal $V_{out}$ after automatic exposure bases on an input value signal $V_{in}$ before automatic exposure according to correction formulas explained below. That is, as to document type of black-and-white document, $$V_{out}=256*(V_{in}-b-8)/\{(a-8)-b\}, \quad (7)$$

and, as to document type of color standard document (with white background), $$V_{out}=256*(V_{in}-8)/(a-8), \quad (8)$$

wherein "a" denotes background level and "b" denotes character level. As to a black-and-white document, background is removed, and characters with light densities are made darker, as shown in FIGS. 11 and 11A. That is, value signal between a+8 to b is expanded in a wider range between 0 and 255 so as to delete input signals $V_{in}$ below a+8 and above b. On the other hand, as to a color document with white background, only the background is removed. That is, as shown in FIGS. 12 and 12A, value signal between 8 to b is expanded in a wider range between 0 and 255 so as to delete input signals $V_{in}$ above b. In this example, levels for deleting background are set at 0–8.

The background level "a" and the character level "b" are determined as described below. By using the value histogram h1($n$) on the entire document obtained in the first histogram memory 202, a gradation level "m" having the maximum frequency h1($m$) is determined in a range of n=136–255 (or ID of 0.4 or less). Then, "a" is set as m–8, and background value is set as 255. The histogram distribution around the level "m" will have a normal distribution with a scattering, and the scattering is set as ±8 in this example to delete gradations around the level "m" surely by setting "a" as m–8. Similarly, only for a black-and-white document, a gradation level "l" having the maximum frequency h1($l$) is determined in a range of n=0–120 (or ID of 0.4 or more). Then, "b" is set as l+8, and value of a character is set as 0. Gradation around the level "l" can be made black surely by setting "b" as l+8. As to a color standard document with white background, "b" is not used for automatic exposure because characters may not necessarily be black.

Because color difference signals Cr and Cb or color information are not changed (or $D_{in}=D_{out}$ in tables 131b and 131c) in the automatic exposure section 130, only darkness (V) is controlled, and color balance is not affected. That is, background level is controlled automatically without changing color information of a color document.

In the manual setting mode using the operational panel 154, value signal is corrected to change background level. As shown in FIG. 3, seven levels from +2 to +1 and from –1 to –5 can be set manually at dark and light sides with respect to the center level (0). The steps at positive (dark) side means enhancement of background, while those at negative (light) side means deletion of background. Table 2 shows examples of background processing at each level from +2 to –5 for mode of the three document types: color standard mode, black standard mode and photograph mode.

When a document includes a color area and a black area, it is desirable that gradation expression after background processing is continuous between the areas. Then, beside the histogram analysis, features of input image are extracted in a prescan to determine image areas in a document. In an image area of color standard document type, gradation correction is performed according to Eq. (9), and in an image area of black-and-white standard document type, gradation correction is performed according to Eq. (8). Because Eqs. (8) and (9) are similar to each other, gradation expression becomes smooth even if background is processed differently in the two types of areas.

The black character discrimination (color blur) processing by the MTF correction section 148 is another image processing performed in correspondence to document type. As shown in Table 1, this processing is performed on a color standard document in order to optimize image reproduction of black characters when a color image and a black-and-white image are included in a document. First, in an area on which the area discrimination section 146 decides to be an edge, the data of cyan, magenta and yellow are decreased, while the data of black is increased for edge emphasis to broaden the characters somewhat by adding a value data V to 100% of the black data Bk.

The reverse HVC converter 132 converts the signals V, Cr and Cb again to signals R, G and B by using a following an inverse matrix operation:

$$\begin{pmatrix} R \\ G \\ B \end{pmatrix} = \begin{pmatrix} 1 & 0.68359375 & 0 \\ 1 & -0.328125 & -0.0390625 \\ 1 & 0 & 0.97265625 \end{pmatrix} * \begin{pmatrix} V \\ Cr \\ Cb \end{pmatrix}. \quad (9)$$

After this reverse conversion, data processing can be performed on data of three primary colors.

G. Region Discrimination (G-1) Correction of Phase Shift

Figure 13B:
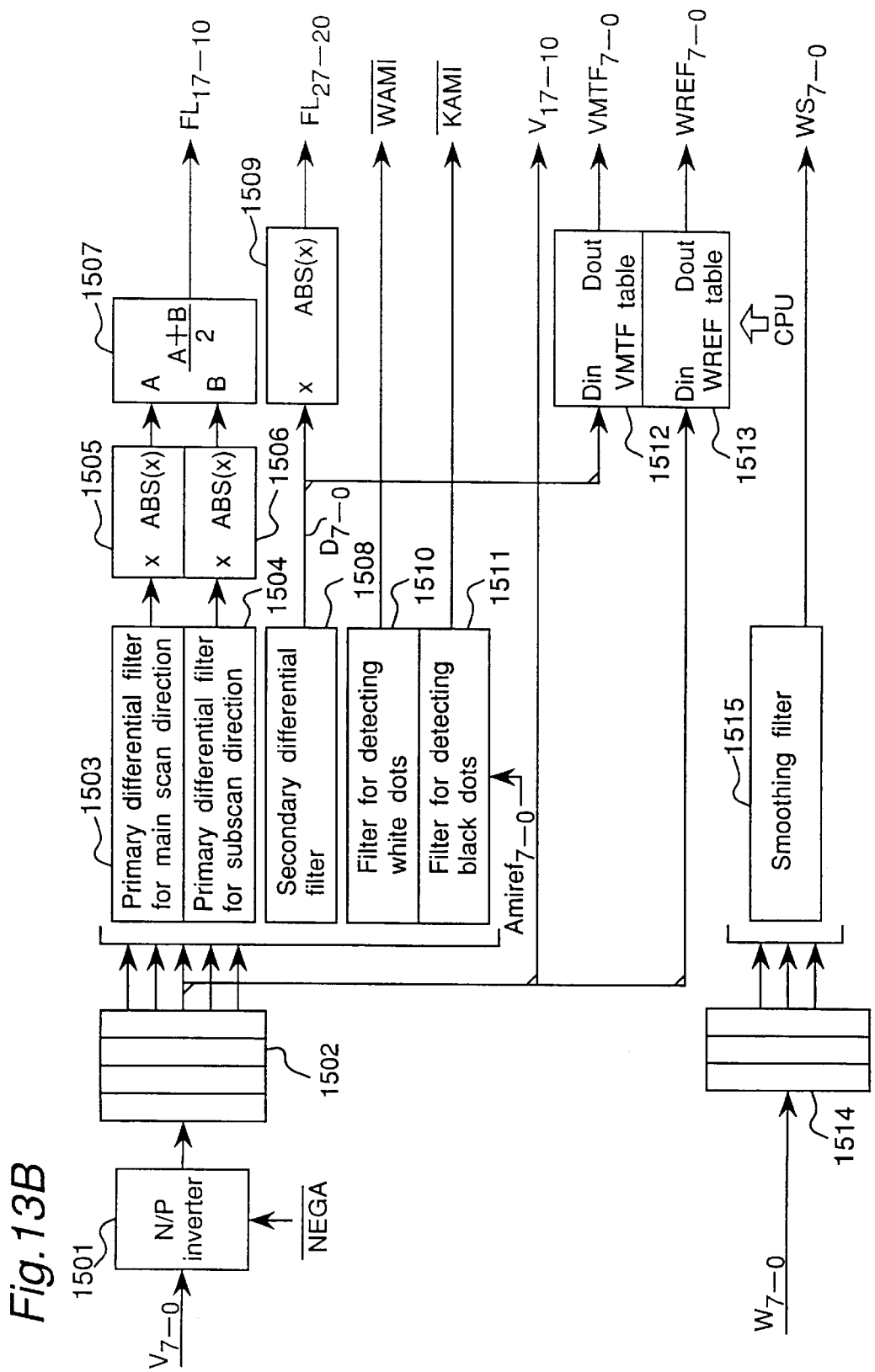
Figure 13C:
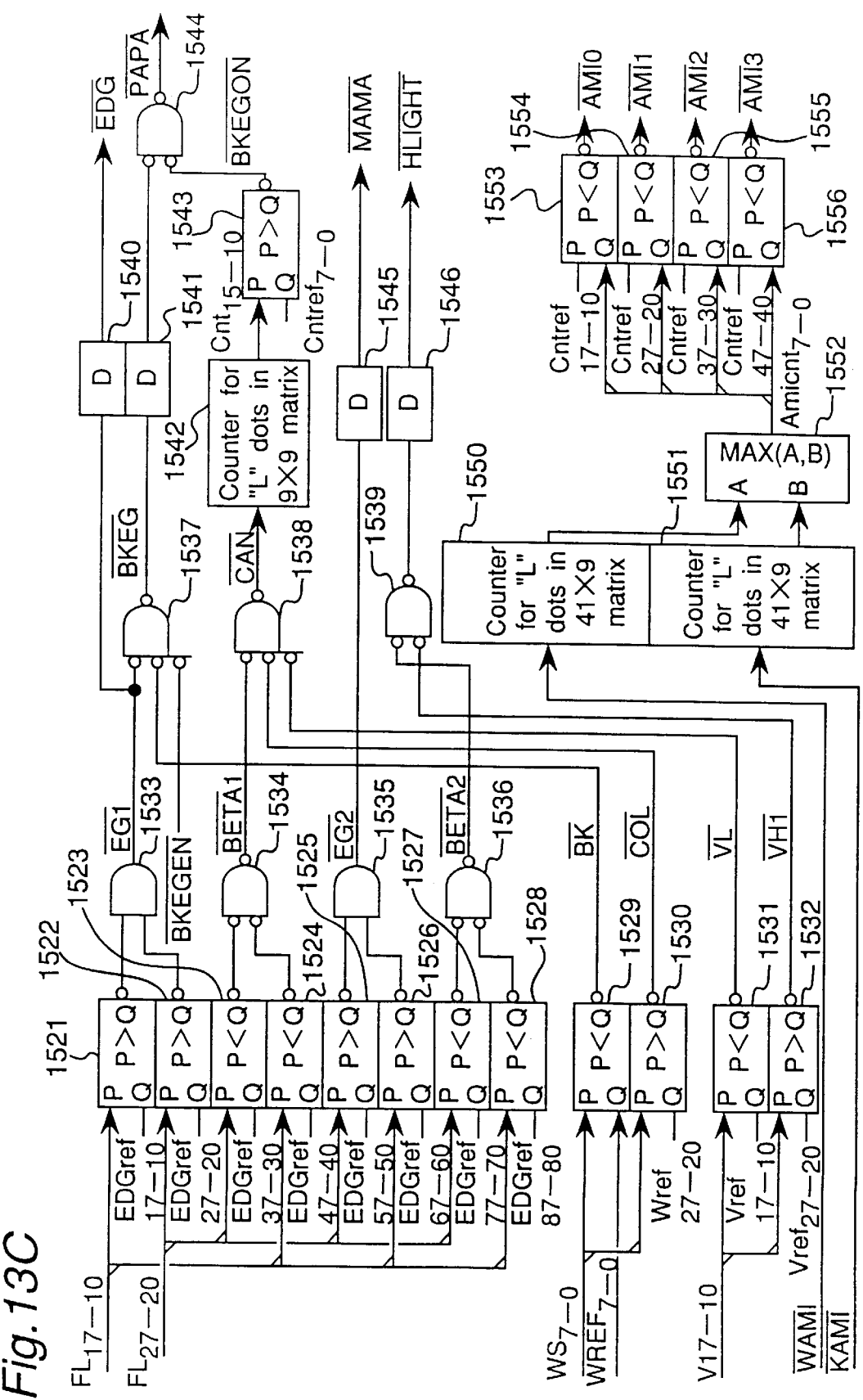

FIGS. 13A–13C show the region discriminator 146. In a part shown in FIG. 13A, pseudo-chroma data $W_{7-0}$ and pseudo-value data $V_{7-0}$ used for discrimination are generated from the R, G and B data received from the reverse HVC converter 132. The pseudo-chroma data $W_{7-0}$ is generated as a difference of the maximum from the minimum, or, MAX(R, G, B)–MIN(R, G, B), of the R, G and B data. That is, a color image having high chroma has a large W, while an achromatic or monochromatic image having low chroma has a small W.

Figure 14:
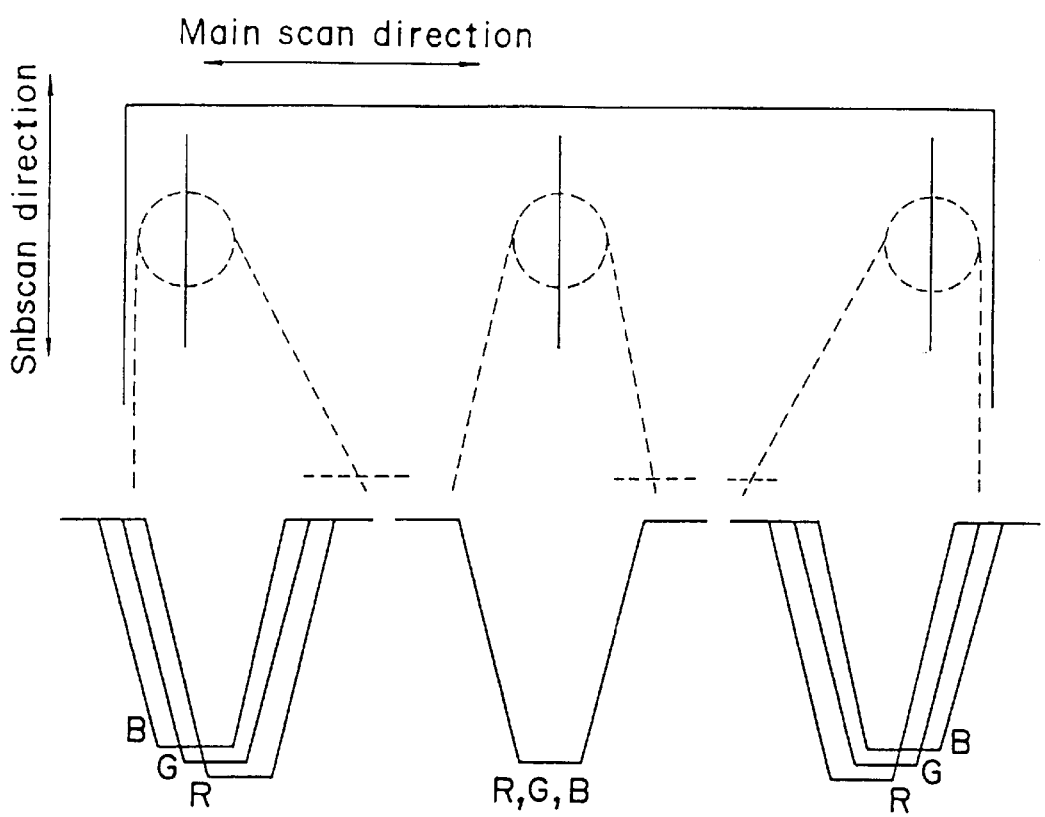
FIG. 14 is a diagram for explaining correction of phase shift due to color aberration.

In the part shown in FIG. 13A, phase shift due to color aberration of the R, G and B data are corrected before determining the chroma data. Red light has longer wavelength components, and blue light has shorter wavelength components. As shown in FIG. 14, color aberration of an optical system arises at two ends along the main scan direction. When a vertical line existing at the center of the image is read, as shown at the center in FIG. 14, no color aberration occurs. However, when vertical lines existing near the two ends of the image are read, as shown at the right and left in FIG. 14, color aberration occurs at the ends of the lens 34. The light R of longer wavelengths is converged at an inner side, while light B of shorter wavelengths is converged at an outer side, in contrast to the line image at the central portion of the lens. Thus, phases of R, G and B of an image are shifted on the color sensor 36. Color aberration causes color shifts at edges of a character image. Especially, an edge of a black character is liable to be discriminated erroneously. Then, for example, colors may extend around a character, or a character may be cut into parts.

In order to correct the phase shift, phase correctors 1461–1464 are provided as shown in FIG. 13A to correct four kinds of color aberration states. For example, the phase corrector 1461 outputs $¼*R(n+1)+¾*R(n)$ for an n-th red data R(n) and $¾*B(n)+¼*B(n−1)$ for an n-th blue data B(n). The other phase correctors 1462–1464 have different predetermined correction coefficients for replacing with R(n) and B(n). The correction of the R, G and B color data for color aberration is shown below. (1) For a shift of ¼ dot at the reference side in the main scan direction, $$R(n)=0.25*R(n+1)+0.75*R(n),$$

$$G(n)=G(n),$$

and $$B(n)=0.75*B(n)+0.25*B(n-1). \quad (10)$$

(2) For a shift of ⅛ dot at the reference side in the main scan direction, $$R(n)=0.125*R(n+1)+0.875*R(n),$$

$$G(n)=G(n),$$

and $$B(n)=0.875*B(n)+0.125*B(n-1). \quad (11)$$

(3) At the center in the main scan direction, $$R(n)=R(n),$$

$$G(n)=G(n),$$

and $$B(n)=B(n). \quad (12)$$

(4) For a shift of ⅛ dot at the opposite side to the reference side in the main scan direction, $$R(n)=0.875*R(n)+0.125*R(n-1),$$

$$G(n)=G(n),$$

and $$B(n)=0.125*B(n+1)+0.875*B(n). \quad (13)$$

(5) For a shift of ¼ dot at the opposite side to the reference side in the main scan direction, $$R(n)=0.75*R(n)+0.25*R(n-1),$$

$$G(n)=G(n),$$

and $$B(n)=0.25*B(n+1)+0.75*B(n). \quad (14)$$

In FIG. 13A, chroma detectors 1465–1469 calculate pseudo-chroma data which is equal to a difference of the maximum from the minimum of R, G and B data of the phase correctors 1461–1464. Then, a data selector 1471 selects the minimum data among the differences to output it as the pseudo-chroma data corrected for color aberration.

This correction is based on that there are no phase shifts of R, G and B lights when color aberration is corrected and that {MAX(R, G, B)−MIN(R, G, B)} will become minimum when there are no phase shifts of R, G and B. According to the color aberration characteristics, the direction of the phase shift of the R sensor is opposite to that of the B sensor, as shown in FIG. 14, and the amount of the phase shift is about the same for the R and B sensors. Then, at the reference side in the main scan direction, R data is shifted by +1/n dot, and B data is shifted by −1/n dot where n=4 or 8. On the other hand, at the opposite side to the reference side in the main scan direction, R data is shifted by −1/n dot, and B data is shifted by +1/n dot. Five chroma data for different n's are calculated, and the data nearest to the achromatic color among them is selected as the chroma data W.

On the other hand, a pseudo-value data generator 1470 generates the minimum data MIN(R, G, B) as the pseudo-value data $V_{7-0}$. Because the minimum data MIN(R, G, B) is used as the pseudo-value data $V_{7-0}$, the dependence on the colors of a document can be vanished as to the determination of a black character, an edge in a dot image or an isolated dot. The color in R, G and B data having the minimum data corresponds to a color component having the highest density among them. Therefore, the color has gradation level characteristic similar to colors such as yellow having a high value and to black or colors such as blue having a low value. Therefore, an edge or an isolated point can be detected without affected by the chroma and hue in contrast to the processing using the original value data. By using the corrected pseudo-chroma data, scattering of read data due to the lens can be neglected.

(G-2) Adjustment of Reference Levels

Figure 15:
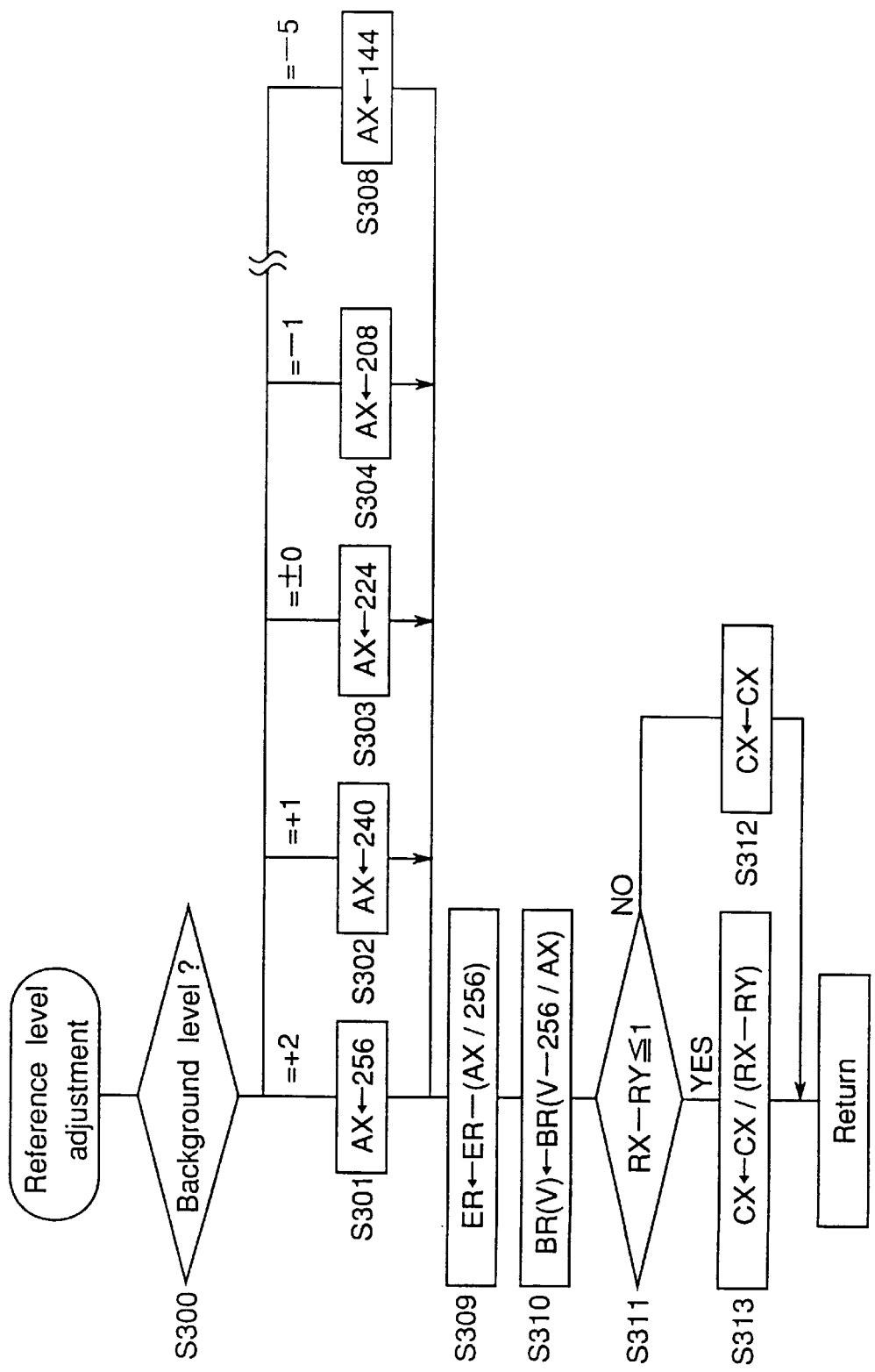
FIG. 15 is a flowchart on the adjustment of background level.

FIG. 15 shows a flowchart for automatic adjustment of the reference level for area discrimination for black edge and dot area according to image forming conditions specified by a user. First, the flow branches according to the background level (step S300). According as the background level is +2, +1, 0, −1 or −2, the adjustment value AX for background level is set at 256, 240, 224, 208 or 144 (step S301–S308).

Figure 16:
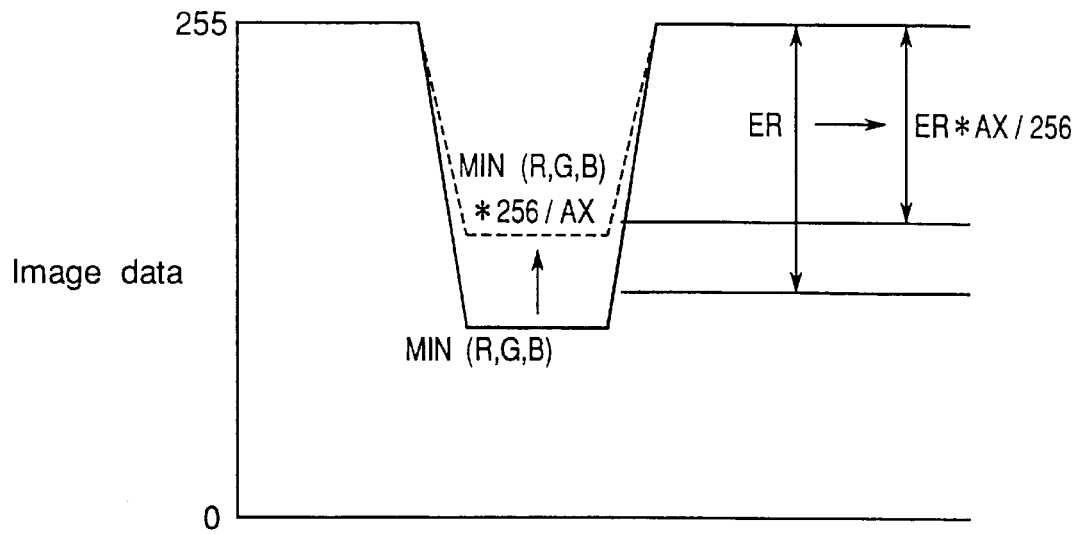
FIG. 16 is a diagram of an example of adjustment of edge reference level.

Then, edge reference ER is set as ER*(AX/256) (step S309). Thus, the edge reference ER (such as $EDGREF_{17-10}$, $EDGREF_{27-20}$, $EDGREF_{37-30}$ or $EDGREF_{47-40}$ for the comparators 1521–1524 shown in FIG. 13C) for detecting an edge in an image is changed with the automatic exposure level or the background value set manually described above on the automatic exposure. FIG. 16 shows an example of the control of the edge reference level ER. This as due to a fact that an edge of a character is determined by a line contrast relative to the white reference level (gradation level 255). Needless to say, the edge reference for the secondary differential filter can also be changed automatically.

Figure 17:
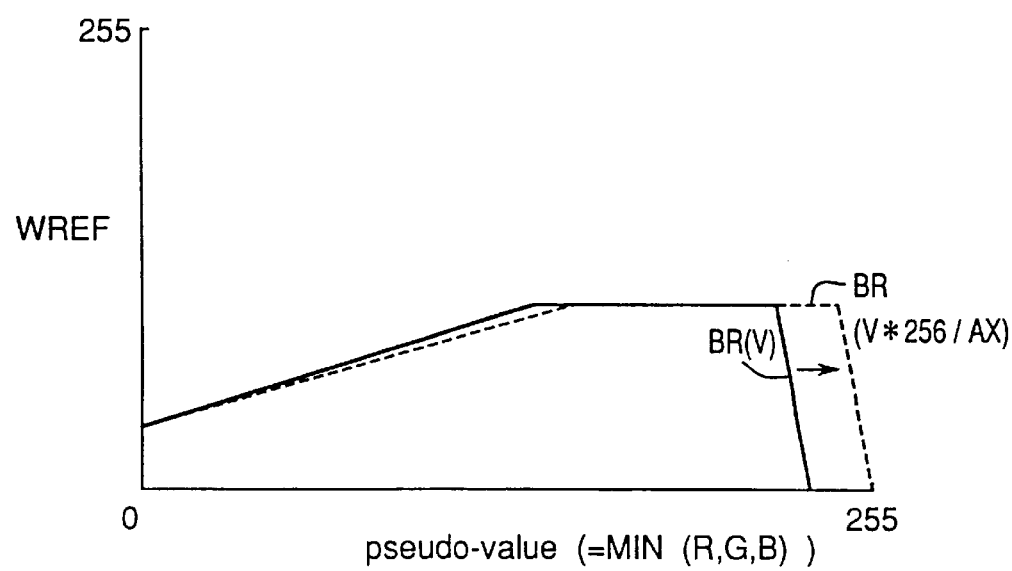
FIG. 17 is a diagram of an example of adjustment of chroma reference level.

Next, the WREF table (1513 in FIG. 13B) for determining the reference level for black character discrimination is also controlled automatically. The reference BR(V) or WREF for a WREF table as a function of pseudo-value data V of MIN(R, G, B) is a reference level for chroma data when the background level is 255. The BR(V) is set as BR(V)* (V*256/AX) for the background level AX (step S310). FIG. 17 shows an example of the reference level control of the WREF table.

Next, it is decided if RX*RY is equal to or less than 1 (step S311), where RX and RY represent magnifications in the main scan direction and in the subscan direction. In other words, it is decided whether the image is reduced or not. When the image is reduced (YES at step S311), the reference level $Cntref_{27-20}$ for a comparator 1554 (FIG. 13C) used for binarization for the number of isolated points (refer to FIG. 13C) is changed to copy magnification. That is, if the reference level $Cntref_{27-20}=CX$, $Cntref_{27-20}$ is set as CX/(RX*RY) (step S312) to be set for the comparator 1554 for deciding the number of isolated points. If the image is not reduced (NO at step S311), the level CX is not changed (step S312). When an image is enlarged, it becomes difficult to detect dots. However, when an image is enlarged, the resolution for reading is increased, and a Moire pattern tends not to be liable to happen even if this correction is not operated. Therefore, it is not needed to change the level CX.

FIGS. 13B and 13C are block diagrams of the region discriminator 146 which discriminates black character areas and dot image areas in a document image. The discrimination of black characters comprises four steps of (a) detection of a character (edge), (b) detection of black pixel, (c) detection of a region which is liable to be detected as black, and (d) generation of black edge reproduction signal which is performed by the MTF corrector 148. The first to third steps are explained below in detail.

(G-3) Detection of Character (Edge)

First, detection of a character (edge) is explained in detail. A character has two elements of edge parts and uniform parts interposed by edge parts. If a character is thin, it has only edge portions. Then, the existence of a character is decided by detecting edges.

In the region discriminator 146 shown in FIG. 13A, the value signal $V_{7-0}$ generated by the HVC converter 114 is received through a negative/positive inverter 1501 to a line memory 1502. If $\overline{NEGA}$ signal set by an operator with the operational panel is L level, the inverter 1501 inverts the input data.

Figure 21A:
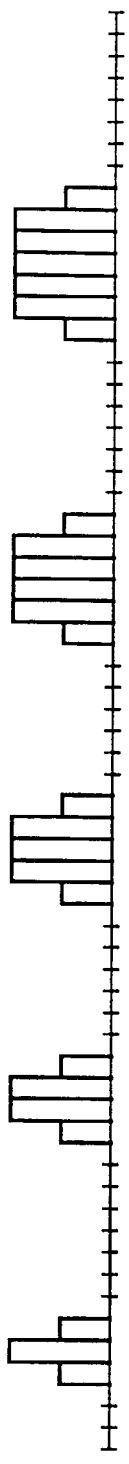
FIG. 21A is a graph of value distribution of five lines with different size from each other.
Figure 21B:
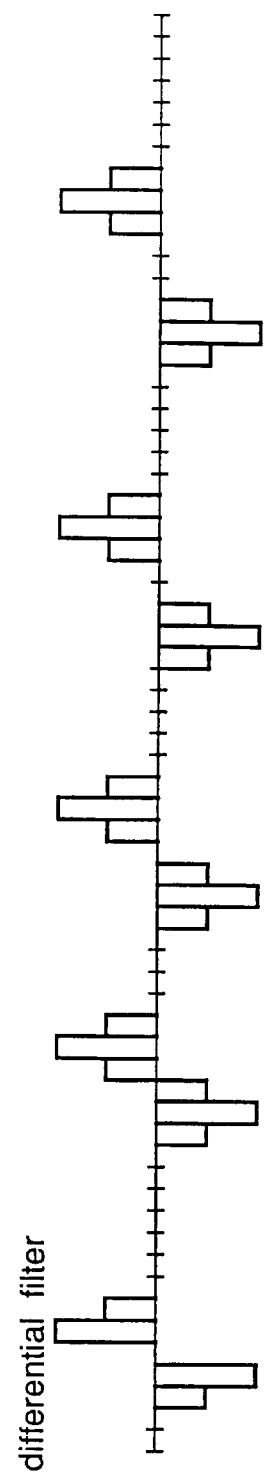
FIG. 21B is a graph of primary differentials for the five lines.
Figure 21C:
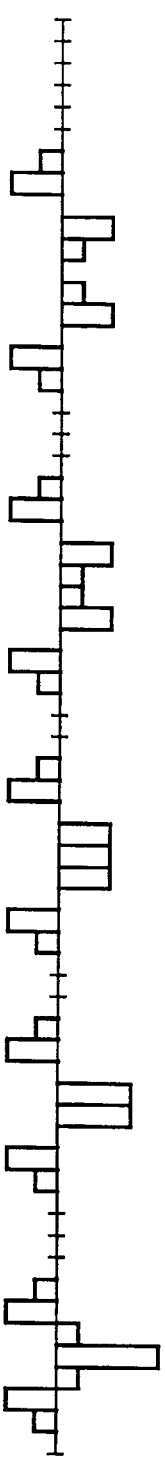
FIG. 21C is a graph of secondary differentials for the five lines.

The data in the line memory is sent to primary differential filters 1503 and 1504 shown in FIGS. 18 and 19 for the main scan direction and for the subscan direction each having a 5*5 matrix and to a secondary differential filter 1508 shown in FIG. 20. In this embodiment, edges are detected with two kinds of differential filter because each has a feature. FIG. 21A shows value (lightness) distribution of five lines with different size from each other. Further, FIG. 21B shows primary differentials for the five lines, and FIG. 21C shows secondary differentials for the five lines. The primary differential filter outputs a higher detection value than the secondary one at an edge of a thick line (of a width of four pixels or larger). That is, the primary differential filter is suitable for detecting a thick edge of a width of four pixels or larger, while the secondary differential filter is suitable for detecting a thin edge of a width less than four pixels. In the region discriminator 146, an edge of a character is detected if at least one of the primary and secondary filters outputs a value larger than a threshold value. Then, the detection precision of edge can be maintained irrespective of a width of a line.

The primary differential filters 1503 and 1504 along the main scan direction and along the subscan direction receive data read from the line memory 1502. The obtained differentials are sent to absolute value circuits 1505 and 1506 to obtain absolute values thereof. The absolute values are needed because the primary differential filters 1403 and 1504 have negative coefficients. Then, an operator 1507 receives the absolute values and outputs an average $FL_{17-10}$ thereof. The average is used to take two differentials along the two directions into account. The average $FL_{17-10}$ of the first differentials is sent to comparators 1521, 1523, 1525 and 1527 for edge decision.

Figure 28:
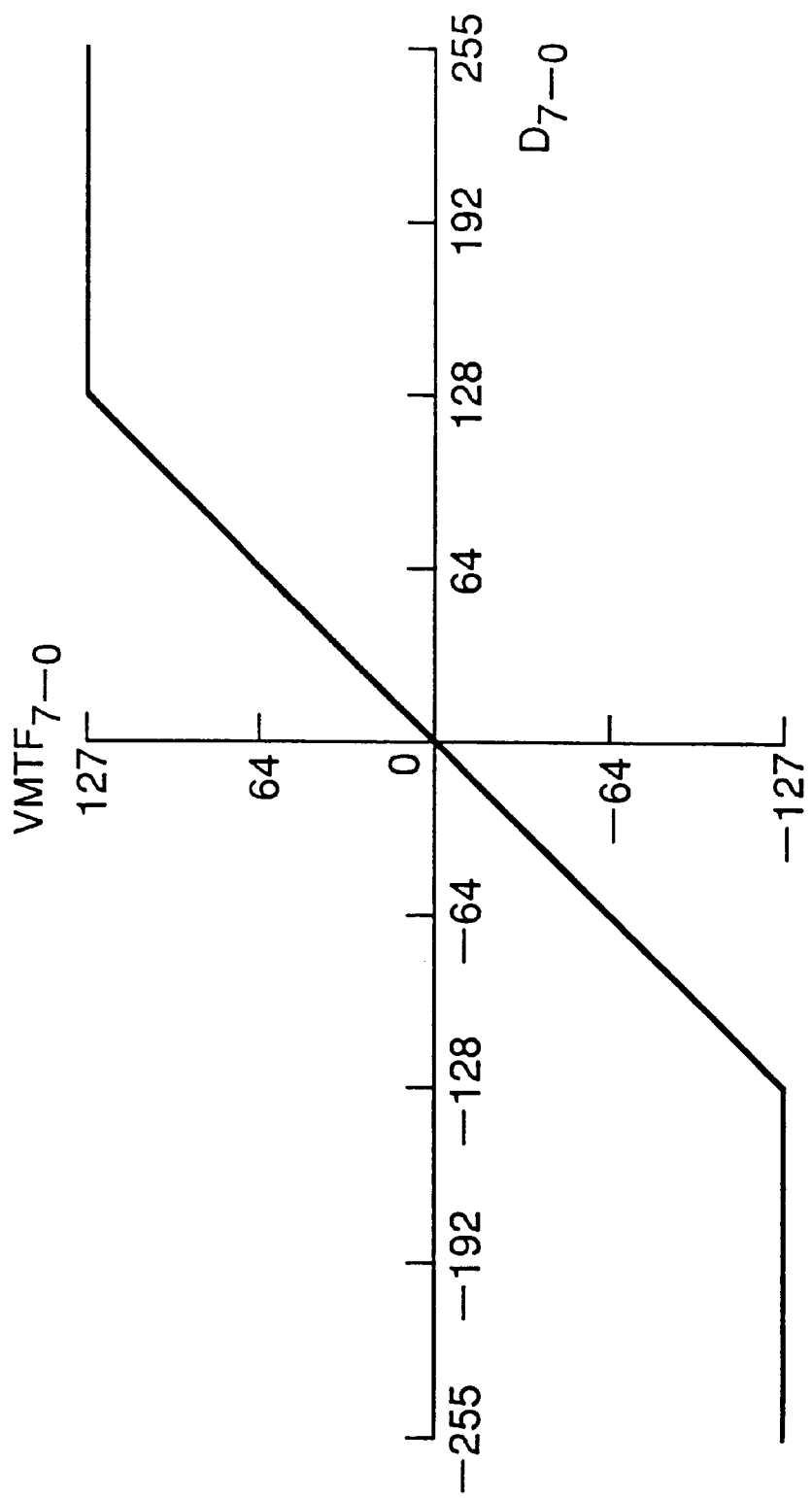
FIG. 28 is a graph of a VMTF table.

The secondary differential filter 1508 receives data from the line memory 1502 and an obtained second differential $D_{7-0}$ is output to an absolute value circuit 1509 to output an absolute value $FL_{27-20}$ thereof. The absolute value is needed because the secondary differential filter 1408 also have negative coefficients. The absolute value $FL_{27-20}$ of the secondary differential is sent to comparators 1522, 1524, 1526 and 1528 for edge decision. The secondary differential $D_{7-0}$ is also sent to a VMTF table 1512 shown in FIG. 28. The VMTF table 1512 outputs value edge component $VMTF_{7-0}$ in correspondence to the secondary differential $D_{7-0}$.

The comparator 1521 for edge decision shown in FIG. 13C compares the first differential $FL_{17-10}$ with a first edge reference level $EDGREF_{17-10}$, and it outputs a signal of L level if the first differential $FL_{17-10}$ is larger than the first edge reference level $EDGREF_{17-10}$. On the other hand, the comparator 1522 for edge decision compares the second differential $FL_{27-20}$ with a second edge reference level $EDGREF_{27-20}$, and it outputs a signal of L level if the second differential $FL_{27-20}$ is larger than the second edge reference level $EDGREF_{27-20}$. An AND gate 1533 receives the results of the comparison by the comparators 1521, 1522 and it outputs an $\overline{EG}$ signal if a signal of L level is received from at least one of the comparators 1521 and 1522. The $\overline{EG}$ signal means an edge.

(G-4) Decision of Black Pixel

Next, decision of black pixel is explained in detail. Black is detected based on chroma $W_{7-0}$, or if the chroma $W_{7-0}$ is smaller than a reference value, the pixel is decided as black. However, the value of chroma $W_{7-0}$ may become high for a black pixel. For example, when the image sensor 14 vibrates when the image is read, the phases of data of red, green and blue may shift slightly relative to each other, as shown at a graph in FIG. 22. In this case, the chroma $W_{7-0}$ becomes large as shown in another graph in FIG. 22A. If the pixel is decided if the chroma $W_{7-0}$ is smaller than a reference value, the pixel is erroneously decided as a color pixel. Then, in this embodiment, erroneous decision can be prevented by smoothing the chroma data before the decision. That is, the chroma data $W_{7-0}$ is first received from the HVC converter 114 by another line memory 1514, and it is smoothed by a filter 1515 of 3*3 matrix shown in FIG. 23. Chroma data $WS_{7-0}$ after smoothing has a more gradual value, as shown in the lower part in FIG. 22. Then, the above-mentioned type of erroneous decision can be prevented.

Figures 23, 24:
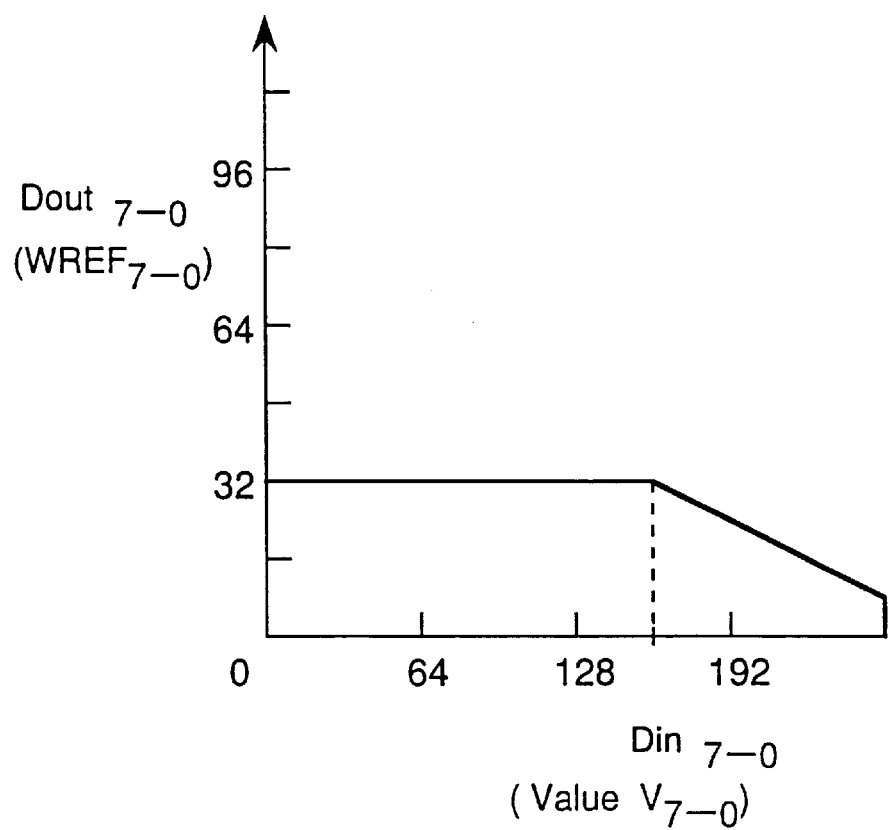
FIG. 23 is a diagram of a smoothing filter.
FIG. 24 is a graph of a WREF table.

A comparator 1529 receives the chroma data $WS_{7-0}$ and compares it with a chroma reference data $WREF_{7-0}$. If the chroma data $WS_{7-0}$ is smaller than the chroma reference data $WREF_{7-0}$, the pixel is decided to be black, and the comparator 1529 sends $\overline{BK}$ signal to an AND gate 1537. As shown in FIG. 24, the chroma reference data $WREF_{7-0}$ is determined by the WREF table 1513 according to the value data $V_{7-0}$. The WREF table 1513 has a feature that if the value data $V_{7-0}$ is larger than a predetermined value, $WREF_{7-0}$ is decreased linearly with the value $V_{7-0}$. This takes into account that black pixels determined erroneously will become evident. (FIG. 17 also shows the WREF table, but FIG. 24 shows another example of the WREF table.) The AND gate 1537 outputs $\overline{BKEG}$ which means an edge of a black pixel if the pixel is a pixel at an edge ($\overline{EG}=L$), it is a black pixel ($\overline{BK}=L$) and $\overline{BKEGEN}=L$.

(G-5) Decision of a Region Liable to be Detected as Black Character

Figure 25A:
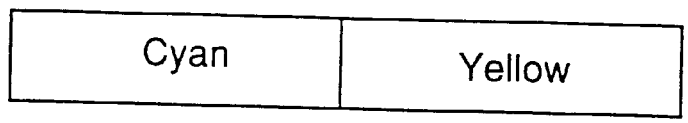
FIG. 25A is a diagram an image consisting of cyan and magenta.
Figure 25B:
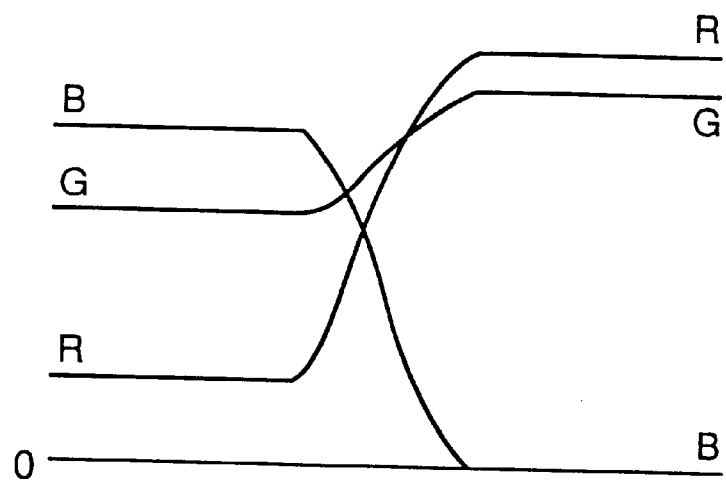
FIG. 25B is a graph of image data of red, green and blue of the image shown in FIG. 25A.
Figure 25C:
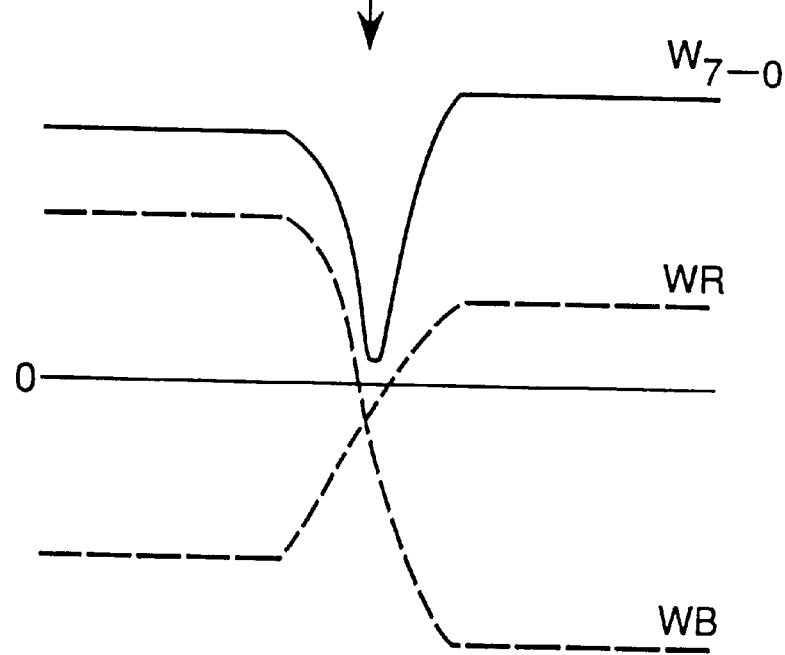
FIG. 25C is a graph of chroma and color difference data for explaining erroneous detection of black at a boundary between cyan and yellow.

Next, the detection of a region which is liable to be detected as black character is explained in detail. If only the detection of a character (edge) and the detection of black pixel mentioned above are performed, a character having a low value $V_{7-0}$ and a low chroma $WS_{7-0}$ such as dark blue and deep green is liable to be decided erroneously as an edge of a black character. Further, if a color and its complementary color, such as cyan and yellow, as shown in FIG. 25A, are adjacent to each other, and image data of red, green and blue are read as shown in FIG. 25B, the chroma $WS_{7-0}$ may become low at the boundary between them or change to black there, as shown in FIG. 25C. Such a point is also liable to be decided erroneously as an edge of a black character. For example, such an erroneous decision may happen when a blue character is printed on a background of yellow.

In order to solve the problem, a uniform color part is detected in the embodiment. Then, even if the pixel is decided a black pixel, the decision is canceled if it is located in a region of uniform color part. Thus, a black character can be decided more precisely.

The uniform color part has features that it is not an edge, that it is a pixel in a color mode area and that a number of pixel having low value exceeds a certain number within a prescribed area. Then, the uniform color part is detected as follows: The comparators 1423 and 1524 decide that the outputs $FL_{17-10}$ and $FL_{27-20}$ of the primary and secondary differential filters are lower than third and fourth edge reference levels $EDGREF_{37-30}$ and $EDREF_{47-40}$, an AND gate 1534 outputs signal $\overline{BETA1}$ which means a pixel not existing at an edge. Further, if a comparator 1530 decides that the chroma data $WS_{7-0}$ is smaller than a reference value $WREF_{27-20}$, it outputs a signal $\overline{COL}$ which means a color data. Further, if a comparator 1531 decides that the value data $V_{17-10}$ is smaller than a reference value $VREF_{17-10}$, it outputs a signal $\overline{VL_1}$. Then, the AND gate 1538 receives the signals $\overline{BETA1}$, $\overline{COL}$ and $\overline{VL_1}$ and outputs a signal $\overline{CAN}$ which means that the pixel is not at an edge, that the pixel is in a color mode area and that the pixel has a low value. Then, the pixel is taken as a uniform part having a chromatic color not located in a background. A counter 1542 counts the number of the signals $\overline{CAN}$ in the unit of 9*9 pixels. If the number $Cntref_{17-10}$ of the signals $\overline{CAN}$ is smaller than a reference value $Cntref_{7-0}$, a comparator 1542 outputs a signal $\overline{BKEGON}$.

An AND gate 1544 outputs the above-mentioned signal $\overline{BKEG}$ delayed by a delay circuit 1541 and the above-mentioned signal $\overline{BKEGON}$. That is, even when the signal $\overline{BKEG}$ on the decision of a black edge is received, if the signal $\overline{BKEGON}$ is not received or if the pixel is located in a uniform color part, the decision of black edge is canceled, and the AND gate 1544 does not output a signal $\overline{PAPA}$. In other words, edge emphasis is performed only for a black character in a monochromatic background. On the other hand, the number of pixels of a uniform color part is less than the prescribed reference value, the decision of black edge is kept to be valid.

(G-6) Decision of Dot Area

Figures 26, 27:
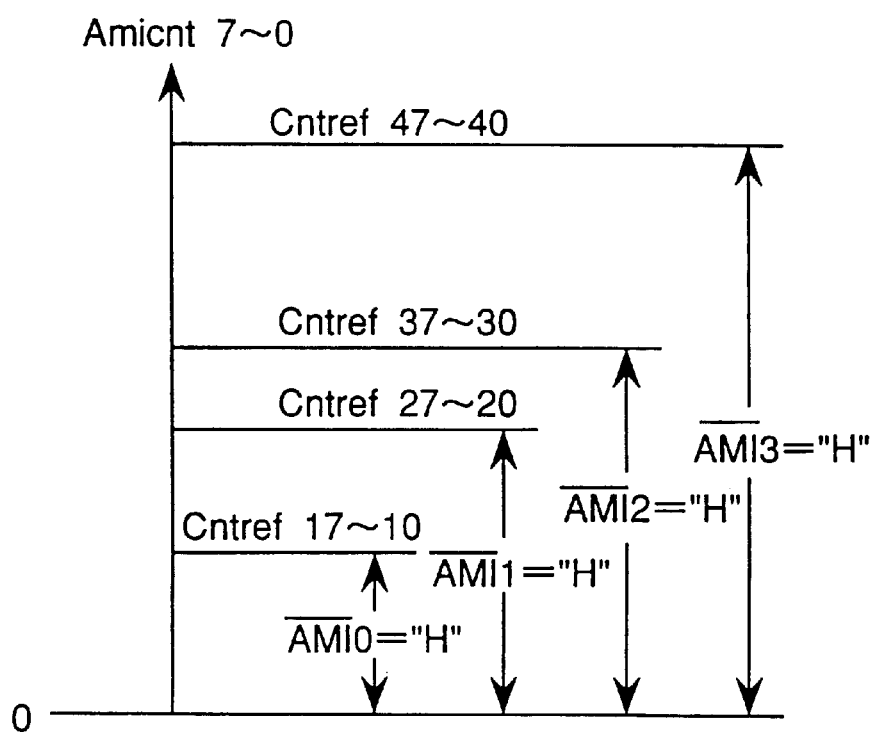
FIG. 26 is a diagram for showing two adjacent pixels along eight directions with respect to a pixel under interest (X) in filters for detecting white and black dot.
FIG. 27 is a diagram of four steps of reference levels for detecting dots and signals $\overline{AMI0}$–$\overline{AMI3}$.

Next, decision of dot area is explained in detail. Dot area means an area of an image composed of dots. As shown in FIG. 13B, the filters 1510 and 1511 for detection white dots and black dots receive data output from the line memory 1502. Each filter decides if a pixel under interest is larger (white dots) or smaller (black dots) than a level $AMIREF_{7-0}$ along the all directions with respect to an average of two pixels surrounding the pixel under interest along eight directions, as shown in FIG. 26. Further, if the pixel under interest is larger than the eight adjacent pixels, it is decided as a white dot ($\overline{WAMI}=L$), while if the pixel under interest is smaller than the eight adjacent pixels, it is decided as a black dot ($\overline{KAMI}=L$).

In concrete, the filter 1510 for detecting white dots shown in FIG. 13B outputs a signal $\overline{WAMI}$ of L level when each condition of Eq. (16) is satisfied and each condition of Eq. (17) is satisfied. Further, the filter 1511 for detecting black dots shown in FIG. 13B also outputs a signal $\overline{KAMI}$ of L level when each condition of Eq. (16) is satisfied and each condition of Eq. (17) is satisfied.

$$X-(a_{11}+a_{22})/2>AMIREF_{7-0},$$

$$X-(a_{31}+a_{32})/2>AMIREF_{7-0},$$

$$X-(a_{51}+a_{42})/2>AMIREF_{7-0},$$

$$X-(a_{53}+a_{43})/2>AMIREF_{7-0},$$

$$X-(a_{55}+a_{44})/2>AMIREF_{7-0},$$

$$X-(a_{35}+a_{34})/2>AMIREF_{7-0},$$

$$X-(a_{15}+a_{24})/2>AMIREF_{7-0},$$

and $$X-(a_{13}+a_{23})/2>AMIREF_{7-0}. \tag{15}$$

$$X>a_{22},$$
$$X>a_{32},$$
$$X>a_{42},$$
$$X>a_{43},$$
$$X>a_{44},$$
$$X>a_{34},$$
$$X>a_{24},$$

and $$X>a_{23}. \tag{16}$$

Further, the filter 1511 for detecting black dots shown in FIG. 13B also outputs a signal $\overline{KAMI}$ of L level when each condition of Eq. (17) is satisfied and each condition of Eq. (18) is satisfied.

$$X-(a_{11}+a_{22})/2<AMIREF_{7-0},$$

$$X-(a_{31}+a_{32})/2<AMIREF_{7-0},$$

$$X-(a_{51}+a_{42})/2<AMIREF_{7-0},$$

$$X-(a_{53}+a_{43})/2<AMIREF_{7-0},$$

$$X-(a_{55}+a_{44})/2<AMIREF_{7-0},$$

$$X-(a_{35}+a_{34})/2<AMIREF_{7-0},$$

$$X-(a_{15}+a_{24})/2<AMIREF_{7-0},$$

and $$X-(a_{13}+a_{23})/2<AMIREF_{7-0}. \tag{17}$$

$$X<a_{22},$$
$$X<a_{32},$$
$$X<a_{42},$$
$$X<a_{43},$$

$X < a_{44}$, $X < a_{34}$, $X < a_{24}$, and $X < a_{23}$. (18)

The counters 1550 and 1551 receive signals $\overline{\text{WAMI}}$ and $\overline{\text{KAMI}}$ output by the filters 1510 and 1511, and they count a number of signals of L level in a 41*9 pixel matrix. The counts thereof are sent to a maximum detector 1552 which outputs a maximum thereof Amicnt$_{7-0}$ to four comparators 1553–1556. The comparators 1553–1556 compare it with four steps of reference levels CNTREF$_{17-10}$, CNTREF$_{27-20}$, CNTREF$_{37-30}$ and CNTREF$_{47-40}$ to quantize it, and they output $\overline{\text{AMI0}}$, $\overline{\text{AMI1}}$, $\overline{\text{AMI2}}$ and $\overline{\text{AMI3}}$ if it is larger than the reference signals (refer to FIG. 27).

(G-7) Other Types of Decision

The region discriminator 146 further decides some points explained below. A comparator 1532 is provided to decide a high light area. It compares the value data $V_{7-0}$ with a second reference level VREF$_{27-20}$, and if the value data $V_{7-0}$ is larger than the second reference level VREF$_{27-20}$, it outputs a signal $\overline{\text{VHI}}$ which means that the pixel exists in a highlight area. The comparators 1527 and 1528 are provided to decide an area not located at an edge. They compare the first differential FL$_{17-10}$ and the second differential FL$_{27-20}$ with seventh and eighth reference levels EDGref$_{77-70}$ and EDGref$_{87-80}$. If the first differential FL$_{17-10}$ and the second differential FL$_{27-20}$ are smaller than seventh and eighth reference levels EDGref$_{77-70}$ and EDGref$_{87-80}$, a signal $\overline{\text{BETA2}}$ which means a pixel not located at an edge is sent to an AND gate 1536. The AND gate 1536 also receives the above-mentioned $\overline{\text{VHI}}$ signal from the comparator 1531, and it outputs a signal $\overline{\text{HLIGHT}}$ which means a highlight area through a delay circuit 1546.

The comparators 1525 and 1526 also receive the first differential FL$_{17-10}$ and the second differential FL$_{27-20}$ and compare them with fifth and sixth reference levels EDGref$_{57-50}$ and EDGref$_{67-60}$. If the first differential FL$_{17-10}$ and the second differential FL$_{27-20}$ are larger than the reference levels EDGref$_{57-50}$ and EDGref$_{67-60}$, signals of L level are sent to an NOR gate 1525. If a signal is received from either of the comparators 1525 and 1526, the NOR gate 1525 outputs a signal $\overline{\text{EG2}}$ which means an edge highlight area through a delay circuit 1546 as a signal $\overline{\text{MAMA}}$.

H. MTF Corrector

Figure 29A:
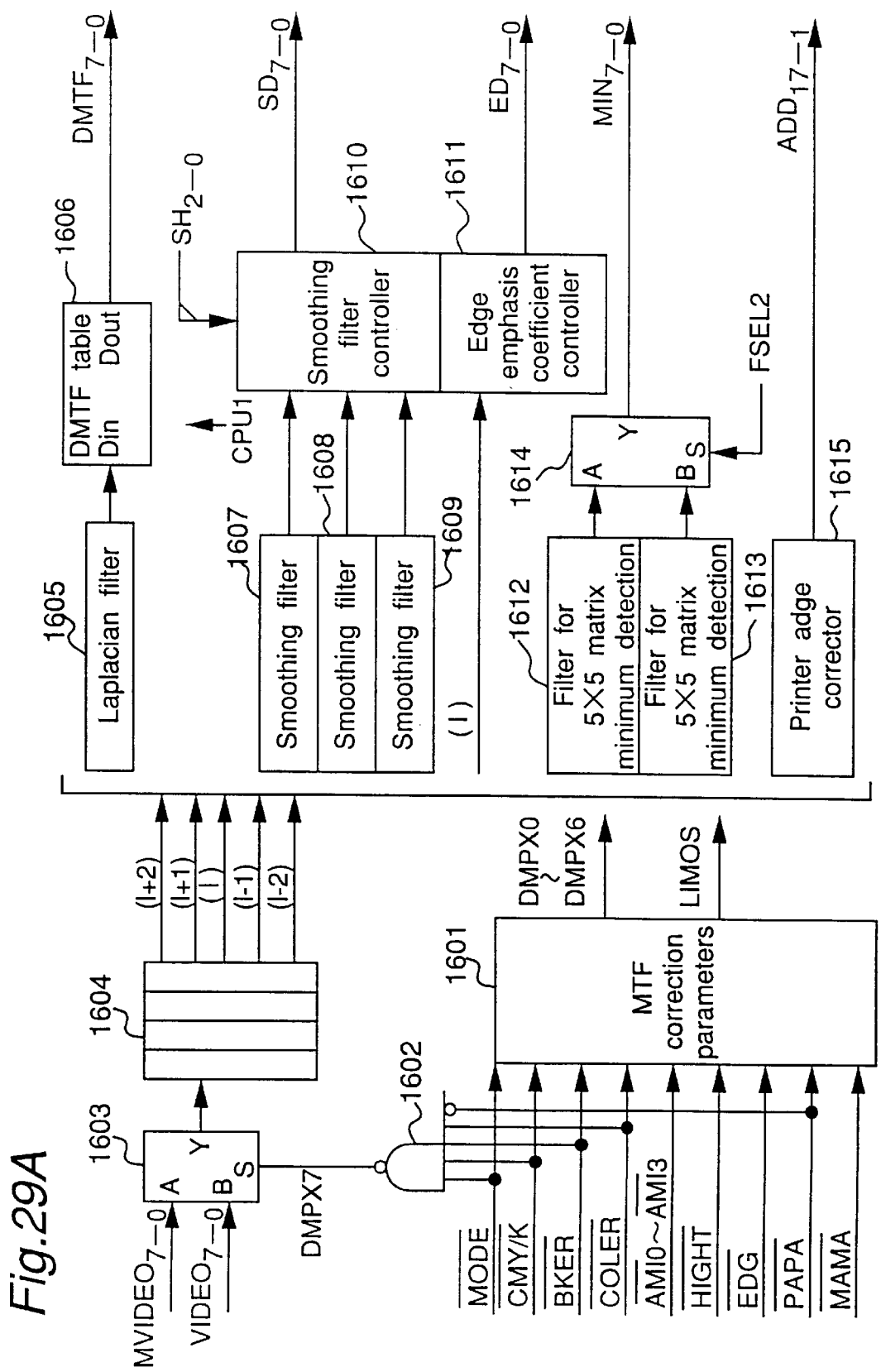
FIGS. 29A and 29B are block diagrams of an MTF correction section.
Figure 29B:
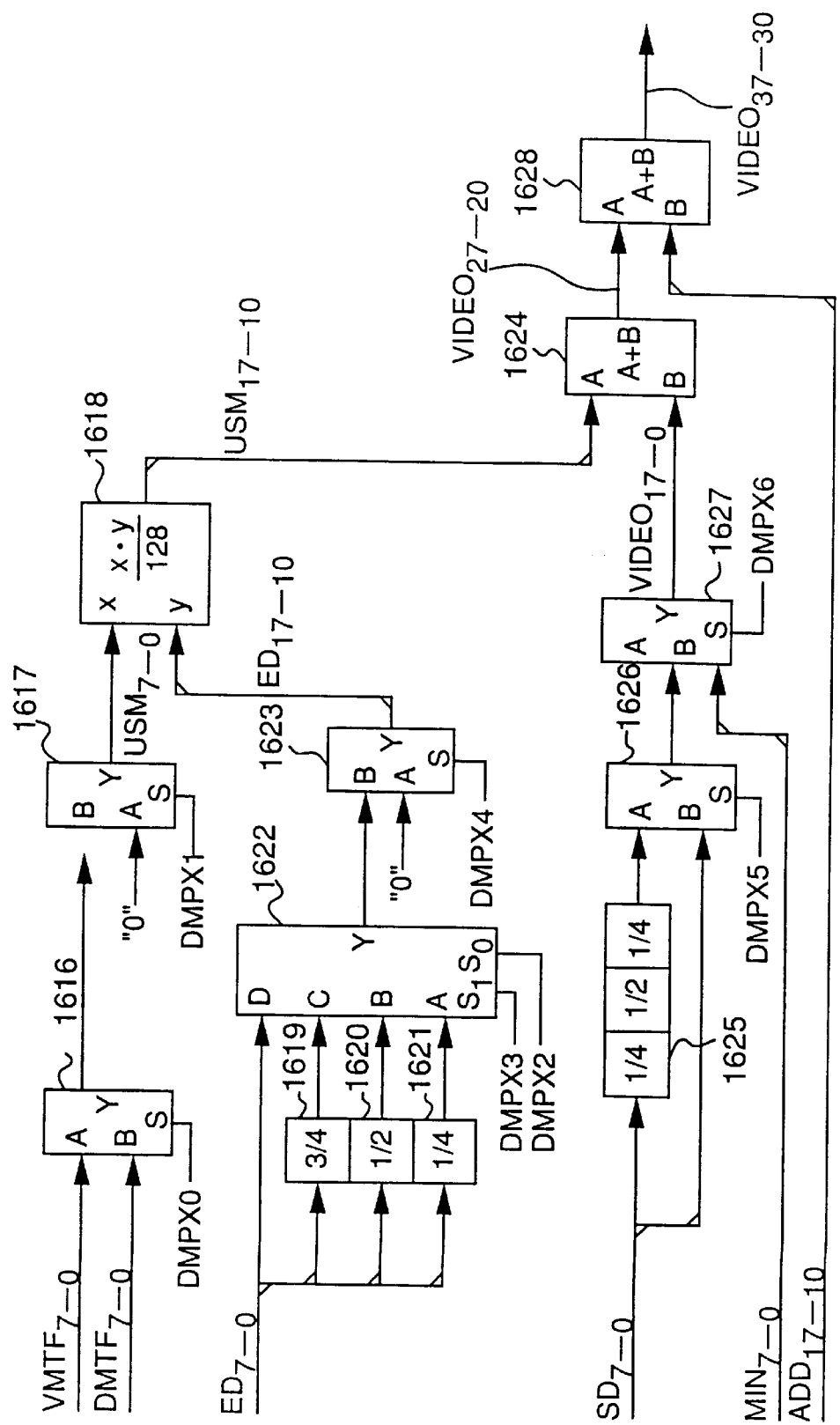

FIGS. 29A and 29B show block diagrams of the MTF corrector 148 which performs edge emphasis and smoothing most suitable for the image data VIDEO$_{7-0}$ and MVIDEO$_{7-0}$ received from the color corrector 134 according to the kind of pixels recognized by the signals ($\overline{\text{AMI0}}$–$\overline{\text{AMI3}}$, $\overline{\text{MAMA}}$, $\overline{\text{PAPA}}$, $\overline{\text{EDG}}$ and $\overline{\text{HLIGHT}}$) and printing situation recognized by status signals ($\overline{\text{MODE}}$, $\overline{\text{CMY/K}}$, $\overline{\text{BKER}}$, $\overline{\text{COLER}}$). Further, a duty ratio of laser emission is changed according to the kind of image recognized by the region discriminator 146. Still further, a prescribed value is added to pixel data at edges to correct amounts of excess or deficient toners.

The MTF corrector 148 recognizes the color of toners based on $\overline{\text{CMY/K}}$ signal. If the signal is L level, toners of cyan, magenta or yellow is printed. It also recognizes one of following modes by using three signals $\overline{\text{MODE}}$, $\overline{\text{BKER}}$ and $\overline{\text{COLER}}$: Full color standard mode ($\overline{\text{BKER}}$=H, $\overline{\text{COLER}}$=L and $\overline{\text{MODE}}$=H), full color photographic mode ($\overline{\text{BKER}}$=H, $\overline{\text{COLER}}$=H and $\overline{\text{MODE}}$=L), monochromatic color standard mode ($\overline{\text{BKER}}$=H, $\overline{\text{COLER}}$=L and $\overline{\text{MODE}}$=H), monochromatic color photograph mode ($\overline{\text{BKER}}$=H, $\overline{\text{COLER}}$=L and $\overline{\text{MODE}}$=L), monochromatic standard mode ($\overline{\text{BKER}}$=L, $\overline{\text{COLER}}$=L and $\overline{\text{MODE}}$=H), and monochromatic photographic mode ($\overline{\text{BKER}}$=L, $\overline{\text{COLER}}$=L and $\overline{\text{MODE}}$=L). Further, it recognizes the kind of a pixel to be printed by using the result of region discrimination as follows: A highlight region of uniform density ($\overline{\text{HLIGHT}}$=L), a non-edge region ($\overline{\text{HLIGHT}}$=H, $\overline{\text{EDG}}$=H, $\overline{\text{PAPA}}$=H), a color edge region ($\overline{\text{HLIGHT}}$=H, $\overline{\text{EDG}}$=L, $\overline{\text{PAPA}}$=H), and a black edge region ($\overline{\text{HLIGHT}}$=H, $\overline{\text{EDG}}$=L, $\overline{\text{PAPA}}$=L).

(H-1) Explanation of Various Modes

Before explaining the MTF corrector 148, MTF correction in each mode mentioned above is explained. First, MTF correction in the full color standard mode ($\overline{\text{MODE}}$=H, $\overline{\text{BKER}}$=H and $\overline{\text{COLER}}$=L) is explained. Table 3 compiles signal levels of various signals received by a controller 1601, printing situations represented by the levels and signals of DMPX0, DMPX1, DMPX5 and DMPX6.

First, MTF correction of a pixel at a black edge ($\overline{\text{HLIGHT}}$=H, $\overline{\text{EDG}}$=L, $\overline{\text{PAPA}}$=L) is explained. When black toners are used for printing ($\overline{\text{CMY/K}}$=H), VIDEO$_{37-30}$ is obtained by adding edge component VMTF$_{7-0}$ of value to ordinary image data SD$_{7-0}$ for edge emphasis. The edge component VMTF$_{7-0}$ of value is used instead of an edge component DMTF$_{7-0}$ of density because the former is more sensitive than the latter on an edge due to background. If the pixel composes a dot image, the edge emphasis (or VMTF$_{7-0}$) is limited according to the degree or density of dots. Thus, a Moire pattern is prevented to occur.

TABLE 3

| | | | | Full color standard mode | | | | | | |
|---|---|---|---|---|---|---|---|---|---|---|
| $\overline{\text{CMY/K}}$ | $\overline{\text{HLIGHT}}$ | $\overline{\text{EDG}}$ | $\overline{\text{PAPA}}$ | | DMPX1 | DMPX0 | USM | DMPX6 | DMPX5 | VIDEO |
| L | L | — | — | highlight | L | H | 0 | H | L | FSD |
| (CMY mode) | H | H | H | non-edge | L | H | 0 | H | H | SD |
| | H | L | H | color edge | H | H | DMTF | H | H | SD |
| | H | L | L | black edge | L | L | 0 | L | H | MIN |
| H | L | — | — | highlight | L | H | 0 | H | L | FSD |
| (BK mode) | H | H | H | non-edge | L | H | 0 | H | H | SD |
| | H | L | H | color edge | L | H | 0 | H | H | SD |
| | H | L | L | black edge | H | L | VMTF | H | H | SD |

Figure 37A:
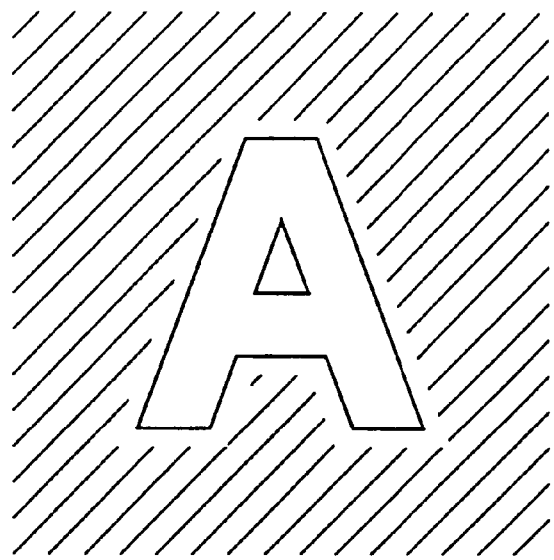
FIGS. 37A and 37B are diagrams of examples of images in correspondence to FIGS. 36A and 36B.
Figure 37B:
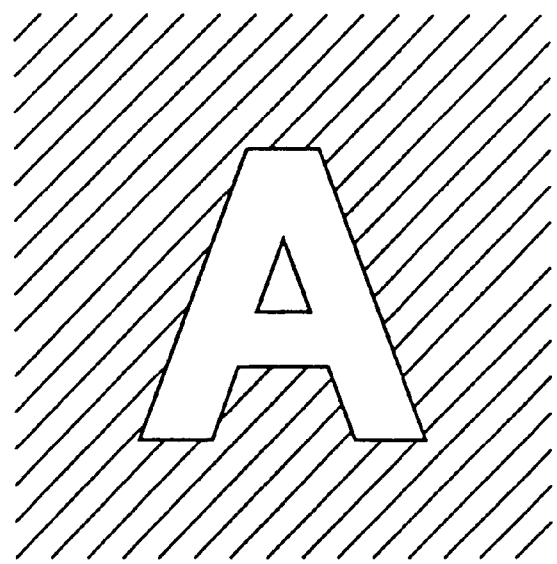

When cyan, magenta or yellow toners are used for printing ($\overline{\text{CMY}}$/K=L), edge emphasis is not performed, and a minimum data $\text{MIN}_{7\text{-}0}$ is obtained in a 5*5 or 3*3 matrix as $\text{VIDEO}_{37\text{-}30}$. Then, a very narrow extended line at an edge as shown in FIG. 36A in an area represented with a dashed circle can be removed as shown in FIG. 36B. By using the minimum data $\text{MIN}_{7\text{-}0}$, image data can be decreased to zero only inside a black character. Then, the black character can be printed with edge emphases without white peripheral lines as shown in FIG. 37A. If image data of cyan, magenta or yellow is subtracted by, for example, an edge detection quantity (such as $\text{FL}_{17\text{-}10}$ or $\text{FL}_{27\text{-}20}$ in this embodiment), white peripheral lines as shown in FIG. 37A are observed.

For a pixel in a color edge region ($\overline{\text{HLIGHT}}$=H, $\overline{\text{EDG}}$=L, $\overline{\text{PAPA}}$=H), edge emphases is not performed when black toners are used in printing, and ordinary pixel data $\text{SD}_{7\text{-}0}$ is used as $\text{VIDEO}_{37\text{-}30}$. In other words, edge emphasis is not performed for an edge of a color character for black printing so that black fringe of a color character can be prevented. On the other hand, when cyan, magenta or yellow toners are used for printing, density edge component $\text{DTMF}_{7\text{-}0}$ is added to the ordinary pixel data $\text{SD}_{7\text{-}0}$ as $\text{VIDEO}_{37\text{-}30}$.

For a pixel in a highlight region of uniform density ($\overline{\text{HLIGHT}}$=L), edge emphasis is not performed, and $\text{FSD}_{7\text{-}0}$ subjected to smoothing is used as image data $\text{VIDEO}_{37\text{-}30}$. Then, noises in the highlight region becomes not noticeable.

For a pixel in a non-edge region ($\overline{\text{HLIGHT}}$=H, $\overline{\text{EDG}}$=H, $\overline{\text{PAPA}}$=H), edge emphasis is not performed and ordinary image data $\text{SD}_{7\text{-}0}$ is used as image data $\text{VIDEO}_{37\text{-}30}$.

Next, MTF correction in the full color photographic mode ($\overline{\text{BKER}}$=H, $\overline{\text{COLER}}$=H and $\overline{\text{MODE}}$=L) is explained. Table 4 compiles signal levels of various signals received by the controller 1601, printing situations represented by the levels and signals of DMPX0, DMPX1, DMPX5 and DMPX6.

For a pixel in a black edge region ($\overline{\text{HLIGHT}}$=H, $\overline{\text{EDG}}$=L, $\overline{\text{PAPA}}$=L) and in a color edge region ($\overline{\text{HLIGHT}}$=H, $\overline{\text{EDG}}$=L, $\overline{\text{PAPA}}$=H), edge emphases is performed by adding density edge component $\text{DMTF}_{7\text{-}0}$ to $\text{FSD}_{7\text{-}0}$ subjected to smoothing to output the sum as $\text{VIDEO}_{37\text{-}30}$ so as not to deteriorate gradation characteristics of half-tone pixels. Thus, edge emphasis is performed suitably without deteriorating gradation characteristics For a pixel in a highlight region of uniform density ($\overline{\text{HLIGHT}}$=L), edge emphasis is not performed, and $\text{FSD}_{7\text{-}0}$ subjected to smoothing is used as image data $\text{VIDEO}_{37\text{-}30}$. Then, noises in the highlight region becomes not noticeable.

For a pixel in a non-edge region ($\overline{\text{HLIGHT}}$=H, $\overline{\text{EDG}}$=H, $\overline{\text{PAPA}}$=H), edge emphasis is not performed and image data $\text{FSD}_{7\text{-}0}$ subjected to smoothing is used as image data $\text{VIDEO}_{37\text{-}30}$. Thus, the gradation characteristics of a photography image can be maintained.

Next, MTF correction in the monochromatic color standard mode ($\overline{\text{BKER}}$=H, $\overline{\text{COLER}}$=L and $\overline{\text{MODE}}$=H) is explained. Table 5 compiles signal levels of various signals received by the controller 1601, printing situations represented by the levels and signals of DMPX0, DMPX1, MDMPX5 and DMPX6.

TABLE 4

Full color standard mode

| $\overline{\text{CMY}}$/K | $\overline{\text{HLIGHT}}$ | $\overline{\text{EDG0}}$ | $\overline{\text{PAPA}}$ | | DMPX1 | DMPX0 | USM | DMPX6 | DMPX5 | VIDEO |
|---|---|---|---|---|---|---|---|---|---|---|
| L | L | — | — | highlight | L | H | 0 | H | L | FSD |
| (CMY | H | H | H | non-edge | L | H | 0 | H | L | FSD |
| mode) | H | L | H | color edge | H | H | DMTF | H | L | FSD |
| | H | L | L | black edge | H | H | DMTF | H | L | FSD |
| H | L | — | — | highlight | L | H | 0 | H | L | FSD |
| (BK | H | H | H | non-edge | L | H | 0 | H | L | FSD |
| mode) | H | L | H | color edge | H | H | DMTF | H | L | FSD |
| | H | L | L | black edge | H | H | DMTF | H | L | FSD |

TABLE 5

Monochromatic color standard mode

| $\overline{\text{CMY}}$/K | $\overline{\text{HLIGHT}}$ | $\overline{\text{EDG0}}$ | | DMPX1 | DMPX0 | USM | DMPX6 | DMPX5 | VIDEO |
|---|---|---|---|---|---|---|---|---|---|
| — | L | — | highlight | L | H | 0 | H | L | FSD |
| | H | H | non-edge | L | H | 0 | H | H | SD |
| L | H | L | CMY mode, edge | L | L | DMTF | H | H | SD |

TABLE 5-continued

| | | | Monochromatic color standard mode | | | | | | |
|---|---|---|---|---|---|---|---|---|---|
| $\overline{CMY/K}$ | $\overline{HLIGHT}$ | $\overline{EDG0}$ | | DMPX1 | DMPX0 | USM | DMPX6 | DMPX5 | VIDEO |
| H | H | L | BK mode, edge | L | H | 0 | H | H | SD |

For a pixel in a black edge region ($\overline{HLIGHT}$=H, $\overline{EDG}$=L, $\overline{PAPA}$=L) and in a color edge region ($\overline{HLIGHT}$=H, $\overline{EDG}$=L, $\overline{PAPA}$=H), edge emphasis is not performed when black toners are used in printing, and ordinary image data $SD_{7-0}$ is used as $VIDEO_{37-30}$, while edge emphasis is performed when cyan, magenta or yellow toners are used in printing, by adding density edge component $DMTF_{7-0}$ to ordinary pixel data $SD_{7-0}$ to output the sum as $VIDEO_{37-30}$. Thus, black fringe can be prevented.

For a pixel in a highlight region of uniform density ($\overline{HLIGHT}$=L), edge emphasis is not performed, and $FSD_{7-0}$ subjected to smoothing is used as image data $VIDEO_{37-30}$. Then, noises in the highlight region becomes not noticeable.

For a pixel in a non-edge region ($\overline{HLIGHT}$=H, $\overline{EDG}$=H, $\overline{PAPA}$=H), edge emphasis is not performed and image data $FSD_{7-0}$ subjected to smoothing is used as image data $VIDEO_{37-30}$.

Next, MTF correction in the monochromatic color photography mode ($\overline{BKER}$=H, $\overline{COLER}$=L and $\overline{MODE}$=L) is explained. Table 6 compiles signal levels of various signals received by the controller 1601, printing situations represented by the levels and signals of DMPX0, DMPX1, MDMPX5 and DMPX6.

deteriorate gradation characteristics of half-tone pixels. Thus, a black fringe of a color character can be prevented.

For a pixel in a highlight region of uniform density ($\overline{HLIGHT}$=L), edge emphasis is not performed, and $FSD_{7-0}$ subjected to smoothing is used as image data $VIDEO_{37-30}$. Then, noises in the highlight region becomes not noticeable.

For a pixel in a non-edge region ($\overline{HLIGHT}$=H, $\overline{EDG}$=H, $\overline{PAPA}$=H), edge emphasis is not performed and image data $FSD_{7-0}$ subjected to smoothing is used as image data $VIDEO_{37-30}$.

Next, MTF correction in the monochromatic standard mode ($\overline{BKER}$=L, $\overline{COLER}$=L and $\overline{MODE}$=H) is explained. Table 7 compiles signal levels of various signals received by the controller 1601, printing situations represented by the levels and signals of DMPX0, DMPX1, MDMPX5 and DMPX6.

TABLE 6

| | | | Monochromatic color photography mode | | | | | | |
|---|---|---|---|---|---|---|---|---|---|
| $\overline{CMY/K}$ | $\overline{HLIGHT}$ | $\overline{EDG0}$ | | DMPX1 | DMPX0 | USM | DMPX6 | DMPX5 | VIDEO |
| — | L | — | highlight | L | H | 0 | H | L | FSD |
| | H | H | non-edge | L | H | 0 | H | L | FSD |
| L | H | L | CMY mode, edge | L | L | DMTF | H | L | FSD |
| H | H | L | BK mode, edge | L | H | 0 | H | L | FSD |

For a pixel in a black edge region ($\overline{HLIGHT}$=H, $\overline{EDG}$=L, $\overline{PAPA}$=L) and in a color edge region ($\overline{HLIGHT}$=H, $\overline{EDG}$=L,

TABLE 7

| | | | Monochromatic standard mode | | | | | | |
|---|---|---|---|---|---|---|---|---|---|
| $\overline{CMY/K}$ | $\overline{HLIGHT}$ | $\overline{EDG0}$ | | DMPX1 | DMPX0 | USM | DMPX6 | DMPX5 | VIDEO |
| — | L | — | highlight | L | H | 0 | H | L | FSD |
| | H | H | non-edge | L | H | 0 | H | H | SD |
| L | H | L | CMY mode, edge | L | L | 0 | H | H | SD |
| H | H | L | BK mode, edge | H | L | VMTF | H | H | SD |

$\overline{PAPA}$=H), edge emphases is performed only when cyan, magenta or yellow toners are used in printing, by adding density edge component $DMTF_{7-0}$ to $FSD_{7-0}$ subjected to smoothing to output the sum as $VIDEO_{37-30}$ so as not to For a pixel in a black edge region ($\overline{HLIGHT}$=H, $\overline{EDG}$=L, $\overline{PAPA}$=L) and in a color edge region ($\overline{HLIGHT}$=H, $\overline{EDG}$=L, L, $\overline{PAPA}$=H), edge emphasis is performed when black toners are used in printing, by adding value edge component $VMTF_{7-0}$ to ordinary pixel data $SD_{7-0}$ to output the sum as $VIDEO_{37-30}$, while edge emphasis is not performed when cyan, magenta or yellow toners are used in printing, and ordinary image data $SD_{7-0}$ is used as $VIDEO_{37-30}$.

For a pixel in a highlight region of uniform density ($\overline{HLIGHT}$=L), edge emphasis is not performed, and $FSD_{7-0}$ subjected to smoothing is used as image data $VIDEO_{37-30}$. Then, noises in the highlight region becomes not noticeable.

For a pixel in a non-edge region ($\overline{HLIGHT}$=H, $\overline{EDG}$=H, $\overline{PAPA}$=H), edge emphasis is not performed and ordinary image data $SD_{7-0}$ is used as image data $VIDEO_{37-30}$.

Finally, MTF correction in the monochromatic photography mode ($\overline{BKER}$=L, $\overline{COLER}$=L and $\overline{MODE}$=L) is explained. Table 8 compiles signal levels of various signals received by the controller 1601, printing situations represented by the levels and signals of DMPX0, DMPX1, MDMPX5 and DMPX6.

TABLE 8

Monochromatic photography mode

| $\overline{CMY/K}$ | $\overline{HLIGHT}$ | $\overline{EDG0}$ | | DMPX1 | DMPX0 | USM | DMPX6 | DMPX5 | VIDEO |
|---|---|---|---|---|---|---|---|---|---|
| — | L | — | highlight | L | H | 0 | H | L | FSD |
| | H | H | non-edge | L | H | 0 | H | L | FSD |
| L | H | L | CMY mode, edge | L | H | 0 | H | L | FSD |
| H | H | L | BK mode, edge | H | H | DMTF | H | L | FSD |

For a pixel in a black edge region ($\overline{HLIGHT}$=H, $\overline{EDG}$=L, $\overline{PAPA}$=L) and in a color edge region ($\overline{HLIGHT}$=H, $\overline{EDG}$=L, $\overline{PAPA}$=H), edge emphases is performed by adding density edge component $DMTF_{7-0}$ to $FSD_{7-0}$ subjected to smoothing to output the sum as $VIDEO_{37-30}$ so as not to deteriorate gradation characteristics of half-tone pixels.

For a pixel in a highlight region of uniform density ($\overline{HLIGHT}$=L), and for a pixel in a non-edge region ($\overline{HLIGHT}$=H, $\overline{EDG}$=H, $\overline{PAPA}$=H), edge emphasis is not performed and image data $FSD_{7-0}$ subjected to smoothing is used as image data $VIDEO_{37-30}$.

(H-2) MTF Correction

Next, MTF (mutual transfer) correction performed by the MTF corrector 148 shown in FIGS. 29A and 29B is explained. A controller 1601 for MTF correction parameters receives control signals $\overline{AMI0}$–$\overline{AMI3}$, $\overline{HLIGHT}$, $\overline{EDG}$, $\overline{PAPA}$ and $\overline{MAMA}$ from the region discriminator 146. Further, the controller receives control signals $\overline{MODE}$, $\overline{CMY/K}$, $\overline{BKER}$ and $\overline{COLER}$. The signal $\overline{MODE}$ represents a kind of a document set by the key 78 in the operational panel, and it is set to be L level in the photography modes and H level in the standard modes. The signal $\overline{CMY/K}$ is a status signal representing a printing situation, and it is set to be L level for printing with cyan, magenta or yellow toners and H level for printing with black toners. The signal $\overline{BKER}$ requires signal processing in the monochromatic modes. The signal $\overline{COLER}$ requires signal processing in the monochromatic color modes. The signals $\overline{BKER}$ and $\overline{COLER}$ are signals on a region. The controller 1601 supplies DMPX0–DMPX6 shown in Tables 3–8 and a signal LIMOS shown in Table 9.

TABLE 9

| | Setting of duty ratio | | |
|---|---|---|---|
| MODE | $\overline{MAMA}$ | $\overline{AMI0}$ | LIMOS |
| H | L | — | L |
| | — | L | L |
| | H | H | H |
| L | — | — | H |

Figure 30:
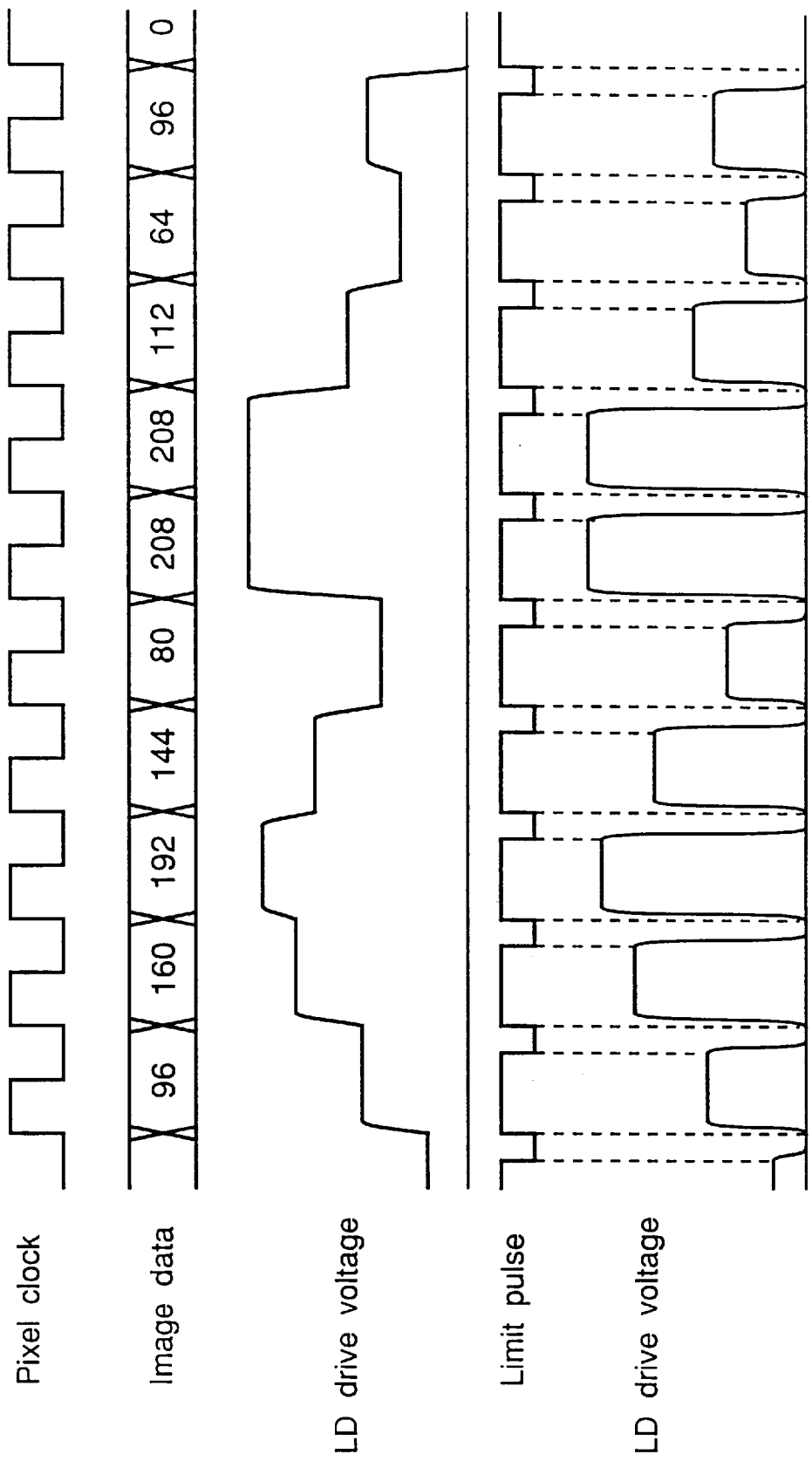
FIG. 30 is a timing chart of pixel clock, image data, driving voltage for laser diode, limit pulse, and driving voltage with a duty ratio.

The signal LIMOS changes a duty ratio of the laser diode emitting according to the image data. A period when the laser diode does not emit may be provided in one pixel clock cycle. In such a case, the duty ratio is defined as a ratio of the laser emission period in one pixel clock cycle. FIG. 30 shows a timing chart on driving the laser diode wherein two types of a driving signal for the laser diode (LD) having duty ratios of 100% and 80% are shown. If the signal LIMOS=L, the duty ratio is set to be 100% in order to prevent a Moire pattern. If the signal LIMOS=H, the duty ratio is set to be 80% to reduce noises between lines along the main scan direction. If $\overline{MODE}$=H or the pixel is at an edge or in a dot in a cot image in the standard modes, the signal LIMOS is set to be L in order to improve the reproducibility at an edge and in a dot image. On the other hand, in the photography modes and at a non-edge region in the standard modes, the signal LIMOS=H to provide non-emitting periods in order to make noises between lines unnoticeable.

The signals $\overline{MODE}$, $\overline{CMY/K}$, $\overline{BKER}$ and $\overline{COLER}$ and an inverted signal of the signal $\overline{PAPA}$ are also sent to a NAND gate 1602. Then, the NAND gate 1602 outputs a signal DMPX7 to a selector 1603 only when black is printed at a black edge in the full color standard copy mode. The selector 1603 selects the value data $MVIDEO_{7-0}$ subjected to the masking processing or the density data $VIDEO_{7-0}$ according as the signal DMPX7 is L level or not.

The selector 1603 receives image data $MVIDEO_{7-0}$ subjected to masking processing at A input and image data $VIDEO_{7-0}$ converted to density at B input in the order or cyan, magenta, yellow and black. The data selected by the selector 1603 is supplied, through a line memory 1604 storing data of 5*5 matrix to a Laplacian filter, to a Laplacian filter 1605, smoothing filters 1607, 1608 and 1609, a filter 1612 for detecting a minimum in a 5*5 matrix, a filter 1613 for detecting a minimum in a 3*3 matrix, and a print edge corrector 1615.

Figure 31:
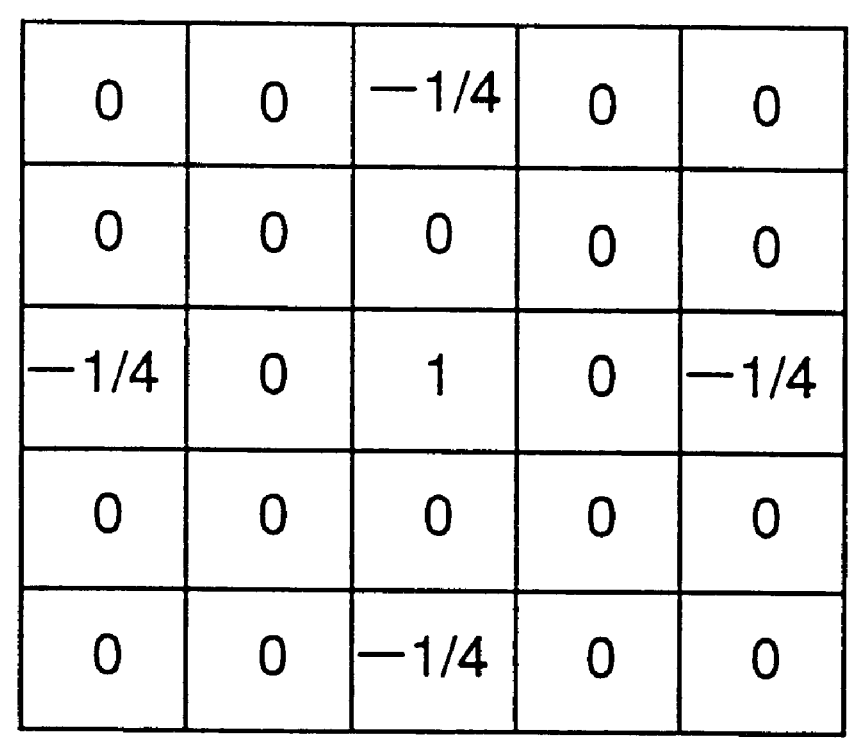
Figure 32:
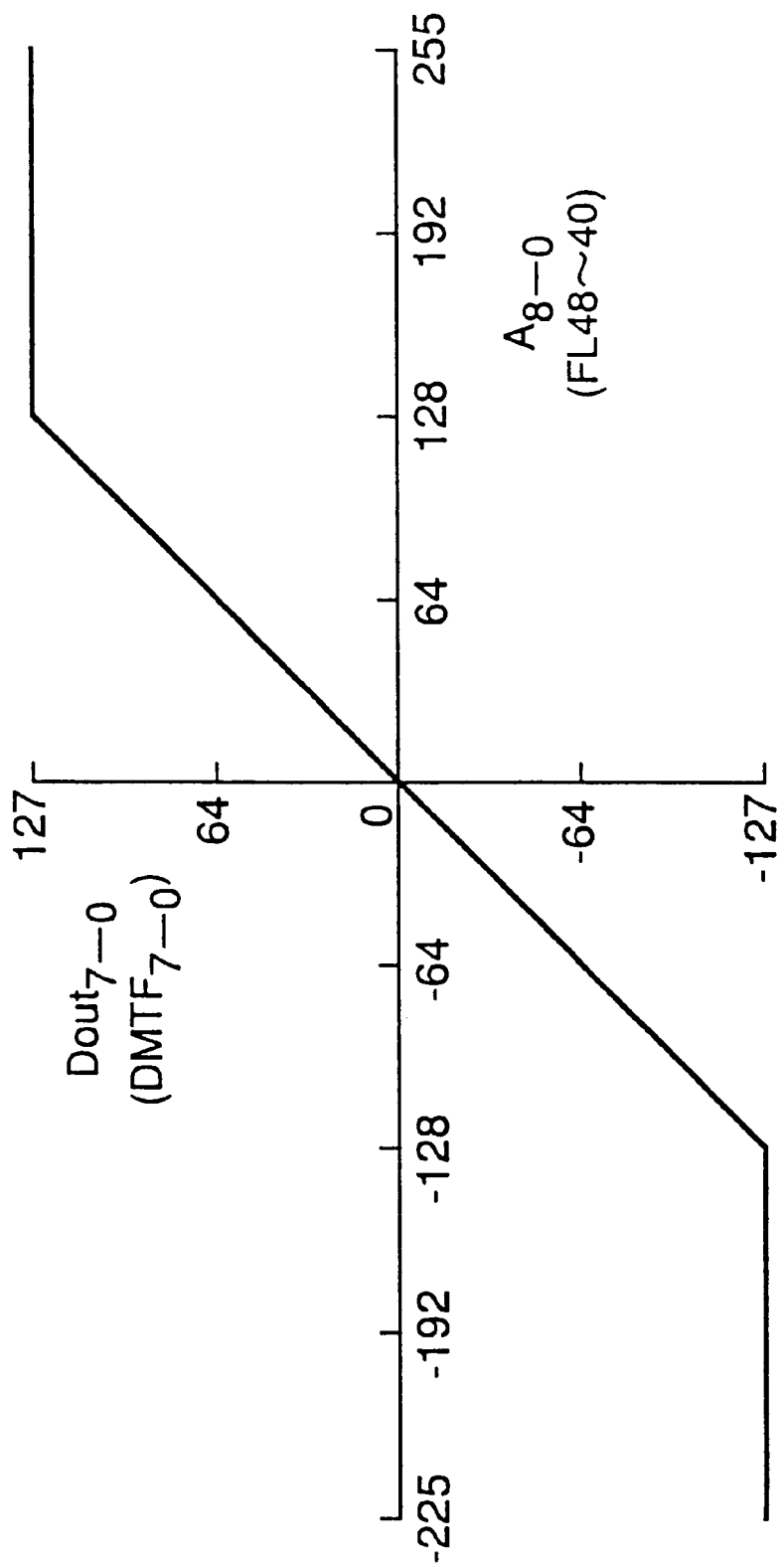
FIG. 32 is a graph of DMTF table.

The Laplacian filter 1605, shown in FIG. 31, converts a data on a pixel under interest at the center to an enhanced data, and sends it to a DMTF table 1606. The DMTF table performs conversion shown in FIG. 32 and sends a conversion data as density edge emphasis component data $DMTF_{7-0}$.

The smoothing filters 1607, 1608 and 1609 smoothens the input data to 300, 200 and 100 dpi, and FIGS. 33–35 show examples of the three filters. The data subjected to smoothing as well as the data without subjected to smoothing is sent to a controller 1610 for smoothing filters. The controller 1610 also receives the change signal $SH_{2-0}$ from the HVC converter 114. The controller 1610 selects one of the input data according to the change signal $SH_{2-0}$ and sends it as $SD_{7-0}$. The change signal $SH_{2-0}$ is also received by another controller 1611 of edge emphasis coefficient to select one of eight kinds of the edge emphasis coefficients as $ED_{7-0}$ per each pixel (in real time), and change a plurality of sharpness up to eight areas simultaneously.

The filters 1612 and 1613 detect a minimum in a 5*5 matrix and in a 3*3 matrix if a pixel under interest is placed at the center of the matrices and they sent the results to a selector 1614. The selector 1614 selects one of them according to a selection signal FSEL2, and it sends it as $MIN_{7-0}$. The selection signal FSEL2 has been determined experimentally. As explained above, by using the minimum data $MIN_{7-0}$, image data can be decreased to zero only inside a black character, and the black character can be printed with edge emphases without white peripheral lines as shown in FIG. 37A. On the other hand, if image data of cyan, magenta or yellow is subtracted by, for example, an edge detection quantity (such as $FL_{17-10}$ or $FL_{27-20}$ in this embodiment), undesired white peripheral lines as shown in FIG. 37A are observed.

Figure 38A:
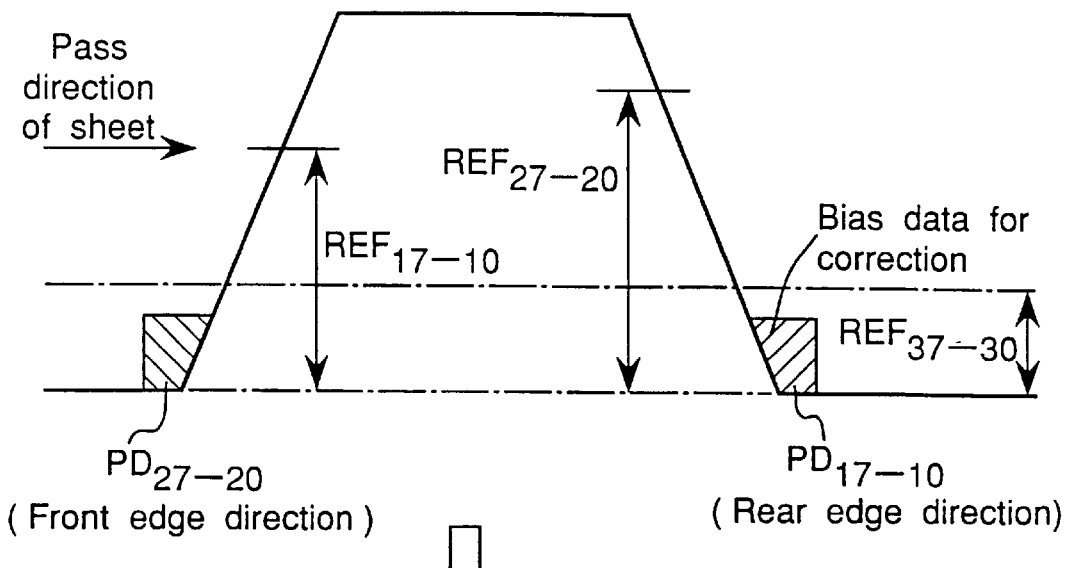
FIG. 38A is a diagram of addition of correction data (hatched area) to an edge of an image.
Figure 38B:
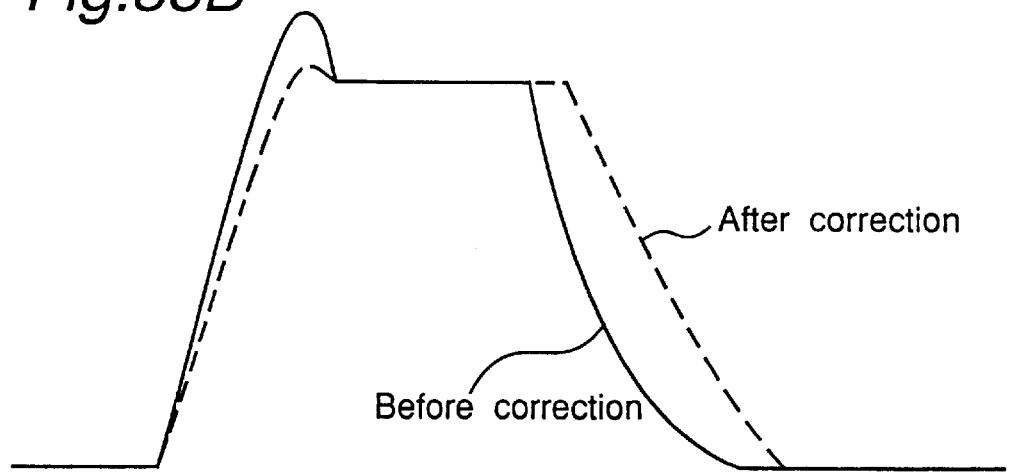
FIG. 38B is a diagram of an amount of toners before correction (solid line) and after correction (dashed line)

The print edge corrector 1615 performs edge correction by taking into account a print characteristic on transferring a toner image onto a sheet of paper. The print characteristic means that more toners adhere to a start position while less toners adhere to an end position, as shown in FIG. 38B with a solid line. However, it is desirable that equal quantities of toners adhere to the start and end and positions. Such print characteristic occurs when image data changes largely at edges while a data near the edges is about zero. Then, the corrector 1615 corrects the data shown in FIG. 38A as shown in FIG. 38B. Then, as shown in FIG. 38B with a dashed line, the inequality can be reduced.

Figure 39:
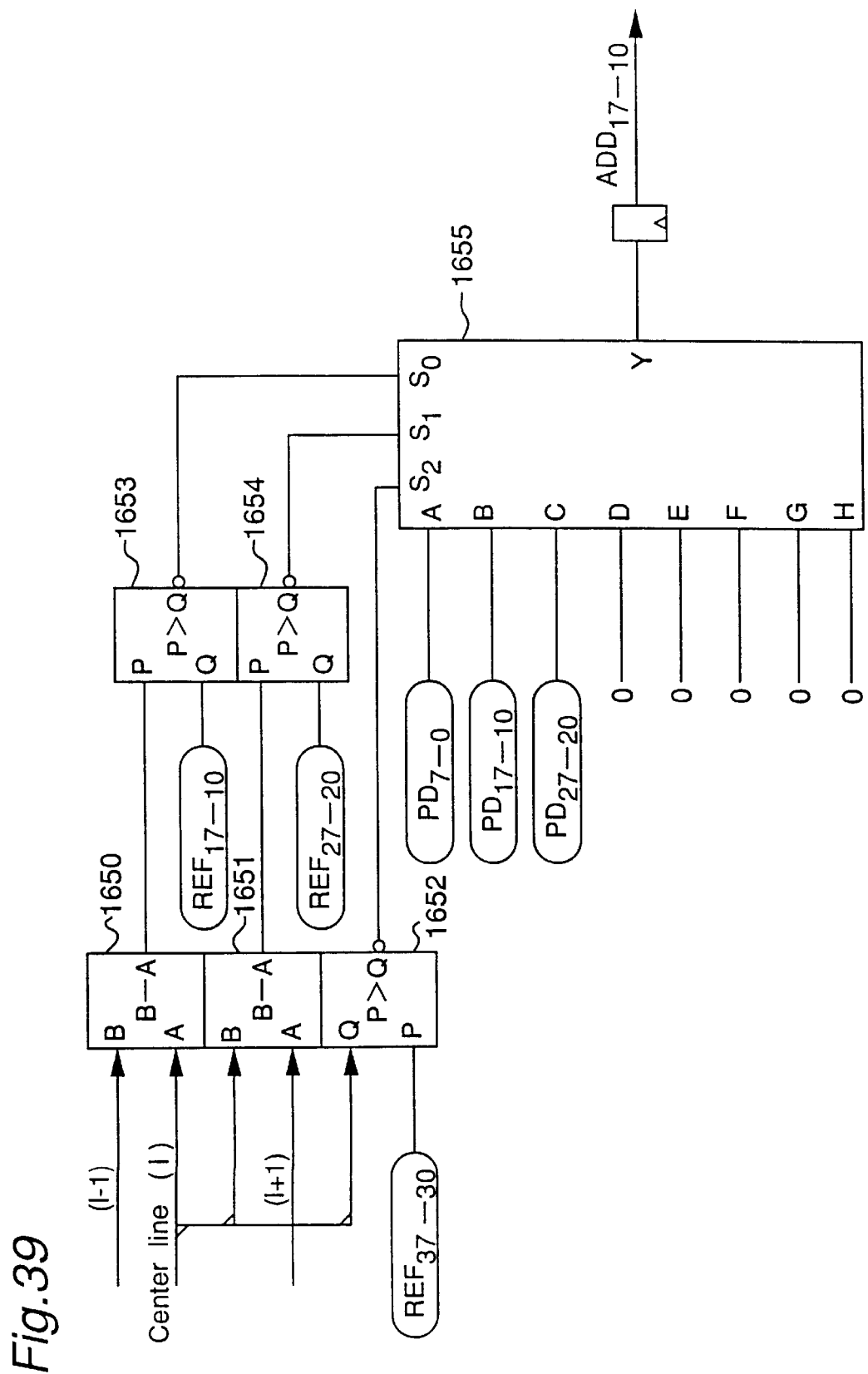
FIG. 39 is a block diagram of a printer edge correction section.

FIG. 39 shows the print edge corrector 1615 in detail. If a data under interest is a data of an l-th pixel, a subtractor 1650 subtracts a data of (l+1)-th pixel from the data of the l-th pixel and sends the result to a comparator 1553. If the result is larger than a threshold value $REF_{17-10}$, the comparator 1653 sends a signal to input $S_0$ of a selector 1655. A subtractor 1651 subtracts a data of the l-th pixel from the data of the (l-1)-th pixel and sends the result to a comparator 1554. If the result is larger than a threshold value $REF_{27-20}$, the comparator 1654 sends a signal to input $S_1$ of the selector 1655. Further, if the data of the l-th data is smaller than a threshold value $REF_{37-30}$, a comparator 1652 sends a signal to input $S_2$ of the selector 1655.

Figure 40C:
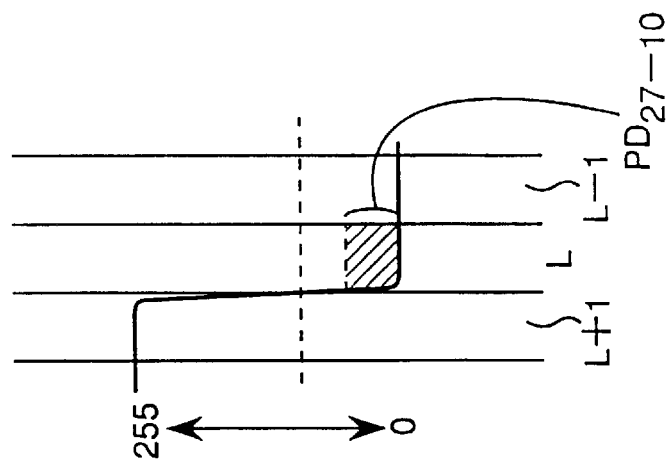
FIGS. 40A, 40B and 40C are diagrams of addition of $PD_{17-10}$ at a leading edge, at an intermediate point and at a trailing edge in an image.
Figure 40B:
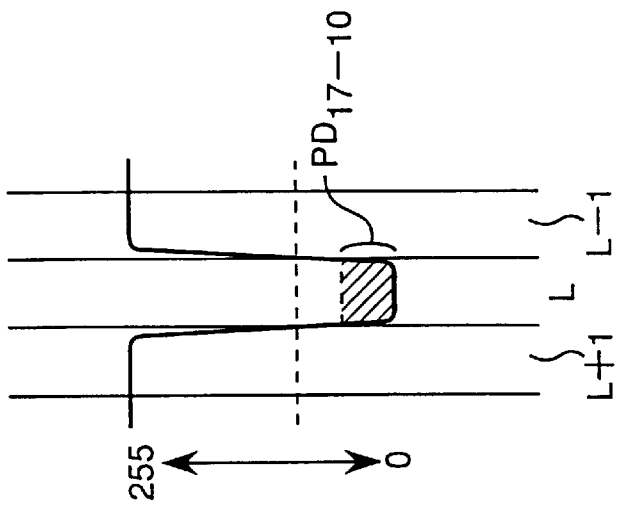
Figure 40A:
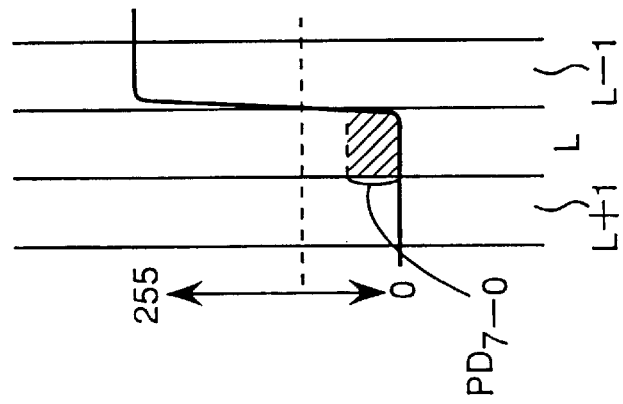

If the selector 1655 receives L level at the input $S_2$–$S_0$, the pixel under interest is considered to exist between edges as shown in FIG. 40B. In this case, the selector 1655 selects $PD_{7-0}$ after addition as $ADD_{17-10}$. If the selector 1655 receives H level at the input $S_1$ and L level at the inputs $S_0$ and $S_2$, the pixel under interest is considered to exist at a leading edge and below a reference level as shown in FIG. 40A. In this case, the selector 1655 selects $PD_{17-10}$ as $ADD_{17-10}$. Further, if the selector 1655 receives H level at the input $S_0$ and L level at the inputs $S_1$–$S_2$, the pixel under interest is considered to exist at a trailing edge and below a reference level as shown in FIG. 40C. In this case, the selector 1655 selects $PD_{27-20}$ as $ADD_{17-10}$.

Next, the MTF correction performed by the MTF corrector shown in FIG. 29B is explained. As explained previously, selectors 1616 and 1617 select one of value edge component $VMTF_{7-0}$, density edge component $DMTF_{7-0}$ and edge emphasis quantity of zero according to the signals DMPX0 and DMPX1 on the kind of pixel DMPX0 and DMPX1. The signals DMPX0 and DMPX1 are defined in Tables 3–8 in the various modes and output by the controller 1610 of the MTF correction parameters.

A selector 1622 receives $ED_{7-0}$ set by the CPU 1 directly and through multipliers 1619–1621 which multiply it with ¾, ½ and ¼, and selects one of the four inputs according to parameters DMPX3 and DMPX2. Another selector 1623 receives the output of the selector 1622 and the zero, and selects one of the two inputs according to a parameter DMPX4. As shown in Table 10, the parameters DMPX4–DMPX2 are determined according to values of $\overline{AMI3}$–$\overline{AMI0}$. If all of $\overline{AMI3}$–$\overline{AMI0}$ are H level or the pixel is not in a dot image, the edge emphasis coefficient $ED_{7-0}$ is sent readily as $ED_{17-10}$ to an operator 1618. As explained previously, the region discriminator 146 changes $\overline{AMI0}$–$\overline{AMI3}$ to L level successively as the degree of dot image increases. Then, the controller 1601 for the MTF correction parameters changes DMPX4–DMPX1 according to the degree of dot image, and the selectors 1622 and 1623 suppress edge emphasis coefficients $ED_{7-0}$ according to results of dot detection $\overline{AMI0}$–$\overline{AMI3}$. The operator 1618 multiplies the edge emphasis quantity $USM_{7-0}$ with the edge emphasis coefficient $ED_{17-10}$ and divides the product with 128 to output $USM_{17-10}$.

TABLE 10

| Decision of dot image | | | | | | | |
|---|---|---|---|---|---|---|---|
| $\overline{AMI3}$ | $\overline{AMI2}$ | $\overline{AMI1}$ | $\overline{AMI0}$ | DMPX4 | DMPX3 | DMPX2 | ED |
| L | L | L | L | L | — | — | 0 |
| H | L | L | L | H | L | L | ED/4 |
| H | H | L | L | H | L | H | ED/2 |
| H | H | H | L | H | H | L | 3ED/4 |
| H | H | H | H | H | H | H | ED |

A selector 1626 receives data $SD_{7-0}$ directly and through a smoothing filter 1625 and selects one of the inputs according to DMPX5. Further, another selector 1627 selects one of the output of the selector 1627 and $MIN_{7-0}$ according to DMPX6 to output $VIDEO_{17-10}$. The control signals DMPX5 and DMPX6 are determined as shown in Tables 3–8.

An adder 1624 adds the edge emphasis quantity $USM_{17-10}$ to the pixel data $VIDEO_{27-20}$. Another adder 1628 adds $VIDEO_{27-20}$ to $ADD_{17-10}$ to output as $VIDEO_{37-30}$. As explained above, the addition data $ADD_{17-10}$ is provided to add a pixel data at a leading edge or at a trailing edge.

I. Gamma Corrector

Figure 41:
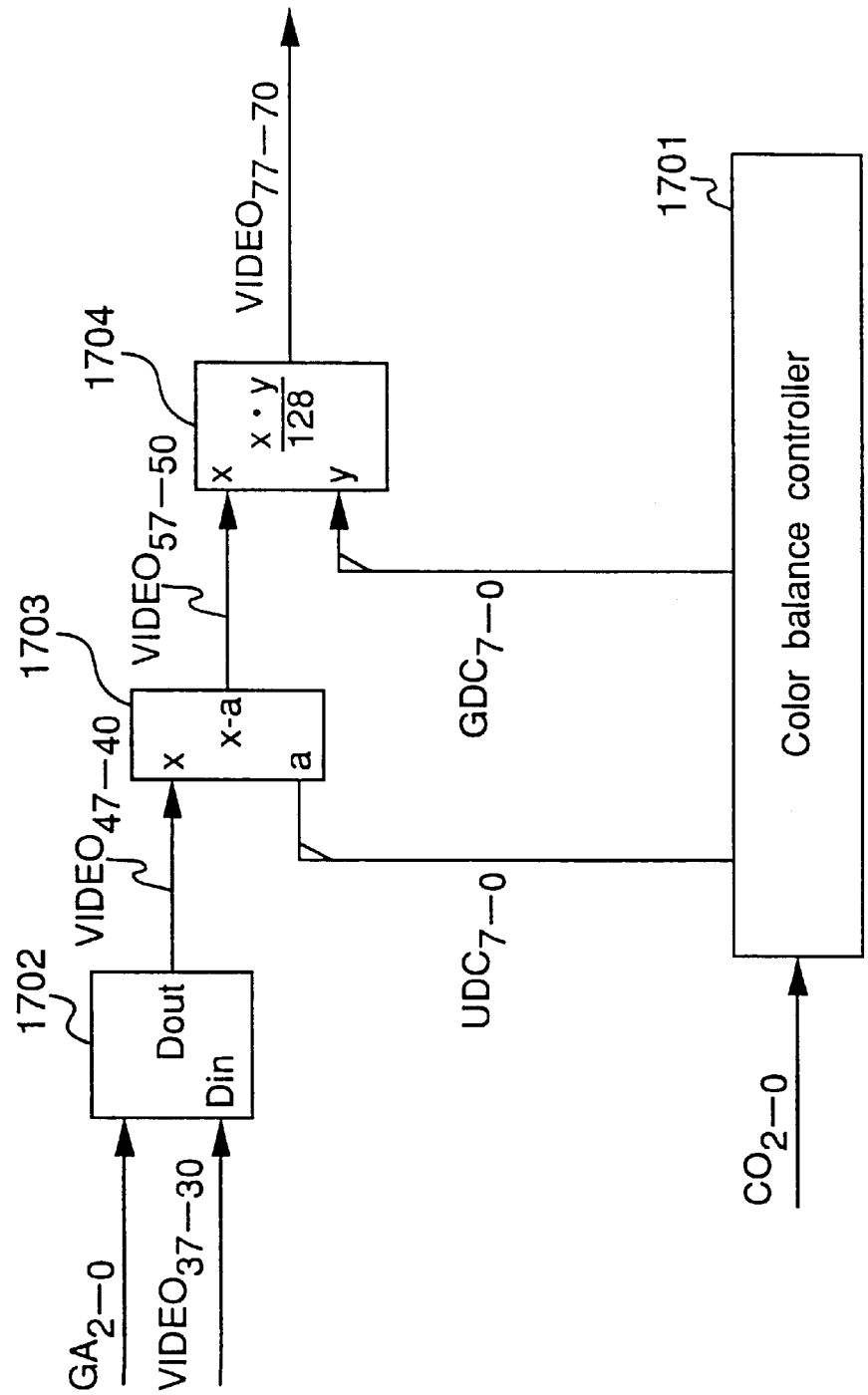
FIG. 41 is a block diagram of a gamma correction section.
Figure 42:
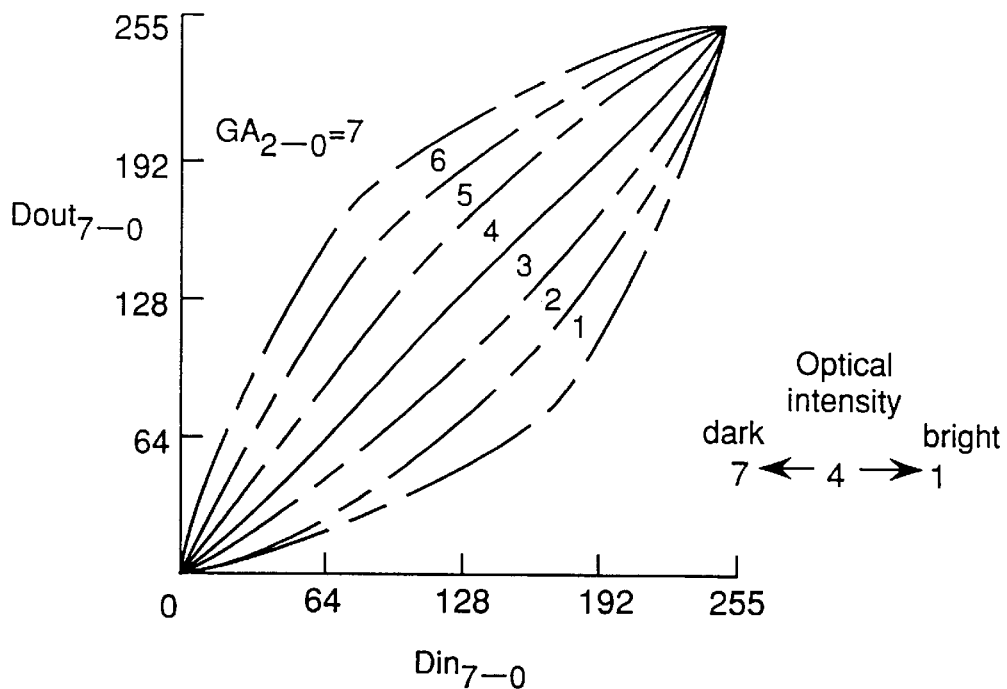
FIG. 42 is a graph of gamma correction table in value control mode.
Figure 43:
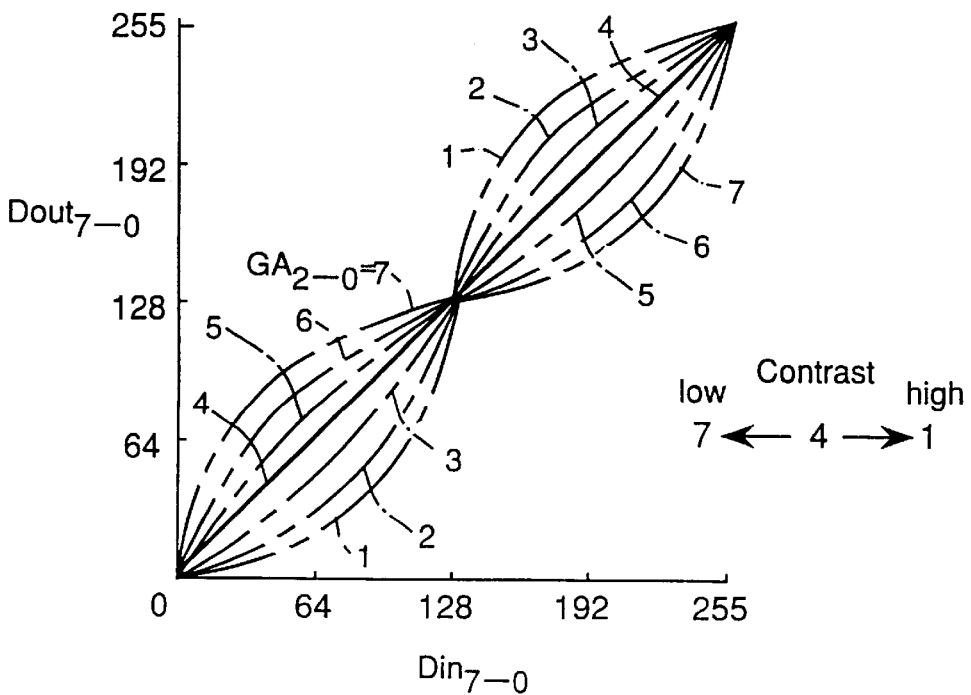
FIG. 43 is a graph of gamma correction table in contrast control mode.

The gamma corrector 150 shown in FIG. 41 receives the image data $VIDEO_{37-30}$ after the MTF correction, and it changes gamma correction curve according to an instruction by a user and corrects the image data to data of desired image quality. The image data $VIDEO_{37-30}$ and the change signal $GA_{2-0}$ for changing the gamma correction table are received by a gamma correction table 1702. The change signal $GA_{2-0}$ are set by the HVC converter 114. The table 1702 changes eight gradation curves shown in FIGS. 42 and 43 in real time according to the change signal $GA_{2-0}$ as a BANK signal of the table. FIG. 42 shows gradation curves in correspondence to the change signal $GA_{2-0}$ in the value control mode, while FIG. 43 shows gradation curves in correspondence to the change signal $GA_{2-0}$ in the contrast control mode. The gamma correction table 1702 changes input data $Din_{7-0}$ ($VIDEO_{37-30}$) to output data $Dout_{7-0}$ ($VIDEO_{47-40}$).

An operator 1703 operates Eq. (20) based on the data $VIDEO_{47-40}$ output from the gamma correction table 1702:

$$VIDEO_{77-70} = (VIDEO_{47-40} - UDC_{7-0}) \cdot GDC_{7-0}/128, \quad (20)$$

$\leq 256$.

That is $VIDEO_{77-70} = 256$ if the operation at the left side exceeds 256. As shown in Table 11, background clearance data $UDC_{7-0}$ and slope correction data $GDC_{7-0}$ have eight kinds of data.

TABLE 11

Background clearance data UDC and slope correction data GDC

| | $GDC_{7-0}$ | $UDC_{7-0}$ |
|---|---|---|
| 7 | 152 | 0 |
| 6 | 144 | 0 |
| 5 | 136 | 0 |
| 4 | 128 | 0 |
| 3 | 136 | 16 |
| 2 | 128 | 16 |
| 1 | 120 | 16 |

Figure 44:
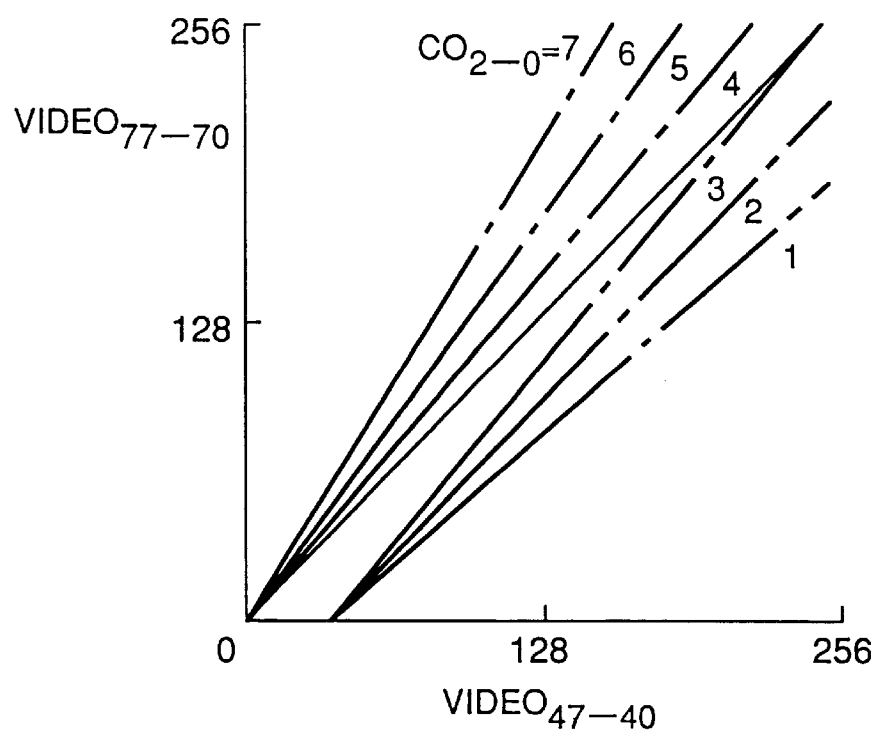
FIG. 44 is a graph of a relation of $VIDEO_{77-70}$ to $VIDEO_{47-40}$ for values of 1–7 of $CO_{2-0}$.
Figure 45:
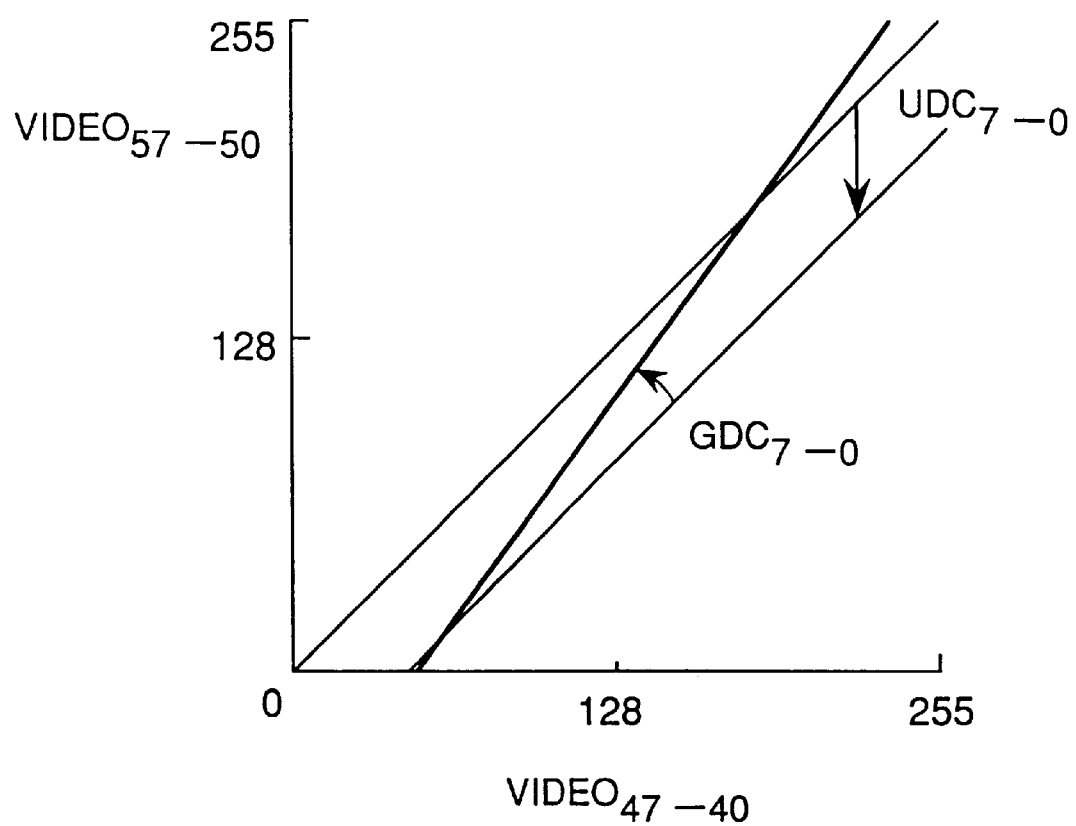
FIG. 45 is a graph of a relation of $VIDEO_{57-50}$ to $VIDE_{47-40}$ subtracted by background clearance data $UDC_{7-0}$ and corrected on slope by $GDC_{7-0}$.

FIG. 44 shows a graph of $VIDEO_{77-70}$ plotted against $VIDEO_{47-40}$ for various values of $CO_{2-0}$ from 7 to 1. As shown in FIG. 45, background data $UDC_{2-0}$ is subtracted from $VIDEO_{47-40}$ and the slope is corrected by slope correction data $GDC_{7-0}$.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An image processor comprising:
   an image scanner with a color image sensor for reading a color image and providing color data corresponding to the color image;
   a specification means for specifying a graduation characteristic of the color image;
   a means for changing a gradation characteristic of the color data according to the gradation characteristic of the color image specified by said specification means;
   a identifying means for identifying a black character portion of the color image based on the color data, the gradation characteristic of which has been changed by said changing means, said identifying means including:
   a first discriminating means for discriminating whether or not the color data belongs to an edge portion in the color image using a first reference value; and
   a second discriminating means for discriminating whether or not the color data belongs to a black portion in the color image using a second reference value;
   a controller which changes the first and second reference values according to the gradation characteristic of the color image specified by said specification means; and
   a correction means for correcting the color data, the gradation characteristic of which has been changed by said changing means, according to the identification by said identifying means.

2. The image processor according to claim 1, wherein the gradation characteristic of the color image is a quantity related to a density distribution of the color data.

3. The image processor according to claim 2, wherein said controller decides the first and second reference values used by said first and second discriminating means based on a background level of the color data.

4. The image processor according to claim 3, wherein said controller comprises a means for determining automatically the background level based on the color data read by said image scanner.

5. The image processor according to claim 1, wherein said specification means has an operation device through which a user specifies the gradation characteristic of the color data.

6. The image processor according to claim 1, wherein
   said first discriminating means comprises a differential filter for filtering the color data, and
   the reference value is a threshold value with which the filtered color data is compared for identifying the black portion of the color image.

7. The image processor according to claim 1, further comprising an aberration correction device for correcting defects in the color image data, wherein said identifying means identifies the black character portion of the color image based on the color data corrected by said aberration correction device.

8. The image processor according to claim 1, wherein
   said second discriminating means comprises a converter for converting the color data to value data, and
   said discriminating means identifies the black portion of the color image on the value data obtained by said converter.

9. The image processor according to claim 8, wherein said second discriminating means comprises an operation device which outputs a minimum of red, green, blue in the color data as the value data.

10. An image processing method comprising steps of:
    reading a color image with color image sensor to provide color data corresponding to the color image;
    specifying a gradation characteristic of the color image;
    changing a gradation characteristic of the color data according to the gradation characteristic of the color image;
    identifying a black character portion of the color image based on the color data, the gradation characteristic of which having been changed in said changing step, said changing step including;
    a first discriminating step of discriminating whether or not the color data belongs to an edge portion in the color image using a first reference value, and
    a second discriminating step of discriminating whether or not the color data belongs to a black portion in the color image using a second reference value; and
    correcting the color data, the gradation characteristic of which has been changed in said changing step, according to the identification of the black portion;
    wherein the first and second reference values are changed according to the gradation characteristic of the color image.

11. The image processing method according to claim 10, wherein the gradation characteristic of the color image is a quantity related to a density distribution of the color data.

12. The image processing method according to claim 10, wherein the first and second reference values are determined based on a background level of the color image.

13. The image processing method according to claim 10, wherein the gradation characteristic of the color image is specified by an operation device through which a user specifies the gradation characteristic of the color data.

14. The image processing method according to claim 10, wherein
    the discriminating of the edge portion in said first discriminating step is performed with use of a differential filter for filtering the color data, and the first reference value is a threshold value with which the filtered color data is compared.

15. The image processing method according to claim 10, further comprising a step of correcting detects in the color data, wherein the black character portion is identified based on the corrected color data.

* * * * *